(12) United States Patent
Yoshioka et al.

(10) Patent No.: US 10,978,238 B2
(45) Date of Patent: Apr. 13, 2021

(54) COIL COMPONENT AND SWITCHING REGULATOR

(71) Applicant: Murata Manufacturing Co., Ltd., Kyoto (JP)

(72) Inventors: Yoshimasa Yoshioka, Nagaokakyo (JP); Akinori Hamada, Nagaokakyo (JP); Atsuo Hirukawa, Nagaokakyo (JP)

(73) Assignee: Murata Manuufacturing Co., Ltd., Kyoto (JP)

( * ) Notice: Subject to any disclaimer, the term of this patent is extended or adjusted under 35 U.S.C. 154(b) by 0 days.

(21) Appl. No.: 15/586,803

(22) Filed: May 4, 2017

(65) Prior Publication Data
US 2017/0345551 A1   Nov. 30, 2017

(30) Foreign Application Priority Data

May 30, 2016 (JP) .............................. JP2016-107560

(51) Int. Cl.
*H01F 27/28* (2006.01)
*H01F 27/29* (2006.01)
*H02M 1/14* (2006.01)
*H02M 3/155* (2006.01)

(52) U.S. Cl.
CPC ......... *H01F 27/2804* (2013.01); *H01F 27/29* (2013.01); *H02M 1/143* (2013.01); *H02M 3/155* (2013.01); *H01F 2027/2809* (2013.01)

(58) Field of Classification Search
CPC .... H01F 27/2804; H01F 27/29; H01F 27/255; H01F 2027/2809; H01F 17/0006; H01F 17/0013; H01F 3/08; H02M 3/155; H02M 1/143

USPC ........ 336/200, 233, 170, 192, 223; 323/355; 361/16, 17

See application file for complete search history.

(56) References Cited

U.S. PATENT DOCUMENTS 3,643,150 A * 2/1972 Bulleyment ........ H02M 7/1626
                                                    363/89
6,106,893 A    8/2000 Uchikoba
(Continued)

FOREIGN PATENT DOCUMENTS

JP    2001-110638 A    4/2001
JP    2003-217932 A    7/2003
(Continued)

OTHER PUBLICATIONS

An Office Action; "Notification of Reasons for Refusal," issued by the Japanese Patent Office dated Oct. 30, 2018, which corresponds to Japanese Patent Application No. 2016-107560 and is related to U.S. Appl. No. 15/586,803; with English language translation.
(Continued)

*Primary Examiner* — Mang Tin Bik Lian
(74) *Attorney, Agent, or Firm* — Studebaker & Brackett PC

(57) ABSTRACT

A coil component including 2N coils, N being an integer of two or more, wherein the 2N coils are configured to form N pairs, and wherein when coils other than a first coil and a second coil forming one of the N pairs are defined as the other coils, a magnetic coupling between the first coil and the second coil is stronger than a magnetic coupling between the first coil and each of the other coils.

18 Claims, 33 Drawing Sheets

(56) References Cited

U.S. PATENT DOCUMENTS

| | | | | |
|---|---|---|---|---|
| 6,137,389 | A * | 10/2000 | Uchikoba | H01F 17/06 333/185 |
| 6,211,657 | B1 * | 4/2001 | Goluszek | H02M 3/1584 323/272 |
| 6,362,986 | B1 | 3/2002 | Schultz et al. | |
| 6,366,069 | B1 * | 4/2002 | Nguyen | H02M 3/1563 323/272 |
| 7,327,128 | B2 | 2/2008 | Dinh | H02M 3/1584 323/272 |
| 7,394,233 | B1 * | 7/2008 | Trayling | H03F 1/0227 323/240 |
| 7,449,867 | B2 * | 11/2008 | Wu | H02M 3/1584 323/247 |
| 7,456,618 | B2 * | 11/2008 | Jain | H02M 3/157 323/272 |
| 7,514,909 | B2 * | 4/2009 | Burstein | H02M 3/1584 323/272 |
| 8,754,618 | B2 * | 6/2014 | Huang | H02M 3/1584 323/237 |
| 2003/0231047 | A1 * | 12/2003 | Deaton | H02M 3/1584 327/427 |
| 2006/0145804 | A1 * | 7/2006 | Matsutani | H01F 27/027 336/200 |
| 2008/0002380 | A1 * | 1/2008 | Hazucha | H01L 23/645 361/760 |
| 2008/0067990 | A1 * | 3/2008 | Wei | H01F 27/2804 323/271 |
| 2008/0238390 | A1 * | 10/2008 | Trivedi | H02M 3/1584 323/283 |
| 2011/0025442 | A1 * | 2/2011 | Hsieh | H01F 17/0013 336/200 |
| 2013/0229167 | A1 * | 9/2013 | Hiei | H02M 3/1584 323/355 |
| 2014/0167896 | A1 * | 6/2014 | Tung | H01F 17/0013 336/5 |
| 2016/0217917 | A1 * | 7/2016 | Jeong | H01F 27/292 |

FOREIGN PATENT DOCUMENTS

| | | |
|---|---|---|
| JP | 2004-221458 A | 8/2004 |
| JP | 2006-210403 A | 8/2006 |
| JP | 2007-68392 A | 3/2007 |
| JP | 2012-238780 A | 12/2012 |
| JP | 2015-056940 A | 3/2015 |

OTHER PUBLICATIONS

An Office Action mailed by the Japanese Patent Office dated Nov. 15, 2019, which corresponds to Japanese Patent Application No. 2016-107560 and is related to U.S. Appl. No. 15/586,803 with English language translation.

An Office Action; "Notification of Reasons for Refusal," mailed by the Japanese Patent Office dated Aug. 4, 2020, which corresponds to Japanese Patent Application No. 2016-107560 and is related to U.S. Appl. No. 15/586,803 with English language translation.

* cited by examiner

COIL COMPONENT AND SWITCHING REGULATOR

CROSS REFERENCE TO RELATED APPLICATIONS

This application claims benefit of priority to Japanese Patent Application 2016-107560 filed May 30, 2016, the entire content of which is incorporated herein by reference.

TECHNICAL FIELD

The present disclosure relates to a coil component and a switching regulator including the coil component.

BACKGROUND

Conventional coil components include a coil component described in U.S. Pat. No. 6,362,986. This coil component has a plurality of (N) coils, and these coils are negatively magnetically coupled (hereinafter sometimes simply referred to as "negatively coupled") through a common core, and an excitation inductance is greater than approx. three times a leakage inductance. This indicates that the leakage inductance is small, i.e., the coils are strongly negatively coupled to each other. Additionally, even when N is larger than three, the coil component has all the coils strongly negatively coupled by winding the coils around the common core. Particularly, the coil component is disclosed in a configuration in which at least two or more coils are most strongly negatively coupled to each of the coils. The coil component is used for an output voltage smoothing circuit of a multi-phase switching regulator (hereinafter referred to as a "multi-phase SW regulator"). When a period of a pulse signal input to each of the coils (interval between turn-on transitions) is represented by a phase of 360°, these pulse signals are input to the coils with a phase difference of 360°/N in the multi-phase SW regulator so as to reduce a ripple voltage input to a smoothing capacitor. In a steady state without a load variation, the pulse signals have a constant duty cycle, and the duty cycle is the same between the pulse signals.

SUMMARY

Problem to be Solved by the Disclosure

In the conventional coil component, for example, when N=2, pulse signals having a phase difference of 180° are input to two coils. In this case, if the duty cycle of the pulse signals is 50%, a period of an ON state (an ON period) of the pulse signal input to one coil is a period of an OFF state (an OFF period) of the pulse signal input to the other coil. Although this leads to an increase in current in one coil and a decrease in current in the other coil, since these coils are negatively coupled through the core, changes in magnetic flux in the core due to the current changes are made in the same direction and strengthen each other. Therefore, a change rate of the magnetic flux in the core becomes larger than a change rate of the magnetic flux in the core when the two coils are not magnetically coupled (hereinafter sometimes simply referred to as "non-coupled") and an effective inductance of each of the coils becomes larger than that in the case of being non-coupled. As a result, a rate of increase in current in one coil decreases while a rate of decrease in current in the other coil decreases, and the ripple current in the coils becomes smaller than that in the case of being non-coupled. Particularly, when the coupling coefficient of the two coils is −1, the ripple current becomes zero, and a direct current flows through the coils. In the present application, the "ripple current" refers to a difference (Ipp) between the maximum value and the minimum value of the electric current (coil current) flowing through the coils. Additionally, if the smoothing capacitor has an extra capacity with respect to the reduced ripple, an improvement in transient response speed can be achieved by reducing the inductance of the coils.

However, the inventor of the present application found that the conventional coil component has the following problems. For example, depending on the number (N) of coils and the duty cycle of the pulse signal, two or more coils may have a period in which the input pulse signals are in the ON state at the same time (a simultaneous ON period). In the simultaneous ON period, the current increases in the two or more coils; however, since the two or more coils are negatively coupled in the conventional coil component, the changes in magnetic flux in the core due to the current changes in the two coils are opposite indirection and cancel each other. Additionally, since the two or more coils are strongly negatively coupled and have a large amount of magnetic fluxes canceling each other in the conventional coil component, a rate of change in the magnetic flux in the core in the simultaneous ON period may become smaller than that in the case of being non-coupled. In this state, the effective inductance of the coils becomes smaller as compared to the case of being non-coupled, so that a rate of change in current becomes larger in the coils, which may lead to an increase in the ripple current. The same applies to a simultaneous OFF period, i.e., a period in which two or more coils have the input pulse signals in the OFF state at the same time. Therefore, if all the coils are strongly negatively coupled (at least two or more coils are strongly negatively coupled to each of the coils) as in the conventional coil component, the ripple current may increase.

Therefore, a problem to be solved by the present disclosure is to provide a coil component capable of reducing the ripple current of coils when used for a multi-phase SW regulator and a switching regulator including the coil component.

Solutions to the Problems

An aspect of the present disclosure provides a coil component comprising 2N coils, N being an integer of two or more, wherein the 2N coils are configured to form N pairs, and wherein when coils other than a first coil and a second coil forming one of the N pairs are defined as the other coils, a magnetic coupling between the first coil and the second coil is stronger than a magnetic coupling between the first coil and each of the other coils.

In this case, coils connected in series within the coil component are regarded as one coil. "A magnetic coupling between the first coil and the second coil is stronger than a magnetic coupling between the first coil and each of the other coils" means that "the absolute value of the coupling coefficient between the first coil and the second coil is larger than the absolute value of the coupling coefficient between the first coil and each of the other coils".

According to the coil component of the aspect, the magnetic coupling between the first coil and the second coil forming a pair is stronger than the magnetic coupling between the first coil and each of the other coils. As a result, when the coil component of the aspect is used for a multi-phase SW regulator, the ripple current of the first coil can be reduced by properly selecting pulse signals input to the coils.

In an embodiment of the coil component, the magnetic coupling between the first coil and the second coil is stronger than a magnetic coupling between the second coil and each of the other coils.

According to the embodiment, when the coil component is used for a multi-phase SW regulator, the ripple current of the second coil can be reduced by properly selecting the pulse signals input to the coils.

In an embodiment of the coil component, the magnetic coupling between the paired coils is stronger than any of the magnetic couplings between the unpaired coils.

According to the embodiment, when the coil component is used for a multi-phase SW regulator, the ripple current of the coils can be reduced by properly selecting the pulse signals input to the coils.

In an embodiment of the coil component, an electric current is applied to the first coil and the second coil in a direction of negative coupling such that respective magnetic fluxes cancel each other.

According to the embodiment, since an electric current is applied to the first coil and the second coil in a direction of negative coupling, the ripple current of the first and second coils can be reduced when signals having a phase difference of 180° is input to the first coil and the second coil. "Respective magnetic fluxes cancel each other" means that the magnetic fluxes cancel each other mainly at a position with a high magnetic flux density such as an inner diameter portion of a coil, for example, and the magnetic flux may strengthen each other at a position with a relatively low magnetic flux density such as a peripheral portion of a coil.

In an embodiment of the coil component, the coil component further comprises an element body having a plurality of insulating layers laminated in a first direction, each of the 2N coils is disposed inside the element body and is made up of one or more spiral wiring wound on one of the insulating layers, and when an inside of an innermost circumference of the spiral wiring is defined for each of the 2N coils as an inside diameter portion of the coil, at least a portion of the inner diameter portion of the first coil and at least a portion of the inner diameter portion of the second coil overlap with each other when viewed in the first direction.

According to the embodiment, at least a portion of the inner diameter portion of the first coil and at least a portion of the inner diameter portion of the second coil overlap with each other. As a result, when a magnetic flux of the first coil L1 is generated along the axis of the first coil in the inner diameter portion of the first coil, the magnetic flux passes through the inner diameter portion of the second coil. When a magnetic flux of the second coil is generated along the axis of the second coil in the inner diameter portion of the second coil, the magnetic flux passes through the inner diameter portion of the first coil. Therefore, the first coil and the second coil forming a pair can strongly magnetically be coupled. In the present application, the spiral wirings means curved wirings wound on a plane surface such as an insulating layer and, as shown in an embodiment described later, the spiral wirings include a curved wiring with the number of turns (the number of windings) made less than one.

In an embodiment of the coil component, the inner diameter portion of the first coil and the inner diameter portions of the other coils do not overlap with each other.

According to the embodiment, the magnetic coupling can be weakened between the first coil and each of the other coils not forming a pair.

In an embodiment of the coil component, the first coil and the second coil are wound in different directions.

According to the embodiment, the first coil and the second coil can easily negatively be coupled. In the present application, the two coils being wound in different directions means that, for example, if both ends of each of the two coils are led out to one and the other sides when viewed in the first direction, the coils are different in direction of winding from the one side to the other side. Specifically, this means a state in which, for example, one coil is wound clockwise from the one side to the other side while the other coil is wound counterclockwise from the one side to the other side when viewed in the first direction.

In an embodiment of the coil component, a plurality of the coils is laminated on the same insulating layer, and wherein the plurality of the coils is wound in the same direction.

According to the embodiment, since the plurality of the coils laminated on the same insulating layer is wound in the same direction, a negative coupling can easily be achieved for a set of coils adjacent to each other on the same insulating layer and having a relatively large magnetic coupling out of the sets of the unpaired coils, and the ripple current of the coils can further be suppressed.

In an embodiment of the coil component, the 2N coils are all wound in the same direction.

According to the embodiment, since the 2N coils are all wound in the same direction, the electric characteristic deviation can be reduced and the manufacturing can be facilitated. Additionally, the paired coils can easily positively be coupled.

In an embodiment of the coil component, the insulating layers on both sides in the first direction with respect to the spiral wirings of the 2N coils include magnetic resin layers made of a composite material of a magnetic powder and a resin.

According to the embodiment, the insulating layers on both sides in the first direction with respect to the spiral wirings include magnetic resin layers, and this makes it possible to inexpensively provide the coil component capable of ensuring appropriate inductance and coupling coefficient while being small and thin.

In an embodiment of the coil component, the magnetic powder has an average particle diameter of 0.5 µm or more and 100 µm or less, and the magnetic powder is contained in an amount of 50 vol. % or more and 85 vol. % or less relative to the resin.

According to the embodiment, since the magnetic powder has an average particle diameter of 0.5 µm or more and 100 µm or less, the magnetic resin can be formed into a small core. Additionally, since the magnetic powder is contained in an amount of 50 vol. % or more and 85 vol. % or less relative to the resin, a sufficient magnetic permeability can be acquired, so that the magnetic couplings of the paired coils can be strengthened.

In an embodiment of the coil component, the coil component further comprises, for each of the 2N coils, magnetic resin bodies made of a composite material of a magnetic material powder and a resin and provided in the inner diameter portion of the coil and outside the outermost circumference of the spiral wiring of the coil, and the magnetic resin layer and the magnetic resin bodies constitute a closed magnetic circuit.

According to the embodiment, the magnetic resin layer and the magnetic resin bodies constitute a closed magnetic circuit. This makes it possible to reduce leakage magnetic fluxes and suppress magnetic noises and also makes it possible to strengthen the magnetic coupling between the paired coils while weakening the magnetic couplings between the unpaired coils.

In an embodiment of the coil component, the first coil and the second coil are each made up of a plurality of the spiral wirings each wound on one of the insulating layers, and wherein a shortest distance between the first coil and the second coil is longer than a shortest distance between the spiral wirings in each of the first coil and the second coil.

According to the embodiment, since the shortest distance between the first coil and the second coil is longer than the shortest distance between the spiral wirings in each of the coils, the insulation can relatively be increased between the first coil and the second coil to which different voltages are applied for a relatively long period, so that the reliability can be improved.

In an embodiment of the coil component, the spiral wirings of a plurality of the coils are wound on the same insulating layer, and a shortest distance between the spiral wirings is longer than a wiring interval in the spiral wirings.

According to the embodiment, since the shortest distance between the adjacent spiral wirings wound on the same insulating layer is longer than the wiring interval in the spiral wirings, the insulation can relatively be increased between the spiral wirings wound on the same insulating layer in the adjacent coils having a period in which different voltages are applied, so that the reliability can be improved.

In an embodiment of the coil component, the insulating layers in contact with the spiral wirings are made of a composite material of an insulator powder and a resin.

According to the embodiment, the insulation can further be improved in the spiral wirings and between the spiral wirings.

In an embodiment of the coil component, one end of the first coil and one end of the second coil are led out to the same one side with respect to the first coil and the second coil, while the other end of the first coil and the other end of the second coil are led out to the same other side with respect to the first coil and the second coil, and the first coil and the second coil are wound such that respective magnetic fluxes cancel each other when an electric current flows from the one end to the other end.

According to the embodiment, when the pulse signals are input such that the first coil and the second coil are negatively coupled, the input ends and the output ends of the first and second coils can be arranged on the same respective sides. As a result, the wiring routing can be facilitated on a board on which the coil component is mounted.

In an embodiment of the coil component, the first coil and the second coil are the same as each other in terms of the number of turns, a coil wiring length, and a coil cross-sectional area.

According to the embodiment, since the first coil and the second coil are the same as each other in terms of the number of turns, the coil wiring length, and the coil cross-sectional area, deviations of the electrical characteristics of the coils can be reduced.

In an embodiment of the coil component, a first external terminal connected to the one end of the first coil and a second external terminal connected to the one end of the second coil are adjacent to each other.

According to the embodiment, since the first external terminal and the second external terminal are adjacent to each other, the coil component can be miniaturized In an embodiment of a switching regulator, the switching regulator comprises the coil component;

2N switch parts connected to the coils of the coil component; and a smoothing circuit connected to one or the other end side of the coils of the coil component, and one of the 2N switch parts being connected to one end side of one of the coils of the coil component, the switch parts input signals having a phase difference of 180° to the paired coils of the coil component.

According to the embodiment, since the coil component is included, the switching regulator can be improved in performance and miniaturized by reducing the ripple current of the coils.

Effect of the Disclosure

According to the coil component of the present disclosure, the magnetic coupling between the first coil and the second coil forming a pair is stronger than the magnetic coupling between the first coil and each of the other coils and, therefore, when the coil component is used for a multi-phase SW regulator, the ripple current of the first coil can be reduced by properly selecting the pulse signals input to the coils.

DETAILED DESCRIPTION

Figure 1:
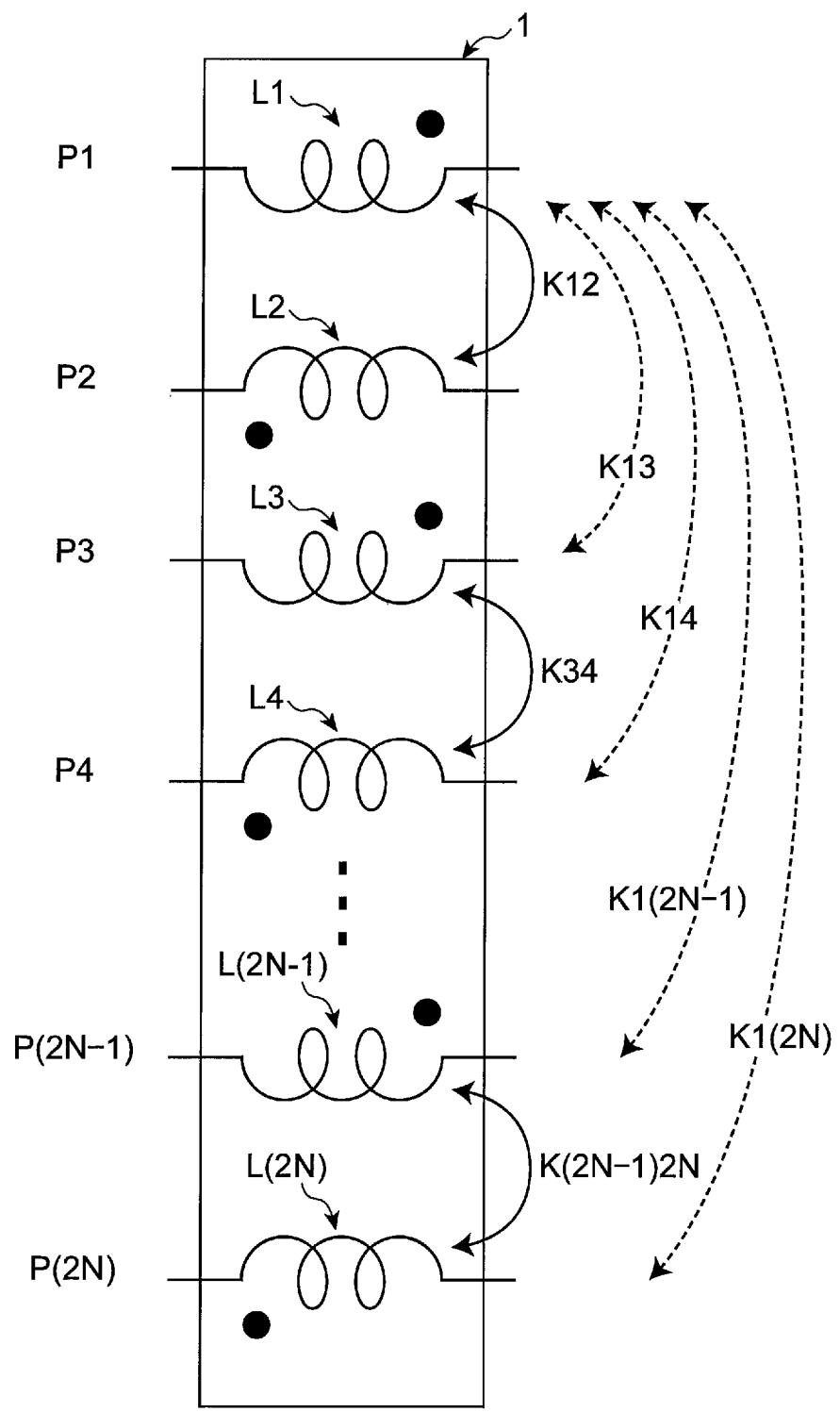
FIG. 1 is a simplified configuration diagram of a coil component 1 according to a first embodiment.

A form of the present disclosure will now be described in detail with reference to embodiments shown in the drawings.

First Embodiment

FIG. 1 is a simplified configuration diagram of a coil component 1 according to a first embodiment. As shown in FIG. 1, the coil component 1 has 2N (N is an integer of two or more) coils L1, L2, ... L(2N). The 2N coils L1 to L(2N) are configured to form N pairs. Specifically, the first coil L1 and the second coil L2 form a pair, the third coil L3 and the fourth coil L4 form a pair, and similarly, the (2N−1)-th coil L(2N−1) and the (2N)-th coil L(2N) form a pair. Therefore, in a generalized expression, when M is an integer of one or more and N or less, a (2M−1)-th coil L(2M−1) and a (2M)-th coil L(2M) form a pair.

In this case, the 2N coils L1, L2, ... L(2N) included in the coil component 1 are magnetically coupled to each other. However, the magnetic coupling between the first coil L1 and the second coil L2 forming a pair is stronger than the magnetic coupling between the first coil L1 and each of the other coils L3 to L(2N) not forming a pair. In other words, an absolute value of a coupling coefficient between the first coil L1 and the second coil L2 is larger than an absolute value of a coupling coefficient between the first coil L1 and each of the other coils L3 to L(2N).

Specifically, a magnetic coupling K12 between the first and second coils is stronger than a magnetic coupling K13 between the first and third coils, and a magnetic coupling K1(2N) between the first and (2N)-th coils. In FIG. 1, solid arrows indicate strong magnetic couplings and dotted arrows indicate weak magnetic couplings. A current is applied to the first coil L1 and the second coil L2 in the direction of negative coupling such that the respective magnetic fluxes cancel each other, specifically, from the input side (e.g., the left side of FIG. 1) to the output side (e.g., the right side of FIG. 1).

Similarly, not only when the first coil L1 is considered as a reference but also when any of the coils L2 to L(2N) are considered as a reference, the magnetic coupling to the coil paired with the reference coil is stronger than the magnetic coupling to any of the other coils unpaired with the reference coil. For example, when the second coil L2 is considered as a reference, the magnetic coupling between the first coil L1 and the second coil L2 is stronger than the magnetic coupling between the second coil L2 and each of the other coils L3 to L(2N). To all the pairs of the coils, a current is applied in the direction of negative coupling such that the respective magnetic fluxes cancel each other. Additionally, in the coil component 1, the magnetic coupling between the paired coils is stronger than any of the magnetic couplings between the unpaired coils. Specifically, for example, the magnetic coupling between the first coil L1 and the second coil L2 forming a pair is stronger than the magnetic coupling between the third coil L3 and the (2N−1)-th coil L(2N−1) not forming a pair.

According to the coil component 1, the magnetic coupling between the first coil L1 and the second coil L2 forming a pair therewith is stronger than the magnetic coupling between the first coil L1 and each of the other coils L3 to L(2N) not forming a pair. As a result, when the coil component 1 is used for a multi-phase SW regulator, the ripple current of the first coil L1 can be reduced by properly selecting pulse signals input to the coils L1 to L(2N).

Specifically, first, when the coil component 1 having the 2N coils L1 to L(2N) is used for a multi-phase SW regulator, the total number of the pulse signals input to the coil component 1 is 2N and, therefore, the signals are denoted by P1 to P(2N). In this case, the signals P1 to P(2N) have the same period and, when the period is represented by a phase of 360°, the signals P1 to P(2N) are a set of signals having a phase difference of 360°/2N. In a steady state without a load variation, the signals P1 to P (2N) have the constant same duty cycle. Since 2N is an even number, the 2N signals P1 to P (2N) include two pulse signals having the phase difference of 180°.

Therefore, it is assumed that the signal P1 input to the first coil L1 is one of the two pulse signals while the signal P2 input to the second coil L2 paired with the first coil L1 is the other of the two pulse signals. The signal P2 has the phase difference of 180° from the signal P1 and is the signal having the largest phase difference with respect to the signal P1 out of the signals P2 to P(2N). Therefore, with regard to the intervals of turn-on transitions (or turn-off transitions) of the signals P2 to P (2N) from the turn-on transition (or the turn-off transition) of the signal P1, the signal P2 is the signal having the largest interval. This means that among the signals P2 to P(2N), the signal P 2 is a signal having the longest period in which a reduction in the ripple current can be achieved by negative coupling of the coils (period in which one coil is in the ON state and the other coil is in the OFF state) and the shortest period in which the ripple current may possibly increase due to negative coupling of the coils (simultaneous ON period and simultaneous OFF period). Therefore, the signal P2 is a signal exerting the greatest effect of the ripple current reduction by negative coupling of the coils on the signal P1. In the coil component 1, the ripple current of the first coil L1 can effectively be reduced by inputting such a signal P2 to the second coil L2 relatively strongly negatively-coupled to the first coil L1 to which the signal P1 is input.

In the case described above, the signals P3 to P (2N) input to the other coils L3 to L(2N) unpaired with the first coil L1 are signals having a phase difference from the signal P1 smaller than the phase difference between the signal P1 and the signal P2. Therefore, the signals P3 to P (2N) have a relatively smaller interval between the turn-on transitions or between the turn-off transitions with respect to the signal P1. This means that the signals P3 to P (2N) are signals having a relatively short period in which a reduction in the ripple current can be achieved by negative coupling of the coils and a relatively long period in which the ripple current may possibly increase due to negative coupling of the coils. Therefore, the signals P3 to P(2N) are signals relatively difficult to exert the effect of the ripple current reduction by negative coupling of the coils on the first pulse signal and possibly causing an increase in the ripple current. In the coil component 1, an increase in the ripple current of the first coil L1 can be suppressed by inputting such signals P3 to P(2N) to the other coils L3 to L(2N) relatively weakly magnetically-coupled to the first coil L1 to which the signal P1 is input.

As a result, when the coil component 1 is used for a multi-phase SW regulator, the ripple current of the first coil L1 can be reduced by properly selecting the pulse signals input to the coils.

Particularly, since the current is applied to the first coil L1 and the second coil L2 in the direction of negative coupling such that the respective magnetic fluxes cancel each other, the inductor ripple current of the first and second coils L1, L2 can be reduced when the signals P1 and P2 having the phase difference of 180° are input to the first coil L1 and the second coil L2.

The relative strength relationship of the coupling described above is achieved not only when the first coil L1 is considered as a reference but also when any of the coils L2 to L(2N) is used as a reference. Therefore, as is the case with the first coil L1, when any of the coils L2 to L(2N) is considered as a reference, the ripple current of the coils L2 to L(2N) can be reduced by inputting the pulse signals having the phase difference of 180° to the reference coil and the coil forming a pair therewith. To properly select the pulse signal in this way, for example, after an arbitrary signal is first selected as the signal P1, the signal P(2M−1) may be acquired by selecting a signal having a phase difference of (360°/(2N))×(M−1) relative to the signal P1, and the signal P(2M) may be acquired by selecting a signal having a phase difference of (360°/(2N))×(M−1)+180° relative to the signal P1 (M is an integer of one or more and N or less). Specifically, for example, when N=2, the signals P1 to P4 may be acquired by first selecting an arbitrary signal as the signal P1, selecting a signal having a phase difference of 180° relative to the signal P1 as the signal P2, selecting a signal having a phase difference of 90° relative to the signal P1 as the signal P3, and selecting a signal having a phase difference of 270° relative to the signal P1 as the signal P4.

Therefore, when the coil component 1 is used for a multi-phase SW regulator, the ripple current of all the coils L1 to L(2N) can be reduced by properly selecting the signals P1 to P (2N) input to the coils L1 to L(2N) as described above. However, as can be inferred from the above, the coil component 1 may have at least one coil considered as a reference out of the coils L1 to L(2N) such that the magnetic coupling to a coil paired with this coil becomes stronger than the magnetic coupling to any of the other coils unpaired with this coil. In this state, the ripple current of this coil can be reduced by inputting to the coil paired with this coil the signal having the phase difference of 180° from the signal input to this coil. In this case, any strength relationship of the magnetic coupling may be achieved when a coil other than this coil is considered as a reference. If all the magnetic couplings between the paired coils are stronger than any of the magnetic couplings between the unpaired coils as described above, the ripple current of the coils L1 to L(2N) can reliably be reduced, which is preferable. As described above, when a certain coil is considered as a reference in the coil component 1, a coil "paired" with this coil refers to a coil most strongly magnetically-coupled to this coil out of the coils other than this coil.

Second Embodiment

Figure 2:
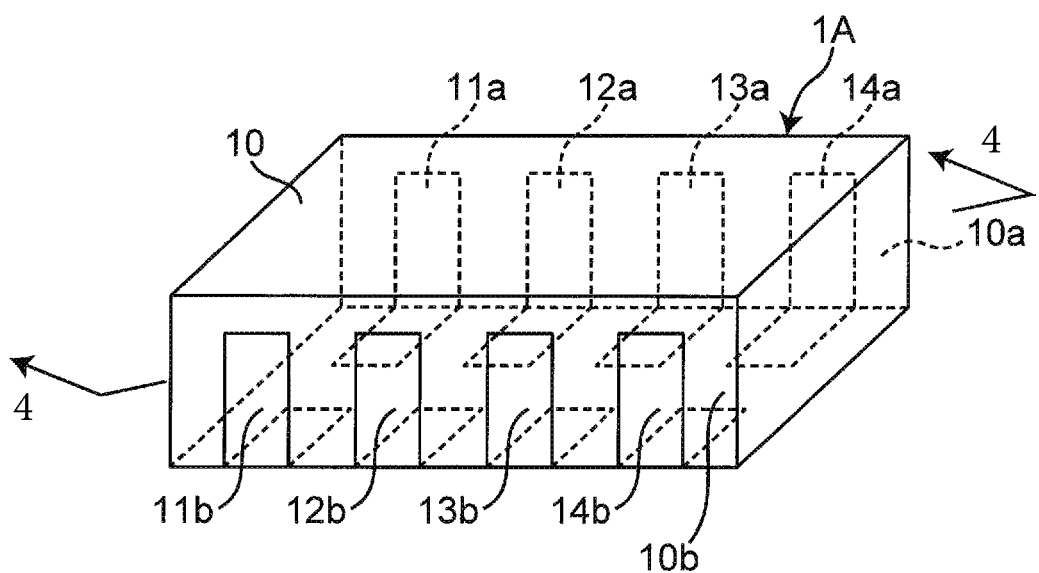
FIG. 2 is a perspective view of a coil component 1A according to a second embodiment.
Figure 3:
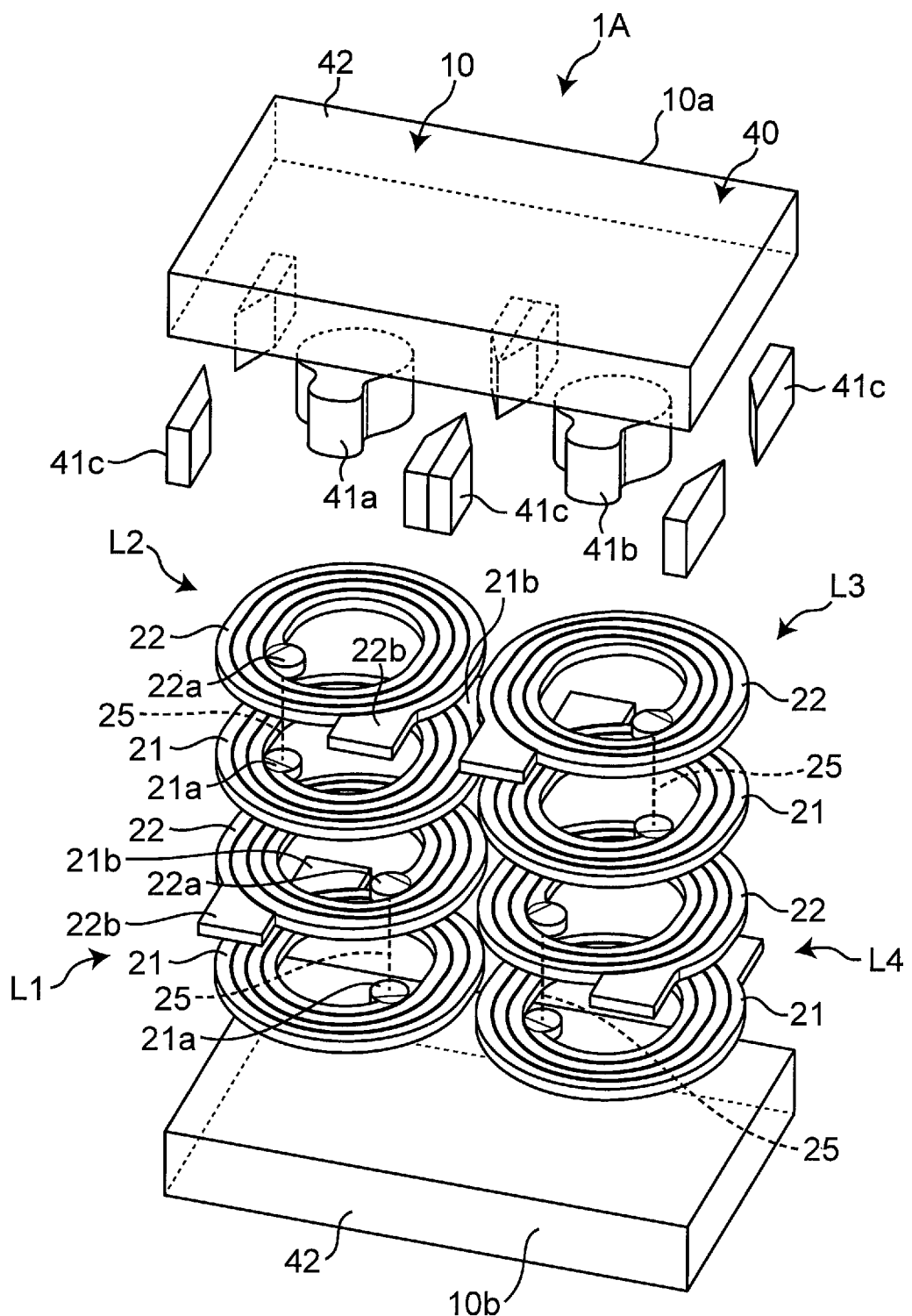
FIG. 3 is an exploded perspective view of the coil component 1A.
Figure 4:
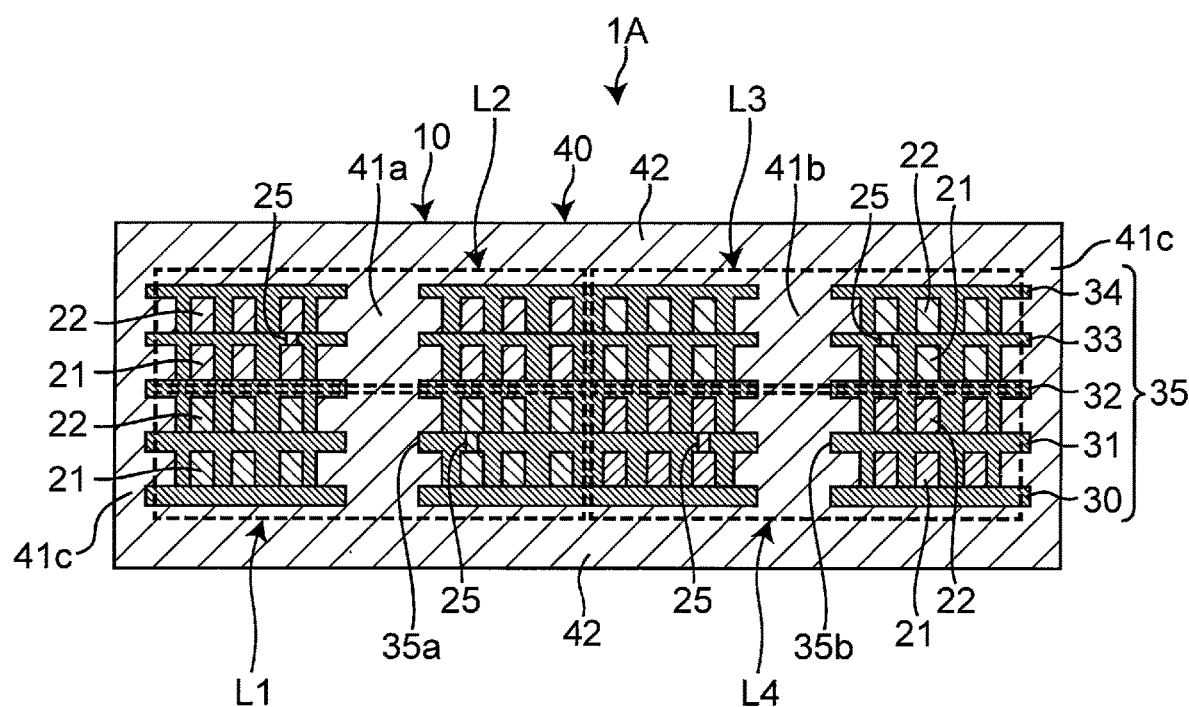
FIG. 4 is a cross-sectional view taken along 4-4 of FIG. 2.

FIG. 2 is a perspective view of a coil component 1A according to a second embodiment. FIG. 3 is an exploded perspective view of the coil component 1A. FIG. 4 is a cross-sectional view taken along 4-4 of FIG. 2. As shown in FIGS. 2, 3, and 4, the coil component 1A has an element body 10, four (2×2) first to fourth coils L1 to L4 provided in the element body 10, and first to fourth external terminals provided outside the element body 10 and electrically connected to the first to fourth coils L1 to L4. The first to fourth external terminals are made up of external terminals 11a to 14a provided on the side of a first side surface 10a of the element body 10, and external terminals 11b to 14b provided on the side of a second side surface 10b of the element body 10. The first side surface 10a and the second side surface 10b face each other, and the external terminals 11a to 14a and the external terminals 11b to 14b are respectively arranged to face each other in this order. The first to fourth external terminals 11a to 14a, 11b to 14b are, for example, metal films of Cu, Ni, Sn, etc. formed by plating on the surface of the element body 10 or screen-printed resin films containing a low electric resistance metal such as Cu, Ag, and Au.

The coil component 1A has a mounting surface that is a surface on which both the external terminals 11a to 14a and the external terminals 11b to 14b shown in FIG. 2 are disposed. In the following description, the direction orthogonal to the mounting surface is defined as the up-down direction (corresponding to the up-down direction on the plane of FIG. 4), and the mounting surface side of the coil component 1A is defined as the lower side, while the opposite surface side thereof is defined as the upper side.

The element body 10 has an insulating resin 35 covering each of the first to fourth coils L1 to L4 and a magnetic resin 40 covering the insulating resin 35. The insulating resin 35 is made up of a base insulating resin layer (insulating layer) 30 and first to fourth insulating resin layers (insulating layers) 31 to 34. The magnetic resin 40 is made up of a first magnetic resin body 41a provided in a first hole portion 35a of the insulating resin 35, a second magnetic resin body 41b provided in a second hole portion 35b of the insulating resin 35, third magnetic resin bodies 41c provided on portions of an outer circumferential surface of the insulating resin 35, and magnetic resin layers (insulating layers) 42 provided on upper and lower end surfaces of the insulating resin 35. As a result, the element body 10 has a configuration in which a plurality of the insulating layers 30 to 34, 42 is laminated in the up-down direction. Therefore, the up-down direction of this embodiment corresponds to a first direction. In this description, covering an object refers to covering at least a portion of the object, and "covering" refers to not only the case of being disposed above the object but also the case of being disposed on the side or below the object. In FIG. 3, the insulating resin 35 is not shown.

The first to fourth coils L1 to L4 are each disposed inside the element body 10 and are made up of first spiral wirings 21 and second spiral wirings 22 wound on the insulating layers 30 to 33. For each of the first to fourth coils L1 to L4, the inside of the innermost circumference of the first and second spiral wirings 21, 22 is defined as an inner diameter portion. The inner diameter portion includes a winding central axis of each of the coils L1 to L4 along the up-down direction (hereinafter sometimes simply referred to as an "axis of the coil"). The second coil L2 is laminated above the first coil L1, and the fourth coil L4 is laminated on the lateral side of, i.e., on the same insulating layer (the base insulating resin layer 30) as, the first coil L1. The third coil L3 is laminated above the fourth coil L4, and the third coil L3 is laminated on the lateral side of, i.e., on the same insulating layer (the second insulating resin layer 32) as, the second coil L2.

It is assumed that the coils arranged in the up-down direction are paired in the coil component 1A. In this case, the four coils L1 to L4 are configured to form two pairs as a set of the first coil L1 and the second coil L2 and a set of the third coil L3 and the fourth coil L4. Description will then hereinafter be made of the relationship of the magnetic coupling between paired coils and the magnetic coupling between unpaired coils.

The coil component 1A has the inner diameter portion of the first coil L1 and the inner diameter portion of the second coil L2 overlapping with each other when viewed in the up-down direction. As a result, when a magnetic flux of the first coil L1 is generated along the axis of the first coil L1 in the inner diameter portion of the first coil L1, the magnetic flux passes through the inner diameter portion of the second coil L2. When a magnetic flux of the second coil L2 is generated along the axis of the second coil L2 in the inner diameter portion of the second coil L2, the magnetic flux passes through the inner diameter portion of the first coil L1. Therefore, the first coil L1 and the second coil L2 forming a pair are strongly magnetically coupled. Although at least a portion of the inner diameter portion of the first coil L1 and at least a portion of the inner diameter portion of the second coil L2 may overlap with each other so as to acquire a strong magnetic coupling, a stronger magnetic coupling can be obtained when the axis of the first coil L1 and the axis of the second coil L2 are coaxial (the axes are coincident with each other).

Similarly, the coil component 1A has the inner diameter portion of the third coil L3 and the inner diameter portion of the fourth coil L4 overlapping with each other when viewed in the up-down direction. Therefore, the third coil L3 and the fourth coil L4 forming a pair are strongly magnetically coupled.

On the other hand, the axes of the first coil L1 and the second coil L2 and the axes of the third coil L3 and the fourth coil L4 are arranged in parallel at an interval. In particular, when viewed in the up-down direction, the inner diameter portion of the first coil L1 and the inner diameter portion of the fourth coil L4 do not overlap with each other, and the inner diameter portion of the second coil L2 and the inner diameter portion of the third coil L3 do not overlap with each other. As a result, as compared to the magnetic coupling between the first coil L1 and the second coil L2 and the magnetic coupling between the third coil L3 and the fourth coil L4 sharing the inner diameter portions, the magnetic coupling between the first coil L1 and the fourth coil L4 and the magnetic coupling between the second coil L2 and the third coil L3 are relatively weak. Although the first coil L1 and the third coil L3 as well as the second coil L2 and the fourth coil L4 are also magnetically coupled, these coils have the inner diameter portions not overlapping with each other and also have the largest inter-coil distance. Therefore, as compared to the magnetic coupling between the first coil L1 and the fourth coil L4 and the magnetic coupling between the second coil L2 and the third coil L3, the magnetic coupling between the first coil L1 and the third coil L3 and the magnetic coupling between the second coil L2 and the third coil L4 are relatively weak and may be at an almost negligible level in terms of coil characteristics, for example.

From the above, in the coil component 1A, when the coils L3, L4 other than the first coil L1 and the second coil L2 forming one of the two pairs are defined as the other coils L3, L4, the magnetic coupling between the first coil L1 and the second coil L2 is stronger than the magnetic couplings between the first coil L1 and each of the other coils L3, L4. Similarly, the magnetic coupling between the second coil L2 and the first coil L1 is stronger than the magnetic couplings between the second coil L2 and each of the other coils L3, L4. When the coils L1, L2 other than the third coil L3 and the fourth coil L4 forming one of the two pairs are defined as the other coils L1, L2, the magnetic coupling between the third coil L3 and the fourth coil L4 is stronger than the magnetic couplings between the third coil L3 and each of the other coils L1, L2. Similarly, the magnetic coupling between the fourth coil L4 and the third coil L3 is stronger than the magnetic couplings between the fourth coil L4 and each of the other coils L1, L2.

Therefore, when any coil is considered as a reference out of the first to fourth coils L1 to L4 in the coil component 1A, the magnetic coupling to a coil paired with this coil is stronger than the magnetic coupling to a coil unpaired with this coil.

Additionally, because of the symmetry of the structure of the coil component 1A, the magnetic coupling between the first coil L1 and the second coil L2 has the strength on the same level as the magnetic coupling between the third coil L3 and the fourth coil L4. The magnetic coupling between the first coil L1 and the fourth coil L4 has the strength on the same level as the magnetic coupling between the second coil L2 and the third coil L3, and the magnetic coupling between the first coil L1 and the third coil L3 has the strength on the same level as the magnetic coupling between the second coil L2 and the fourth coil L4. Therefore, in the coil component 1A, the magnetic coupling between the paired coils is stronger than any of the magnetic couplings between the unpaired coils.

In the coil component 1A, the first to fourth coils L1 to L4 are the same as each other in terms of the number of turns, the coil wiring length, and the coil cross-sectional area. As a result, deviations of the electrical characteristics (impedance, L-value, etc.) of the coils can be reduced. Additionally, in this case, since the one ends and the other ends of the coils L1 to L4 are arranged closely side-by-side, the routing of the coils L1 to L4 connected to the external terminals 11a to 14a, 11b to 14b can be minimized, so that the coil component 1A can be miniaturized. This relationship may not necessary be satisfied by all the coils L1 to L4 and, if the coils forming at least one pair are the same as each other in terms of the number of turns, the coil wiring length, and the coil cross-sectional area, the effect described above can be produced. The term "the same" allows differences on the level of manufacturing variations or errors in values of the number of turns, the coil wiring length, and the coil cross-sectional area (e.g., several % for the number of turns and the coil wiring length and about 10% for the coil cross-sectional area) and includes the case of being substantially the same.

The first coil L1 is made up of two layers of the first spiral wiring 21 wound on the base insulating resin layer 30 and the second spiral wiring 22 wound on the first insulating resin layer 31, and a via wiring 25 penetrating the first insulating resin layer 31 in the up-down direction to connect the two layers. The first spiral wiring 21 and the second spiral wiring 22 are arranged in order from the lower layer to the upper layer. The first and second spiral wirings 21, 22 are each wound and formed into a planar helical (spiral) shape. In the first coil L1, the first spiral wiring 21 is wound counterclockwise from the outer circumference toward the inner circumference, and the second spiral wiring 22 is wound counterclockwise from the inner circumference toward the outer circumference. The first and second spiral wirings 21, 22 and the via wiring 25 are made of a low electric resistance metal such as Cu, Ag, and Au, for example. Preferably, the spiral wirings with low electric resistance and narrow pitch can be formed by using Cu plating formed by a semi-additive process.

In the first coil L1, the second spiral wiring 22 is connected through the via wiring 25 to the first spiral wiring 21. Specifically, the via wiring 25 connects an inner circumferential end 21a of the first spiral wiring 21 and an inner circumferential end 22a of the second spiral wiring 22. An outer circumferential end 21b of the first spiral wiring 21 is led out toward the first side surface 10a of the element body 10 and connected to the external terminal 11a. An outer circumferential end 22b of the second spiral wiring 22 is led out toward the second side surface 10b of the element body 10 and connected to the external terminal 11b. As a result, the first coil L1 has the outer circumferential end 21b led out toward the first side surface 10a at one end and the outer circumferential end 22b led out toward the second side surface 10b at the other end and is wound counterclockwise from the one end to the other end.

The second to fourth coils L2 to L4 are similarly made up of two layers of the first spiral wiring 21 wound on the insulating layer on the lower layer side (the base insulating resin layer 30 or the second insulating resin layer 32) and the second spiral wiring 22 wound on the insulating layer on the upper layer side (the first insulating resin layer 31 or the third insulating resin layer 33), and the via wiring 25 penetrating the insulating layer on the upper layer side in the up-down direction to connect the two layers. However, in the second coil L2, the first spiral wiring 21 is wound clockwise from the outer circumference toward the inner circumference, and the second spiral wiring 22 is wound clockwise from the inner circumference toward the outer circumference. In the second coil L2, the via wiring 25 connects the inner circumferential end 21a of the first spiral wiring 21 and the inner circumferential end 22a of the second spiral wiring 22. Additionally, in the second coil L2, the outer circumferential end 21b (one end) of the first spiral wiring 21 is led out toward the first side surface 10a of the element body and connected to the external terminal 12a. The outer circumferential end 22b (the other end) of the second spiral wiring 22 is led out toward the second side surface 10b of the element body 10 and connected to the external terminal 12b. As a result, the second coil L2 is wound clockwise from the one end to the other end. The third coil L3 has the same configuration as the first coil L1, and an outer circumferential end (one end) of the first spiral wiring 21 led out toward the first side surface 10a is connected to the external terminal 13a, while an outer circumferential end (the other end) of the second spiral wiring 22 led out toward the second side surface 10b is connected to the external terminal 13b. As a result, the third coil L3 is wound counterclockwise from the one end to the other end. The fourth coil L4 has the same configuration as the second coil L2, and an outer circumferential end (one end) of the first spiral wiring 21 led out toward the first side surface 10a is connected to the external terminal 14a, while an outer circumferential end (the other end) of the second spiral wiring 22 led out toward the side surface 10b is connected to the external terminal 14b. As a result, the fourth coil L4 is wound clockwise from the one end to the other end.

As described above, in the coil component 1A, the one end (the outer circumferential end 21b) of the first coil L1 and the other end (the outer circumferential end 21b) of the second coil L2 forming a pair are led out toward the same first side surface 10a (one side) with respect to the first coil L1 and the second coil L2. The other end (the outer circumferential end 22b) of the first coil L1 and the other end (the outer circumferential end 22b) of the second coil L2 are led out toward the same second side surface 10b (the other side) with respect to the first coil L1 and the second coil L2. The first coil L1 and the second coil L2 are wound counterclockwise and clockwise, respectively, from the one end to the other end, so that the first coil L1 and the second coil L2 are wound in different directions. Therefore, the first coil L1 and the second coil L2 are wound such that the respective magnetic fluxes cancel each other when a current flows from the one end to the other end. This means that when the first coil L1 and the second coil L2 have the one ends both set on the input side of the pulse signals and the other sides both set on the output side of the pulse signals, the first coil L1 and the second coil L2 are negatively coupled.

Thus, when the coil component 1A is used for a multi-phase SW regulator, the ripple current of the first coil L1 and the second coil L2 can be reduced by inputting the signals having the phase difference of 180° to the one ends of the first coil L1 and the second coil L2 on the same side. In other words, when the pulse signals are input such that the first coil L1 and the second coil L2 are negatively coupled, the input sides (one ends) and the output sides (the other ends) of the first coil L1 and the second coil L2 can be arranged on the same respective sides. As a result, the wiring routing can be facilitated on a board on which the coil component 1A is mounted.

In the coil component 1A, the third coil L3 and the fourth coil L4 forming a pair have the same configuration as the first coil L1 and the second coil L2. Therefore, when the pulse signals are input such that the third coil L3 and the fourth coil L4 are negatively coupled in the coil component 1A, the input sides and the output sides of the third coil L3 and the fourth coil L4 can be arranged on the same respective sides. As a result, the wiring routing can be facilitated on the board on which the coil component 1A is mounted.

Additionally, in the coil component 1A, all the first to fourth coils L1 to L4 have the one ends and the other ends led out toward the same sides. As a result, when the pulse signals are input such that all the paired coils are negatively coupled in the coil component 1A, the input sides and the output sides of the coils L1 to L4 can be arranged on the same respective sides. As a result, the wiring routing can further be facilitated on the board on which the coil component 1A is mounted.

In the above description, the outer circumferential end 21b and the outer circumferential end 22b are described as one end (the input side of the pulse signal) and the other end (the output side of the pulse signal), respectively; however, because of the symmetry of the coil component 1A, the outer circumferential end 22b and the outer circumferential end 21b may be defined as one end and the other end, respectively.

The base insulating resin layer 30 and the first to fourth insulating resin layers 31 to 34 are arranged in order from the lower layer to the upper layer. The material of the insulating resin layers 30 to 34 is, for example, a single material that is an organic insulating material made of an epoxy resin, bismaleimide, liquid crystal polymer, polyimide, etc., or is an insulating material comprising a combination with an inorganic filler material such as a silica filler and an organic filler made of a rubber material. Preferably, all the insulating resin layers 31 to 34 are made of the same material. In this embodiment, all the insulating resin layers 30 to 34 are made of a composite material of a silica filler (insulator powder) and an epoxy resin. When the insulating layers (the insulating resin layers 30 to 34) in contact with the spiral wirings 21, 22 are made of the composite material of the insulator powder and the resin in this way, the insulation can further be improved in the spiral wirings 21, 22 and between the spiral wirings 21, 22.

The first insulating resin layer 31 is laminated on the base insulating resin layer 30 to cover the first spiral wirings 21 of the first and fourth coils L1, L4. The second insulating resin layer 32 is laminated on the first insulating resin layer 31 to cover the second spiral wirings 22 of the first and fourth coils L1, L4.

The third insulating resin layer 33 is laminated on the second insulating resin layer 32 to cover the first spiral wirings 21 of the second and third coils L2, L3. The fourth insulating resin layer 34 is laminated on the third insulating resin layer 33 to cover the second spiral wirings 22 of the second and third coils L2, L3.

The via wirings 25 of the coils L1 to L4 are arranged so as not to overlap when viewed in the up-down direction. The via wirings 25 are disposed at positions where the thickness of the element body 10 along the up-down direction tends to vary due to variations in amount of filling of the via wirings 25 into the insulating resin layers and, therefore, by arranging such positions so as not to overlap with each other, the variations in the thickness of the element body 10 can be reduced. Additionally, the via wirings 25 of the first coil L1 and the second coil L2 are preferably arranged to be line-symmetrical with respect to a straight line passing through the winding center of the first and second coils L1, L2 when viewed in the up-down direction and orthogonal to the first and second side surfaces 10a, 10b. As a result, the shapes of the first and second coils L1, L2 forming a pair can be made symmetrical and the coil component 1A can be manufactured such that the electrical characteristics of the coils become uniform. The via wirings 25 of the third coil L3 and the fourth coil L4 can be arranged in the same positional relationship to acquire the effect described above also from the third and fourth coils L3, L4.

The outer circumferential ends 21b of the first spiral wirings 21 of the first to fourth coils L1 to L4 are arranged in order along a long-side direction (a direction perpendicular to the up-down direction) of the first side surface 10a. Therefore, the external terminals 11a to 14a on the side of the first side surface 10a are arranged in order along the long-side direction of the first side surface 10a.

The outer circumferential ends 22b of the second spiral wirings 22 of the first to fourth coils L1 to L4 are arranged in order along a long-side direction (a direction perpendicular to the up-down direction) of the second side surface 10*b*. Therefore, the external terminals 11*b* to 14*b* on the side of the first side surface 10*a* are arranged in order along the long-side direction of the second side surface 10*b*.

In this way, first external terminals 11 connected to the first coil L1 and second external terminals 12 connected to the second coil L2 are arranged adjacent to each other, and the third external terminals 13 connected to the third coil L3 and the fourth external terminals 14 connected to the fourth coil L3 are arranged adjacent to each other. In the coil component 1A, the first coil L1 and the second coil L2 forming a pair are arranged in the up-down direction, and the outer circumferential ends 21*b*, 22*b* thereof are located relatively close to each other. Therefore, since the first external terminals 11 and the second external terminals 12 connected to the outer circumferential ends 21*b*, 22*b* are located relatively close to each other, the routing of wirings connected to the external terminals 11, 12 of the first coil L1 and the second coil L2 can be made shorter. Since the third coil L3 and the fourth coil L4 forming a pair have the same configuration, the routing of wirings connected to the respective external terminals 13, 14 can also be made shorter. As a result, the outer shape of the coil component 1A can be miniaturized. In the coil component 1A, the arrangement order of the external terminals 11*a* to 14*a* on the first side surface 10*a* is identical to the arrangement order of the external terminals 11*b* to 14*b* on the second side surface 10*b*. As a result, the arrangement order of wirings on the input side can be made identical to the arrangement order of wirings on the output side on the board on which the coil component 1A is mounted, so that the mounting is facilitated. Therefore, the small and easily-mountable coil component 1A can be provided.

When the first coil L1 and the second coil L2 are each made up of a plurality of the spiral wirings 21 wound on a plurality of the insulating layers (the insulating resin layers 30, 31 or the insulating resin layers 32, 33) as in the case of the coil component 1A, preferably, the shortest distance between the first coil L1 and the second coil L2 is longer than the shortest distance between the spiral wirings 21, 22 in each of the first coil L1 and the second coil L2. As a result, in a combination of pulse signals capable of reducing the ripple current of the coils L1, L2, the insulation can relatively be increased between the first coil L1 and the second coil L2 to which different voltages are applied for a relatively long period, so that the reliability of the coil component 1A can be improved. The same applies to the third coil L3 and the fourth coil L4.

Additionally, when the spiral wirings (e.g., the first spiral wirings 21) of a plurality of coils (e.g., the first coil L1 and the fourth coil L4) are wound on the same insulating layer (e.g. the base insulating resin layer 30) as in the case of the coil component 1A, preferably, the wiring interval between the spiral wirings (e.g., the interval between the spiral wirings 21 of the first coil L1 and the fourth coil L4) is longer than the wiring interval in the spiral wirings. As a result, the insulation can relatively be increased between the spiral wirings wound on the same insulating layer in the adjacent coils having a period in which different voltages are applied, so that the reliability can be improved.

The insulating resin 35 has the first hole portion 35*a* around the axes of the first coil L1 and the second coil L2 and the second hole portion 35*b* around the axes of the third coil L3 and the fourth coil L4.

The magnetic resin 40 is made of a composite material of a magnetic powder and a resin. The magnetic powder is, for example, a metal magnetic material composed of FeSi-, FeCo-, or FeAl-based alloy or amorphous, and the resin is, for example, a resin material such as epoxy. Therefore, in the coil component 1A, the insulating layers on both sides in the up-down direction with respect to the spiral wirings 21, 22 of the first to fourth coils L1 to L4 include the magnetic resin layers 42 made of the composite material of the magnetic powder and the resin. As a result, the density of the magnetic fluxes generated by the first to fourth coils L1 to L4 is improved by the magnetic resin layers 42, which makes it possible to inexpensively provide the coil component 1A capable of ensuring appropriate inductance and coupling coefficient while being small and thin.

For all the first to fourth coils L1 to L4, the coil component 1A further includes the magnetic resin bodies 41*a*, 41*b* provided in the inner diameter portions (the first and second hole portions 35*a*, 35*b*) of the coils L1 to L4 and the magnetic resin bodies 41*c* provided outside the outermost circumferences of the spiral wirings 21, 22 of the coils L1 to L4. The magnetic resin bodies 41*a*, 41*b*, 41*c* are made of the composite material of the magnetic powder and the resin as described above. The coil component 1A has respective closed magnetic circuits configured by connecting the magnetic resin layers 42 and the magnetic resin bodies 41*a*, 41*c* for the first and second coils L1, L2 and by connecting the magnetic resin layers 42 and the magnetic resin bodies 41*b*, 41*c* for the third and fourth coils L3, L4. This makes it possible to reduce leakage magnetic fluxes from the coils L1 to L4 and suppress noises and also makes it possible to strengthen the magnetic coupling between the coils L1, L2 and the magnetic coupling between the coils L3, L4 forming a pair while weakening the magnetic couplings between the other unpaired coils.

The average particle diameter of the magnetic powder is preferably 0.5 μm or more and 100 μm or less and, as a result, the magnetic resin can be formed into a small core. Additionally, the magnetic powder is preferably contained in an amount of 50 vol. % or more and 85 vol. % or less relative to the resin and, as a result, a sufficient magnetic permeability can be acquired, so that the magnetic couplings of the paired coils can be strengthened.

For improvement of the characteristics (inductance value and superposition characteristics) of the coil component 1A, it is desirable to contain the magnetic powder in an amount of 70 vol. % or more and, for improvement of a filling property of the magnetic resin 40, it is more desirable to mix two or more types of magnetic powder different in particle size distribution. Additionally, to reliably fill the magnetic powder into the first and second hole portions 35*a*, 35*b* of the insulating resin 35, the average particle diameter of the magnetic powder is desirably smaller than the first and second hole portions 35*a*, 35*b* and is preferably 40 μm or less. If the use of the coil component 1A is associated with a high usage frequency, for example, 40 MHz or more, the magnetic powder may be a single magnetic filler having a particle size distribution with an average particle diameter of 1 μm or less.

In the coil component 1A, as shown in FIG. 3, preferably, the third magnetic resin body 41*c* is not filled in a portion having the minimum distance between the first coil L1 and the fourth coil L4. As a result, the coupling between the first coil L1 and the fourth coil L4 can be made relatively weak. The magnetic resin 40 is made of a resin containing metal and is inferior in voltage endurance as compared to the insulating resin 35 and, therefore, if it is attempted to fill the magnetic resin 40 in the minimum distance between the first coil L1 and the fourth coil L4, the first coil L1 and the fourth coil L4 must sufficiently be separated from each other from the viewpoint of reliability, which makes the outer shape size of the coil component 1A larger. Therefore, the absence of the third magnetic resin body 41c filled into the portion having the minimum distance between the first coil L1 and the fourth coil L4 can improve the reliability of the coil component 1A in the same outer shape. The same applies to the portion between the second coil L2 and the third coil L3.

In an example of the coil component 1A, the thickness of the spiral wirings 21, 22 is 45 µm; the width of the spiral wirings 21, 22 is 60 µm; the wiring interval in the spiral wirings 21, 22 is 10 µm; and the thickness of the insulating resin between the spiral wiring 21 and the spiral wiring 22 is 10 µm. The outer shape size of the coil component 1A is 2.0 mm in width×1.2 mm in depth×0.85 mm in height; the inductance value of the coils L1 to L4 of the coil component 1A is 74 nH; and the coupling coefficient between the paired coils is 0.8.

A method of manufacturing the coil component 1A will be described with reference to FIGS. 5A to 5R.

Figure 5A:
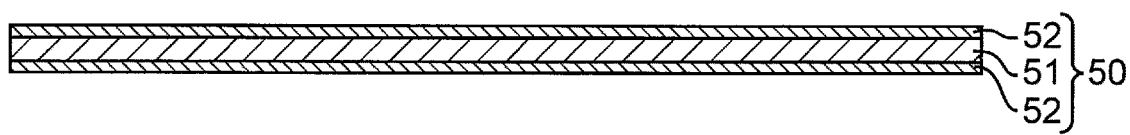
FIG. 5A is an explanatory view for explaining a manufacturing method of the coil component 1A.

As shown in FIG. 5A, a base 50 is prepared. The base 50 has an insulating substrate 51 and base metal layers 52 disposed on both sides of the insulating substrate 51. In this embodiment, the insulating substrate 51 is a glass epoxy substrate and the base metal layers 52 are Cu foils and have main surfaces that are smooth surfaces.

Figure 5B:
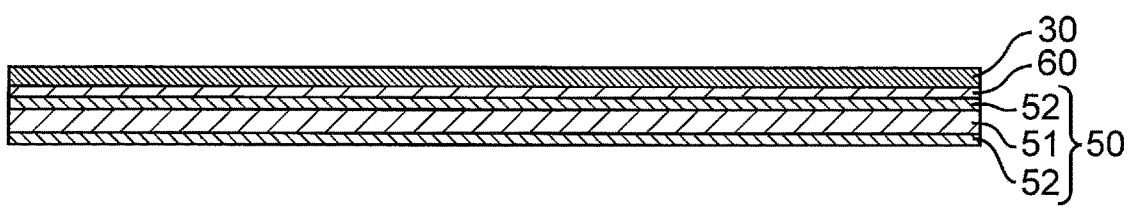
FIG. 5B is an explanatory view for explaining the second embodiment of the manufacturing method of the coil component 1A.

As shown in FIG. 5B, a dummy metal layer 60 is bonded onto a surface of the base 50. In this embodiment, the dummy metal layer 60 is a Cu foil. Since the dummy metal layer 60 is bonded to the base metal layer 52 of the base 50, the dummy metal layer 60 is bonded to the smooth surface of the base metal layer 52. Therefore, an adhesion force can be made weak between the dummy metal layer 60 and the base metal layer 52 and, at a subsequent step, the base 50 can easily be peeled from the dummy metal layer 60. Preferably, an adhesive bonding the base 50 and the dummy metal layer 60 is an adhesive with low tackiness. For weakening of the adhesion force between the base 50 and the dummy metal layer 60, it is desirable that the bonding surfaces of the base 50 and the dummy metal layer 60 are glossy surfaces.

Subsequently, the base insulating resin 30 is laminated on the dummy metal layer 60 temporarily bonded to the base 50. In this case, the base insulating resin 30 is laminated by a vacuum laminator and is then thermally cured.

Figure 5C:
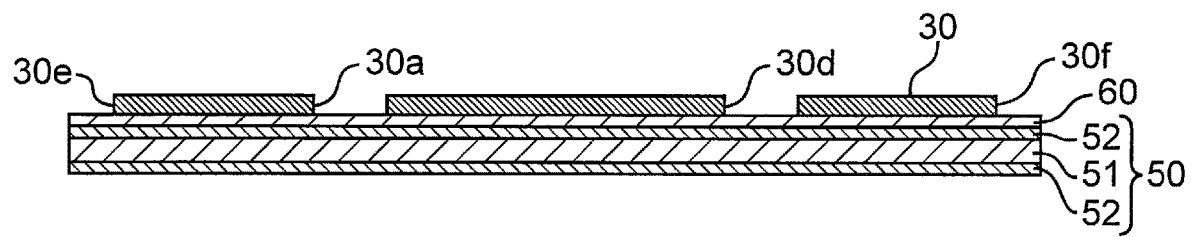
FIG. 5C is an explanatory view for explaining the second embodiment of the manufacturing method of the coil component 1A.

As shown in FIG. 5C, through-holes 30a, 30d, 30e, 30f are formed in portions of the base insulating resin layer 30 to expose the dummy metal layer 60. The through-holes 30a, 30d, 30e, 30f are formed by laser processing and the through-hole 30a, the through-hole 30d, and the through-holes 30e, 30f are formed in places to be filled with the magnetic resin body 41a, the magnetic resin body 41b, and the magnetic resin body 41c, respectively.

Figure 5D:
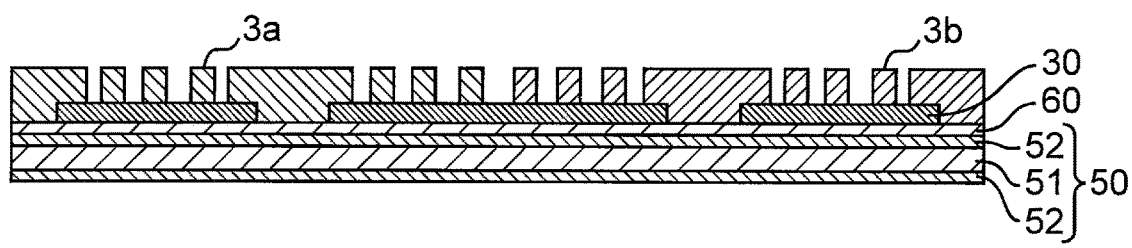
FIG. 5D is an explanatory view for explaining the second embodiment of the manufacturing method of the coil component 1A.

As shown in FIG. 5D, a first spiral wiring layer 3a and a first spiral wiring layer 3b are formed on the base insulating resin layer 30 surrounding the through-holes 30a, 30d. In this case, the first spiral wiring layers 3a, 3b are formed at the same time by the semi-additive process. The first spiral wiring layer 3a constitutes the first spiral wiring 21 of the first coil L1 and the first spiral wiring layer 3b constitutes the first spiral wiring 21 of the fourth coil L4. In this process, the wiring layers are also formed in the through-holes 30a, 30d, 30e, 30f and on the base insulating resin layer 30 around the through-holes.

Figure 5E:
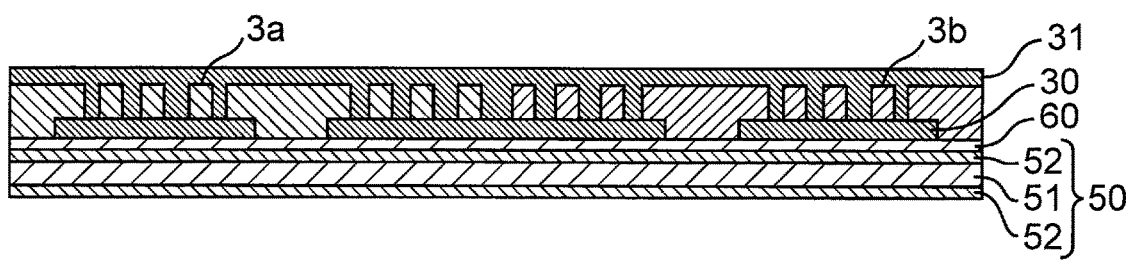
FIG. 5E is an explanatory view for explaining the second embodiment of the manufacturing method of the coil component 1A.

As shown in FIG. 5E, the first spiral wiring layers 3a, 3b are covered with the first insulating resin layer 31. In this case, the first insulating resin layer 31 is laminated on the base insulating resin layer 30 by a vacuum laminator and is then thermally cured.

Figure 5F:
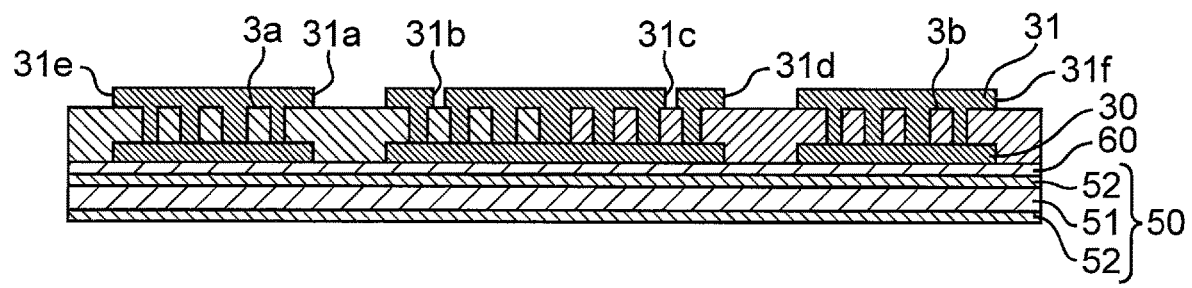
FIG. 5F is an explanatory view for explaining the second embodiment of the manufacturing method of the coil component 1A.

As shown in FIG. 5F, through-holes 31a, 31d, 31e, 31f and via holes 31b, 31c are formed in the first insulating resin layer 31 by laser processing. The through-holes 31a, 31d, 31e, 31f are formed in the first insulating resin layer 31 above the through-holes 30a, 30d, 30e, 30f, respectively.

The via holes 31b, 31c are formed at positions where the first spiral wiring layers 3a, 3b are electrically connected in series to second wiring layers subsequently formed, specifically, in the first insulating resin layer 31 on the portions serving as the inner circumferential ends 21a of the first spiral wirings 21. The through-holes 31a, 31d, 31e, 31f and the via holes 31b, 31c can be processed at the same time to simplify the step.

Figure 5G:
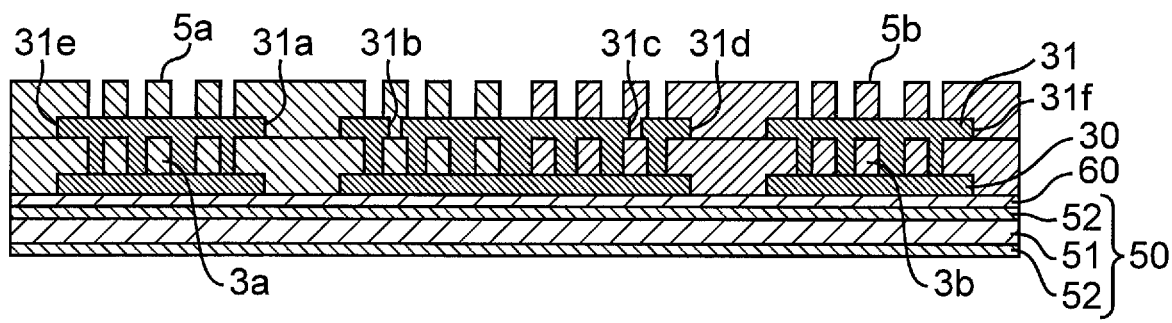
FIG. 5G is an explanatory view for explaining the second embodiment of the manufacturing method of the coil component 1A.

As shown in FIG. 5G, second spiral wiring layers 5a, 5b are formed on the first insulating resin layer 31 surrounding the through-holes 31a, 31d by the same semi-additive process as the first spiral wiring layers 3a, 3b. In this process, a portion of the second spiral wiring layer 5a is filled into the via hole 31b to form a portion serving as the via wiring 25 to electrically connect the first spiral wiring layer 3a and the second spiral wiring layer 5a. Similarly, the second spiral wiring layer 5b forms a portion serving as the via wiring 25 in the via hole 31c to electrically connect the first spiral wiring layer 3b. The second spiral wiring layers 5a, 5b constitute the second spiral wirings 22 of the first coil L1 and the fourth coil L4, respectively. As a result, the first coil L1 and the fourth coil L4 can be formed. In this process, the wiring layers are also formed in the through-holes 31a, 31d, 31e, 31f and on the first insulating resin layer 31 around the through-holes.

Figure 5H:
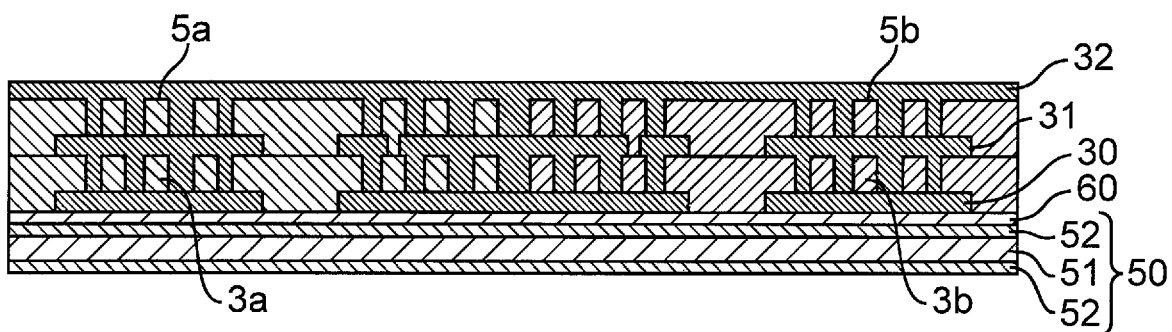
FIG. 5H is an explanatory view for explaining the second embodiment of the manufacturing method of the coil component 1A.

As shown in FIG. 5H, the second spiral wiring layers 5a, 5b are covered with the second insulating resin layer 32. In this case, the second insulating resin layer 32 is laminated on the first insulating resin layer 31 by a vacuum laminator and is then thermally cured.

Figure 5I:
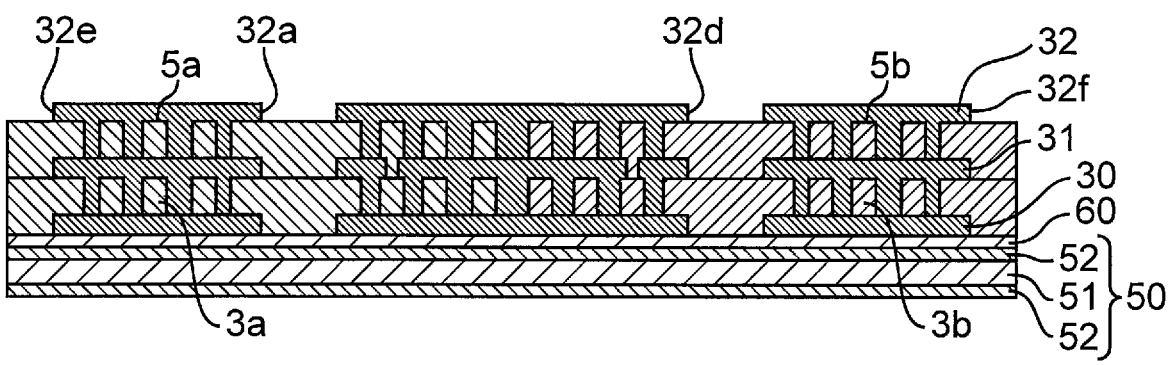
FIG. 5I is an explanatory view for explaining the second embodiment of the manufacturing method of the coil component 1A.

As shown in FIG. 5I, through-holes 32a, 32d, 32e, 32f are formed in the second insulating resin layer 32 by laser processing. The through-holes 32a, 32d, 32e, 32f are formed in the second insulating resin layer 32 above the through-holes 31a, 31d, 31e, 31f, respectively.

Figure 5J:
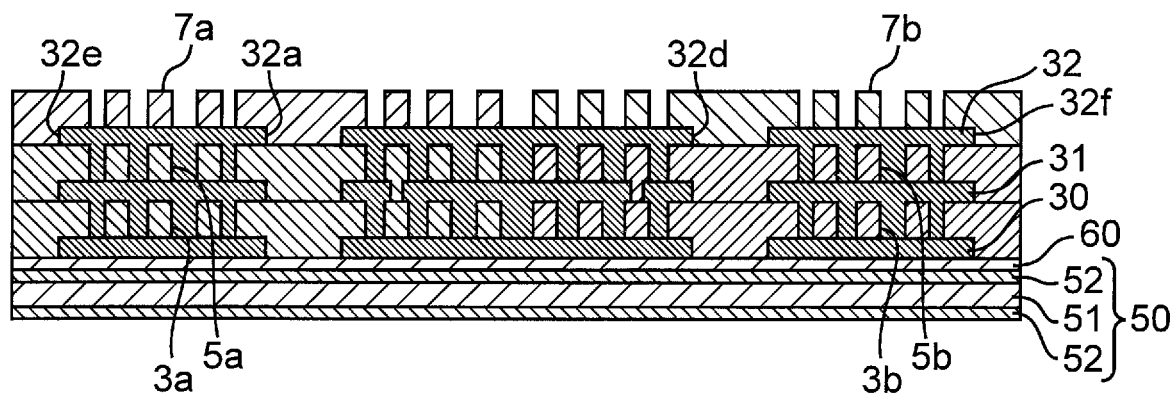
FIG. 5J is an explanatory view for explaining the second embodiment of the manufacturing method of the coil component 1A.

As shown in FIG. 5J, a first spiral wiring layer 7a and a first spiral wiring layer 7b are formed on the second insulating resin layer 32 surrounding the through-holes 32a, 32d by the same semi-additive process as the first spiral wiring layer 3a. The first spiral wiring layers 7a, 7b constitute the first spiral wirings 21 of the second coil L2 and the third coil L3, respectively. In this process, the wiring layers are also formed in the through-holes 32a, 32d, 32e, 32f and on the second insulating resin layer 32 around the through-holes.

Figure 5K:
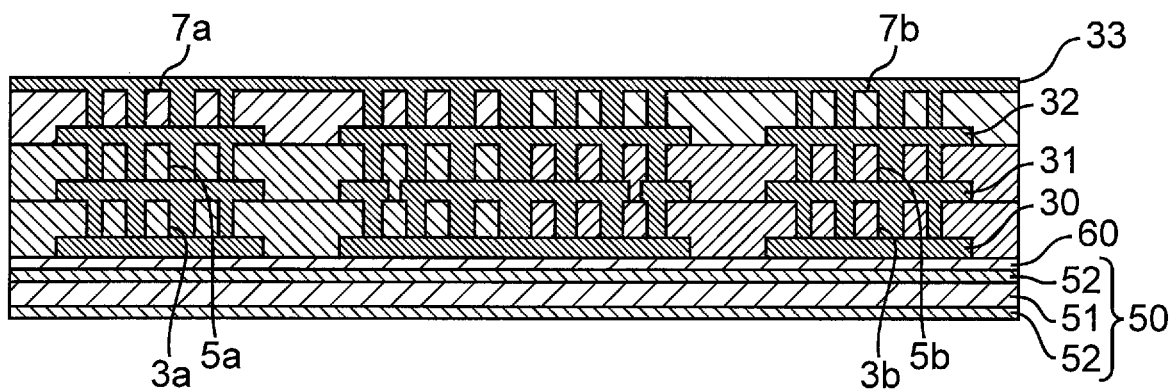
FIG. 5K is an explanatory view for explaining the second embodiment of the manufacturing method of the coil component 1A.

As shown in FIG. 5K, the first spiral wiring layers 7a, 7b are covered with the third insulating resin layer 33. In this case, the third insulating resin layer 33 is laminated on the second insulating resin layer 32 by a vacuum laminator and is then thermally cured.

Figure 5L:
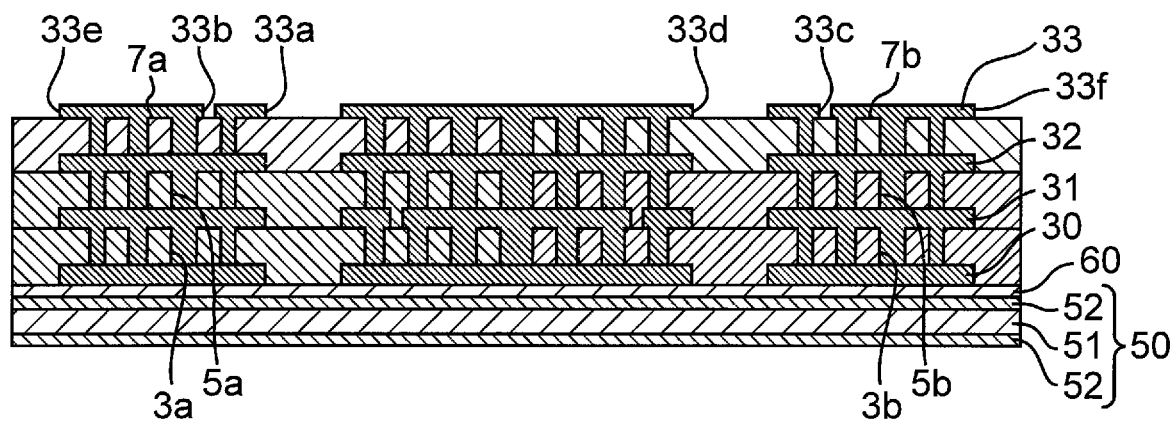
FIG. 5L is an explanatory view for explaining the second embodiment of the manufacturing method of the coil component 1A.

As shown in FIG. 5L, through-holes 33a, 33d, 33e, 33f and via holes 33b, 33c are formed in the third insulating resin layer 33 by laser processing. The through-holes 33a, 33d, 33e, 33f are formed in the third insulating resin layer 33 above the through-holes 32a, 32d, 32e, 32f, respectively. The via holes 33b, 33c are formed at positions where the first spiral wiring layers 7a, 7b are electrically connected in series to wiring layers subsequently formed, specifically, in the third insulating resin layer 33 on the portions serving as the inner circumferential ends 21a of the first spiral wirings 21.

Figure 5M:
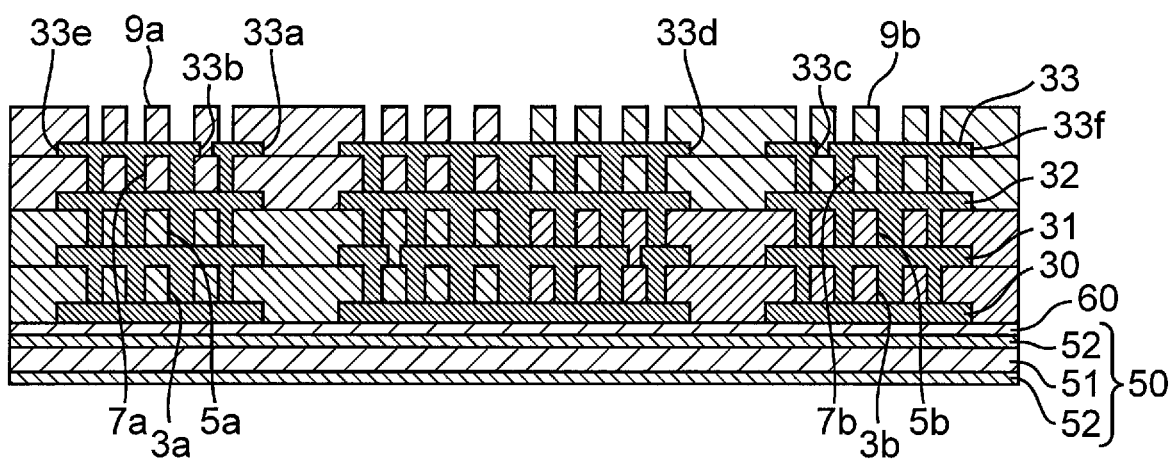
FIG. 5M is an explanatory view for explaining the second embodiment of the manufacturing method of the coil component 1A.

As shown in FIG. 5M, second spiral wiring layers 9a, 9b are formed on the third insulating resin layer 33 surrounding the through-holes 33a, 33d by the same semi-additive process as the first spiral wiring layers 7a, 7b. In this process, a portion of the second spiral wiring layer 9a is filled into the via hole 33b to form a portion serving as the via wiring 25 to electrically connect the first spiral wiring layer 7a and the second spiral wiring layer 9a. Similarly, the second spiral wiring layer 9b forms a portion serving as the via wiring 25 in the via hole 33c to electrically connect the first spiral wiring layer 7b. The second spiral wiring layers 9a, 9b constitute the second spiral wirings 22 of the second coil L2 and the third coil L3, respectively. As a result, the second coil L2 and the third coil L3 can be formed. In this process, the wiring layers are also formed in the through-holes 33a, 33d, 33e, 33f and on the third insulating resin layer 33 around the through-holes.

Figure 5N:
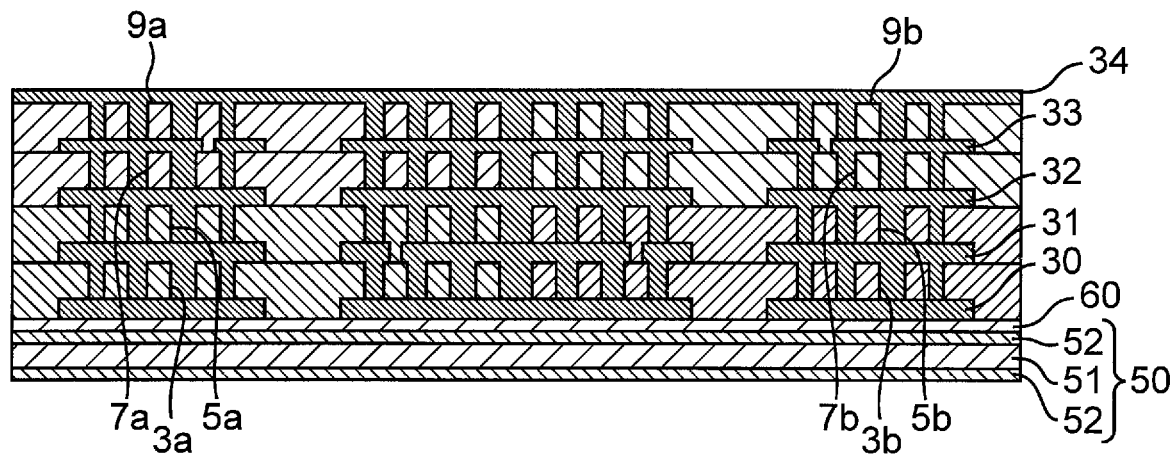
FIG. 5N is an explanatory view for explaining the second embodiment of the manufacturing method of the coil component 1A.

As shown in FIG. 5N, the second spiral wiring layers 9a, 9b are covered with the fourth insulating resin layer 34. In this case, the fourth insulating resin layer 34 is laminated on the third insulating resin layer 33 by a vacuum laminator and is then thermally cured.

Figure 5O:
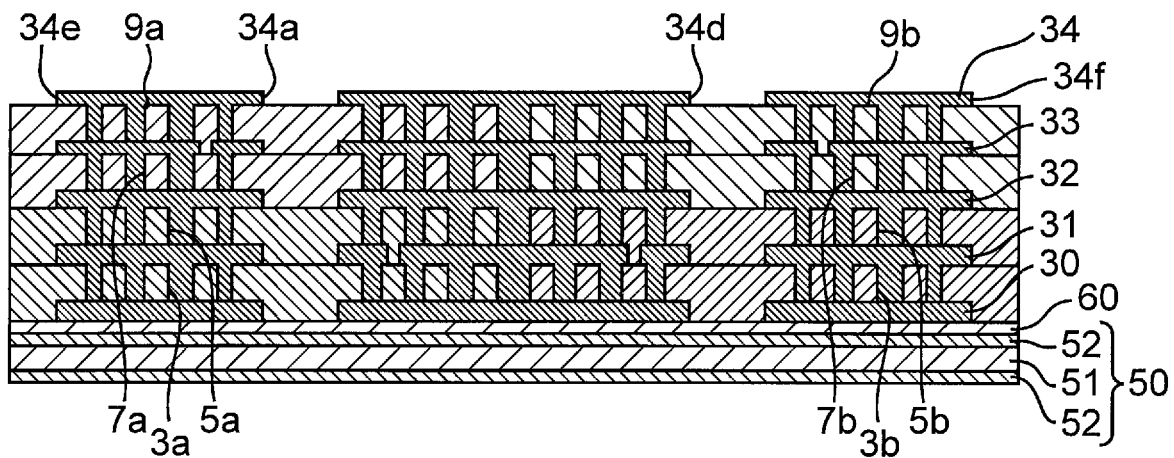
FIG. 5O is an explanatory view for explaining the second embodiment of the manufacturing method of the coil component 1A.

As shown in FIG. 5O, through-holes 34a, 34d, 34e, 34f are formed in the fourth insulating resin layer 34 by laser processing. The through-holes 34a, 34d, 34e, 34f are formed in the fourth insulating resin layer 34 above the through-holes 33a, 33d, 33e, 33f, respectively.

Figure 5P:
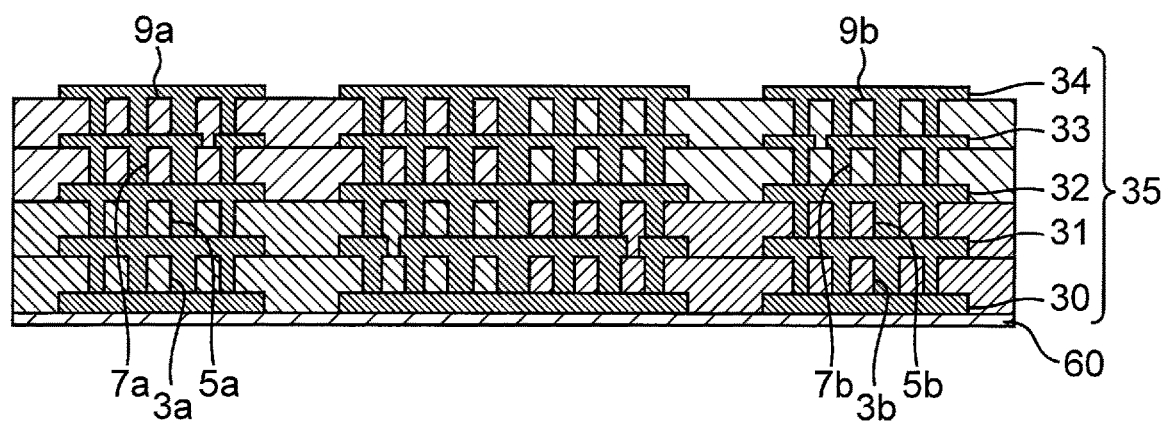
FIG. 5P is an explanatory view for explaining the second embodiment of the manufacturing method of the coil component 1A.

As shown in FIG. 5P, the base 50 is peeled off from the dummy metal layer 60 on the bonding plane between one surface of the base 50 (the base metal layer 52) and the dummy metal layer 60.

Figure 5Q:
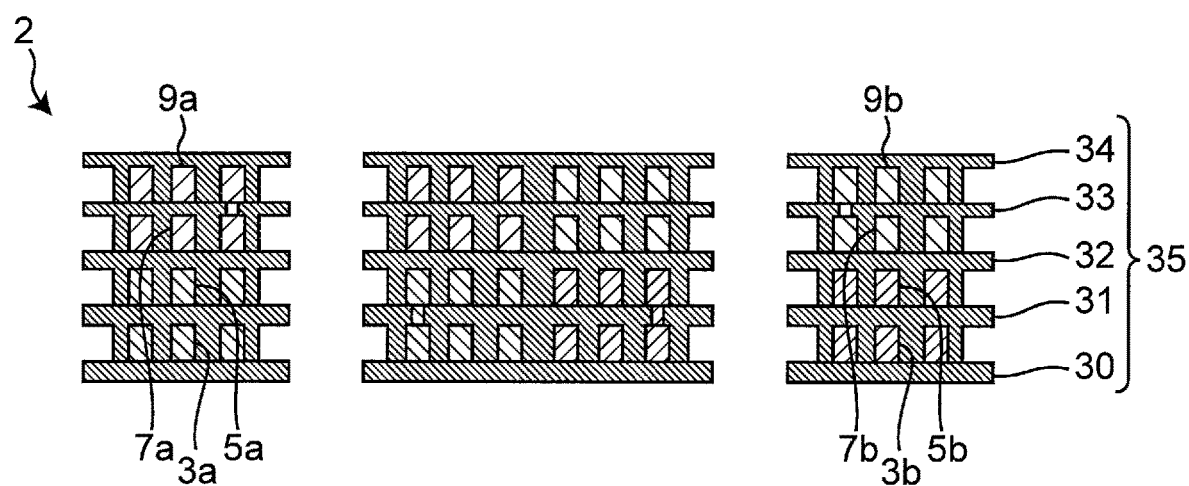
FIG. 5Q is an explanatory view for explaining the second embodiment of the manufacturing method of the coil component 1A.

As shown in FIG. 5Q, the dummy metal layer 60 is removed by etching. In this process, the wiring layers provided in the through-holes 30a to 34a, 30d to 34d, 30e to 34e, 30f to 31f of the respective insulating resin layers 30 to 34 are etched at the same time, so that spaces forming the inner and outer magnetic paths of the coils are formed. In this way, a coil substrate 2 having the coils L1 to L4 is formed.

Figure 5R:
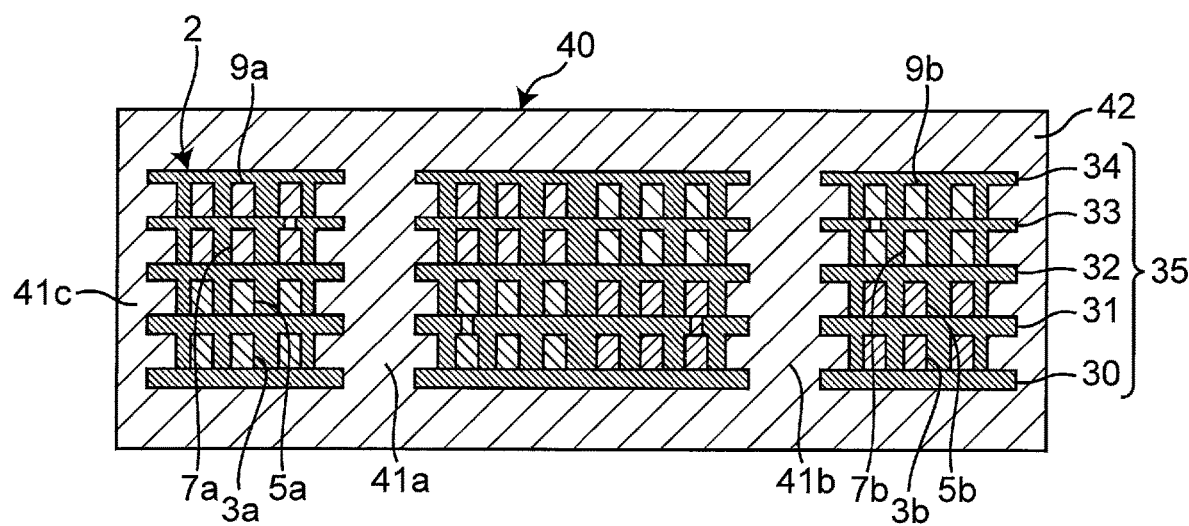
FIG. 5R is an explanatory view for explaining the second embodiment of the manufacturing method of the coil component 1A.

As shown in FIG. 5R, a plurality of sheets molded from the composite material of the magnetic powder and the resin is disposed on both the upper and lower sides of the coil substrate 2, heated and press-bonded by a vacuum laminator or a vacuum press machine, and subsequently subjected to a cure treatment. In this process, the composite material is filled into the spaces forming the inner and outer magnetic paths to form the magnetic resin 40 including the magnetic resin bodies 41a, 41b corresponding to the inner magnetic paths and the magnetic resin layer 42 corresponding to the outer magnetic path. Subsequently, a dicer etc. are used for cutting into individual pieces. In this case, the portions of the first and second spiral wiring layers 3a, 3b, 5a, 5b, 7a, 7b, 9a, 9b corresponding to the outer circumferential ends 21b, 22b of the first and second spiral wirings 21 are exposed on cut surfaces. Additionally, by forming the external terminals 11a to 14a, 11b to 14b such that the external terminals are connected to the wiring layers exposed on the cut surfaces, the coil component 1A shown in FIG. 2 can be acquired.

Although the coil substrate 2 is formed on one surface of both sides of the base 50 in the above description, the coil substrate 2 may be formed on each of both sides of the base 50. Although the one coil substrate 2 is formed on one surface of the base 50 in the above description, a plurality of the coil substrates 2 may be formed in a matrix on one surface of the base 50 and then divided into individual pieces to form a plurality of the coil components 1A at the same time. With these methods, high productivity can be achieved. The manufacturing methods described above are merely examples of the manufacturing method of the coil component 1A, and other known methods and techniques may be applied as long as a similar configuration can be acquired.

According to the coil component 1A, the magnetic coupling between the first coil L1 and the second coil L2 forming a pair is stronger than the magnetic couplings between the first coil L1 and each of the third and fourth coils L3, L4 not forming a pair. Therefore, as is the case with the coil component 1 according to the first embodiment, when the coil component 1A is used for a multi-phase SW regulator, the ripple current of the first coil L1 can be reduced by properly selecting the pulse signals input to the coils L1 to L4.

When any coil is considered as a reference out of the first to fourth coils L1 to L4 in the coil component 1A, the magnetic coupling to a coil pared with this coil is stronger than the magnetic coupling to a coil unpaired with this coil. Therefore, as is the case with the coil component 1 according to the first embodiment, when the coil component 1A is used for a multi-phase SW regulator, the ripple current of the first to fourth coils L1 to L4 can be reduced by properly selecting the pulse signals input to the coils L1 to L4.

To properly select the pulse signals so as to reduce the ripple current of the first to fourth coils L1 to L4, for example, a signal having a phase difference of 180° as compared to the signal input to the first coil L1 may be input to the second coil L2; a signal having a phase difference of 90° as compared to the signal input to the first coil L1 may be input to the third coil L3; and a signal having a phase difference of 270° as compared to the signal input to the first coil L1 may be input to the fourth coil L4.

In the coil component 1A, the first external terminal 11 connected to the first coil L1 and the second external terminal 12 connected to the second coil L2 are adjacent to each other, and the third external terminal 13 connected to the third coil L3 and the fourth external terminal 14 connected to the fourth coil L4 are adjacent to each other. In the coil component 1A, due to the relationship of strength of the magnetic coupling, the interval between the first coil L1 and the second coil L2 is shorter than the interval between the first coil L1 and the other coils L3, L4, and the first coil L1 and the second coil L2 are closely disposed. Therefore, since the first and second external terminals 11, 12 connected to the paired coils L1, L2 closely disposed are adjacent to each other, the routing between the coils L1, L2 and the external terminals 11, 12 can be reduced in the coil component 1A. As a result, the coil component 1A can be miniaturized. Since the third and fourth external terminals 13, 14 connected to the third and fourth coils L3, L4 forming the other pair have the same configuration in the coil component 1A, the coil component 1A can further be miniaturized.

Description will hereinafter be made of the fact that the ripple current of the coils L1 to L4 can actually be reduced based on the evaluation conducted by using an example of the coil component 1A by the present inventors.

Figure 6:
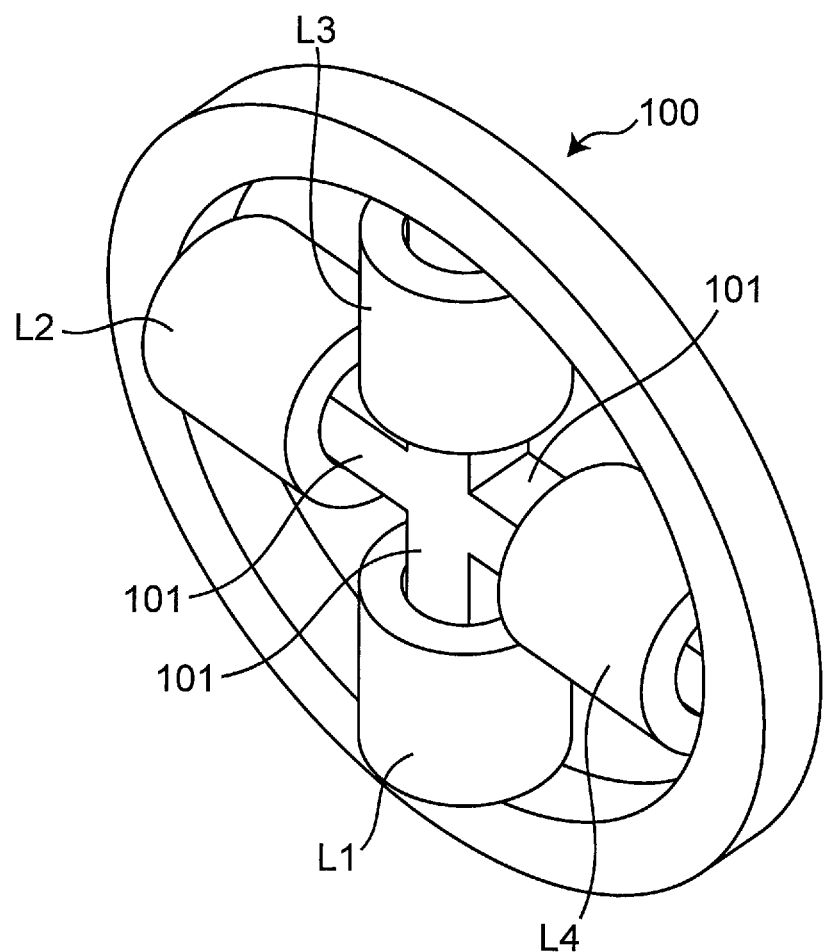
FIG. 6 is a perspective view of a coil component of a comparison example 2.

Table 1 shows configurations, evaluation conditions, and evaluation results of the present example and comparison examples 1, 2. Both the present example and the comparison examples 1, 2 have four coils L1 to L4 as a coil component. The coils L1 to L4 each have the inductance value of 1 pH. The present example has the configuration of the coil component 1A shown in FIGS. 2 to 4, and the coil L1 and the coil L2 as well as the coil L3 and the coil L4 are configured to form respective pairs. The comparison example 1 is a coil component in which the four coils L1 to L4 are not magnetically coupled to each other. The comparison example 2 has the configuration of the coil component described in U.S. Pat. No. 6,362,986 and, specifically, has a configuration in which four coils L1 to L4 are respectively wound around four spokes 101 of a wheel type core 100 as shown in FIG. 6.

Figure 7A:
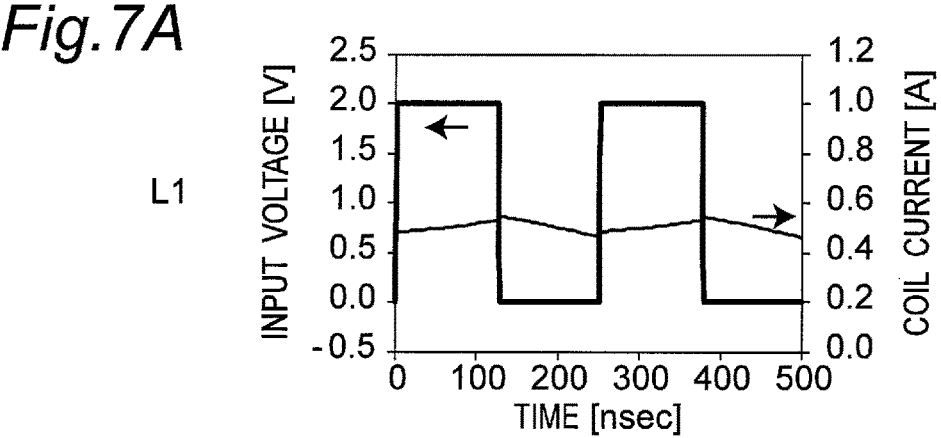
FIG. 7A is a graph of a relationship between an input voltage and a current of a first coil L1 in a present example.
Figure 7B:
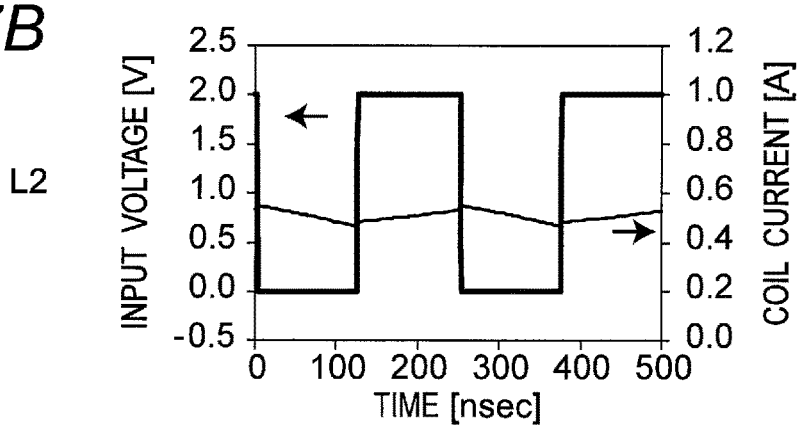
FIG. 7B is a graph of a relationship between an input voltage and a current of a second coil L2 in a present example.
Figure 7C:
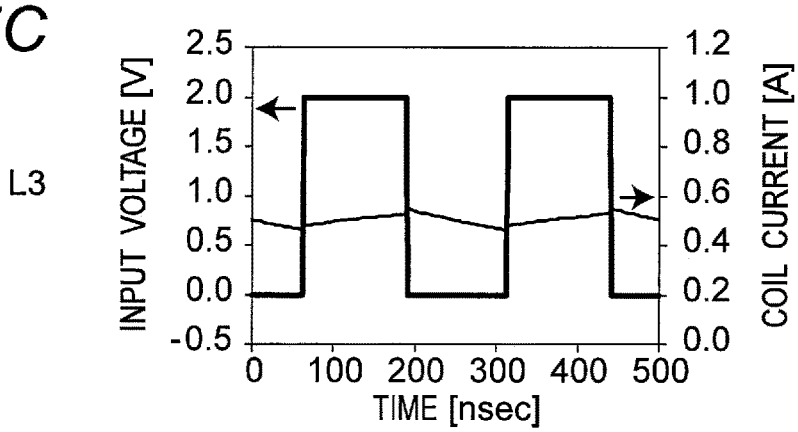
FIG. 7C is a graph of a relationship between an input voltage and a current of a third coil L3 in a present example.
Figure 7D:
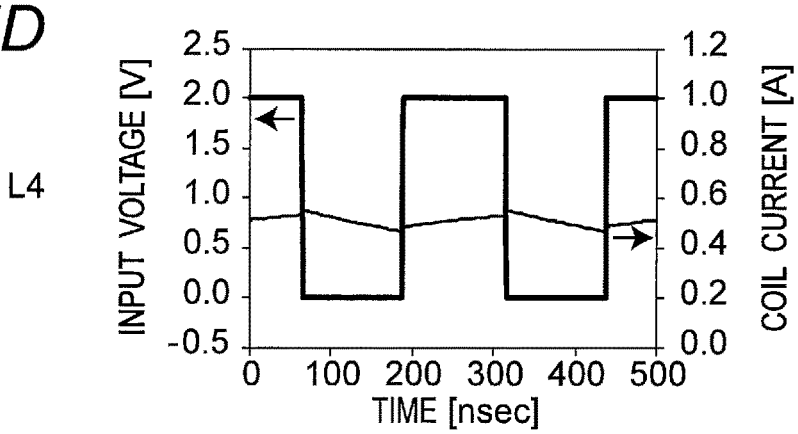
FIG. 7D is a graph of a relationship between an input voltage and a current of a fourth coil L4 in a present example.
Figure 8A:
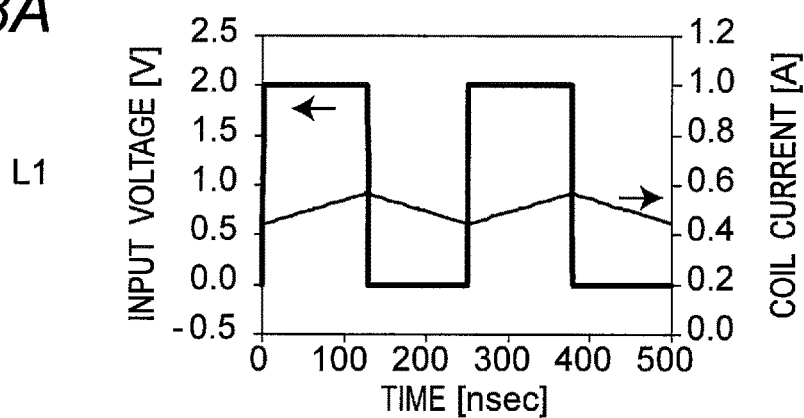
FIG. 8A is a graph of a relationship between an input voltage and a current of a first coil L1 in a comparison example 1.
Figure 8B:
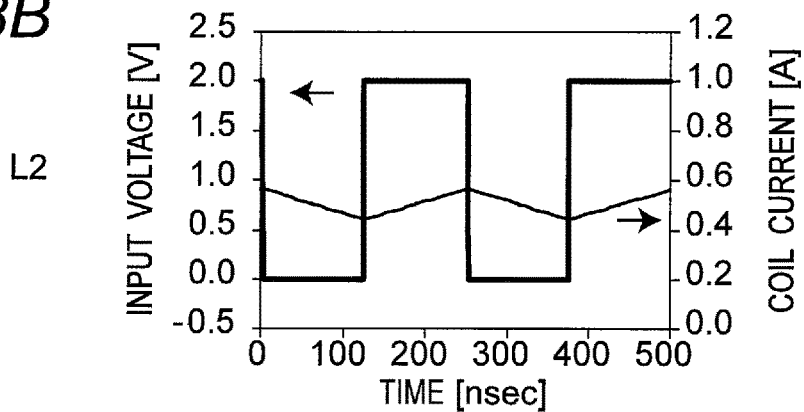
FIG. 8B is a graph of a relationship between an input voltage and a current of a second coil L2 in a comparison example 1.
Figure 8C:
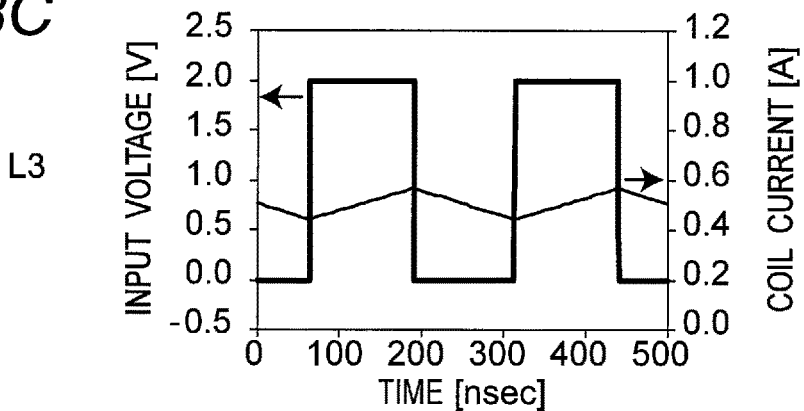
FIG. 8C is a graph of a relationship between an input voltage and a current of a third coil L3 in a comparison example 1.
Figure 8D:
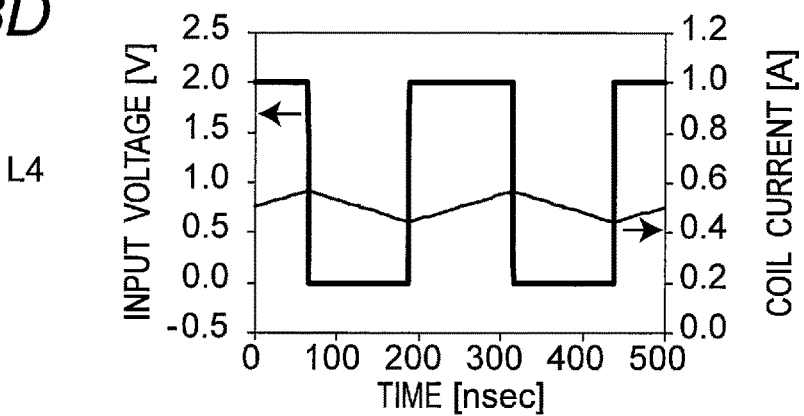
FIG. 8D is a graph of a relationship between an input voltage and a current of a fourth coil L4 in a comparison example 1.
Figure 9A:
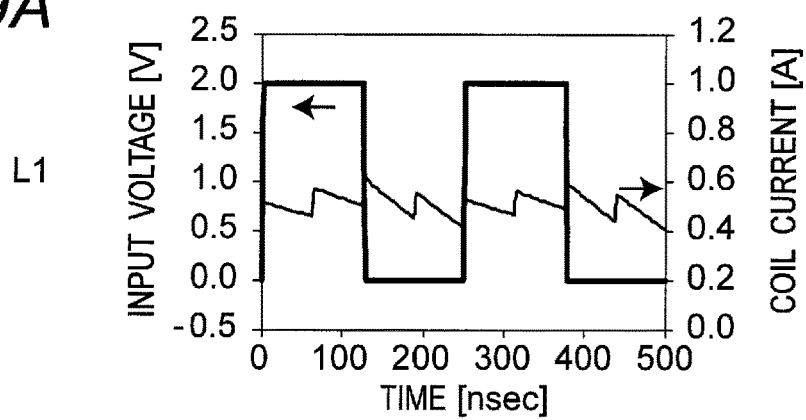
FIG. 9A is a graph of a relationship between an input voltage and a current of a first coil L1 in a comparison example 2.
Figure 9B:
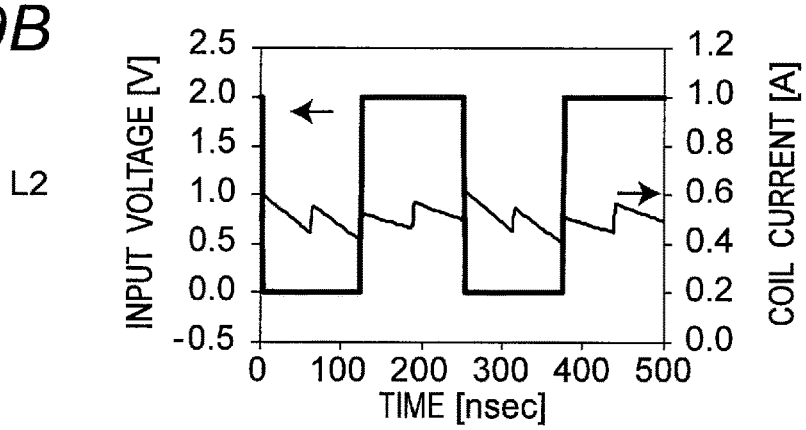
FIG. 9B is a graph of a relationship between an input voltage and a current of a second coil L2 in a comparison example 2.
Figure 9C:
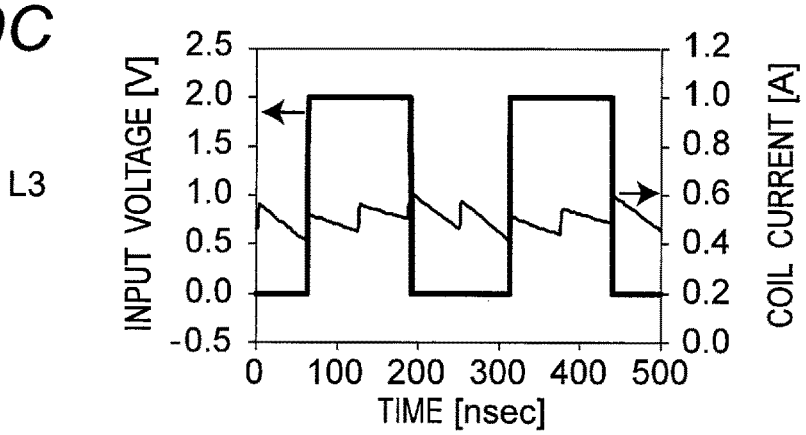
FIG. 9C is a graph of a relationship between an input voltage and a current of a third coil L3 in a comparison example 2.
Figure 9D:
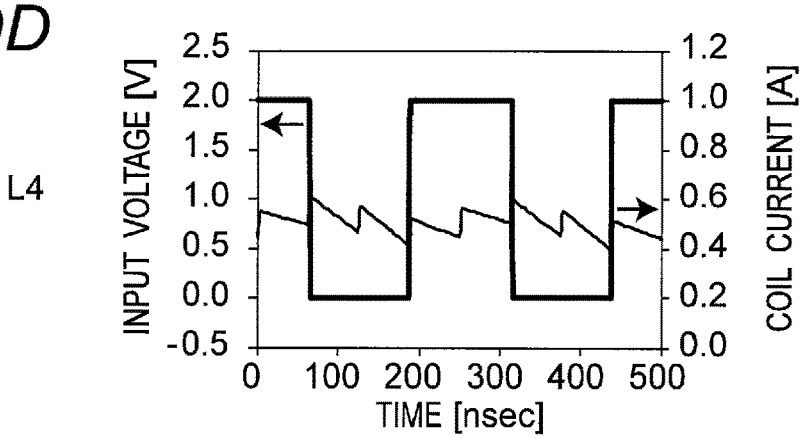
FIG. 9D is a graph of a relationship between an input voltage and a current of a fourth coil L4 in a comparison example 2.

9C correspond to the third coil L3, and FIGS. 7D, 8D, and 9D correspond to the fourth coil L4. In the figures, a rectangular wave represents an input voltage, and a polygonal line indicates a coil current. The coil current was calculated by LTSPICE. The data of the waveforms shown in FIGS. 7A to 7D, 8A to 8D, and 9A to 9D are summarized in Table 1.

TABLE 1

| | COUPLING COEFFICIENT | | | | | | INPUT VOLTAGE | OUTPUT VOLTAGE |
|---|---|---|---|---|---|---|---|---|
| | L1:L2 | L2:L3 | L3:L4 | L1:L3 | L2:L4 | L1:L4 | [V] | [V] |
| COMPARISON EXAMPLE 1 | 0 | 0 | 0 | 0 | 0 | 0 | 2 | 1 |
| COMPARISON EXAMPLE 2 | −0.399 | −0.399 | −0.399 | −0.193 | −0.193 | −0.399 | 2 | 1 |
| PRESENT EXAMPLE | −0.9 | 0.1 | −0.9 | −0.1 | −0.1 | 0.1 | 2 | 1 |

| | FREQUENCY | | INDUCTOR RIPPLE CURRENT [mA] | | | | RIPPLE EFFECTIVE VALUE |
|---|---|---|---|---|---|---|---|
| | [MHz] | L [μH] | L1 | L2 | L3 | L4 | [mA] |
| COMPARISON EXAMPLE 1 | 4 | 1 | 0.124 | 0.124 | 0.124 | 0.124 | 1.3 |
| COMPARISON EXAMPLE 2 | 4 | 1 | 0.205 | 0.212 | 0.198 | 0.209 | 1.7 |
| PRESENT EXAMPLE | 4 | 1 | 0.086 | 0.086 | 0.087 | 0.086 | 0.4 |

As shown in Table 1, in the comparison example 1, the coupling coefficients of the four coils L1 to L4 to each other are zero. In the comparison example 2, the four coils L1 to L4 are strongly magnetically coupled to each other and, in particular, the magnetic couplings between the coils not arranged on the same straight line in FIG. 6 (e.g., the magnetic coupling between the coil L1 and the coil L2 as well as the magnetic coupling between the coil L1 and the coil L4) are equal and have the coupling coefficient of −0.399. The coils arranged on the same straight line in FIG. 6 (e.g., the coil L1 and the coil L3 as well as the coil L2 and the coil L4) have the coupling coefficient of −0.193. The coupling coefficients of the comparison example 2 were calculated from the 3D magnetic field analysis results of the magnetic field analysis software Femtet (manufactured by Murata Software Co., Ltd.).

On the other hand, in the present embodiment, the coupling coefficient between the coil L1 and the coil L2 forming a pair and the coupling coefficient between the coil L3 and the coil L4 forming a pair are −0.9, and the coupling coefficients of the other unpaired coil combinations are −0.1. Therefore, the magnetic couplings between the coil L1 and the coil L2 as well as between the coil L3 and the coil L4 forming pairs are stronger than the magnetic couplings between the unpaired coils. The comparison examples 1, 2 do not satisfy this relationship of strength of the magnetic coupling.

In the present example and the comparison examples 1, 2, the pulse signals input to the coil L2, the coil L3, and the coil L4 had the phase differences of 180°, 90°, and 270°, respectively, with respect to the pulse signal input to the coil L1. FIGS. 7A to 7D, 8A to 8D, and 9A to 9D show a relationship between an input voltages (V) that is a pulse signal input to the coils L1 to L4 and a coil current (A) in this case. FIGS. 7A to 7D, 8A to 8D, and 9A to 9D correspond to the present example, the comparison example 1, and the comparison example 2, respectively. FIGS. 7A, 8A, and 9A correspond to the first coil L1, FIGS. 7B, 8B, and 9B correspond to the second coil L2, FIGS. 7C, 8C, and As shown in Table 1, in the present example, the coils L1 to L4 have the ripple current reduced by approx. 30% and the ripple effective value reduced by approx. 69% as compared to the comparison example 1 without the coupling. The ripple effective value is a value acquired by subtracting the average value of the coil current from the effective value of the coil current. In the present example, the coils L1 to L4 have the ripple current reduced by approx. 58% and the ripple effective value reduced by approx. 76% even as compared with the comparison example 2. Therefore, it can be understood that the ripple current of the coils L1 to L4 can be reduced in the present example as compared to the comparison examples 1, 2. In the comparison example 2, the ripple current is increased by approx. 66% and the ripple effective value is increased by approx. 31% as compared to the comparison example 1 without the coupling. Therefore, it was discovered through this evaluation that the ripple current may become larger in the coil component described in U.S. Pat. No. 6,362,986 as compared to the coil component without the coupling in some cases.

Third Embodiment

Figure 10A:
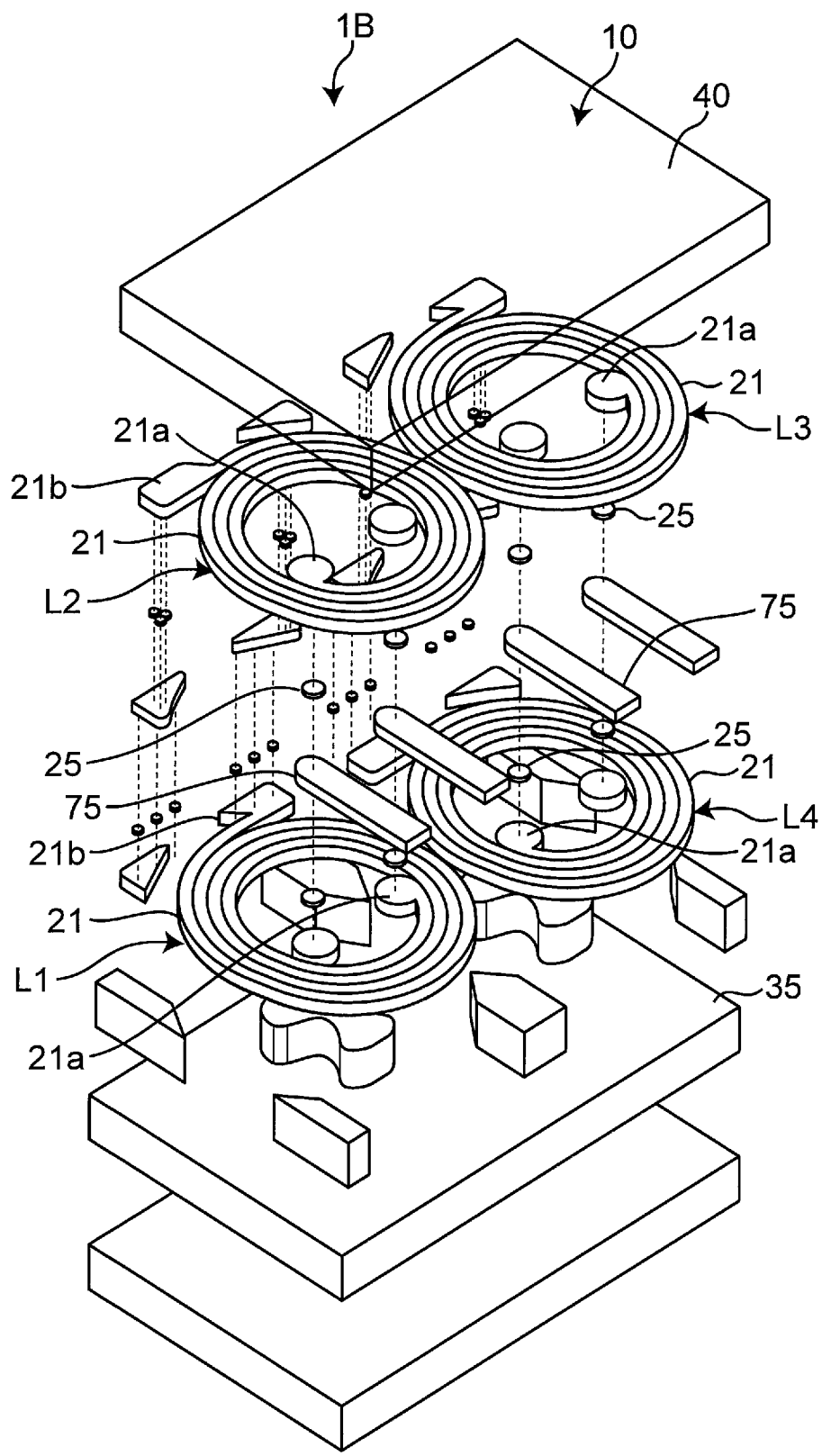
FIG. 10A is an exploded perspective view of a coil component 1B according to a third embodiment.
Figure 10B:
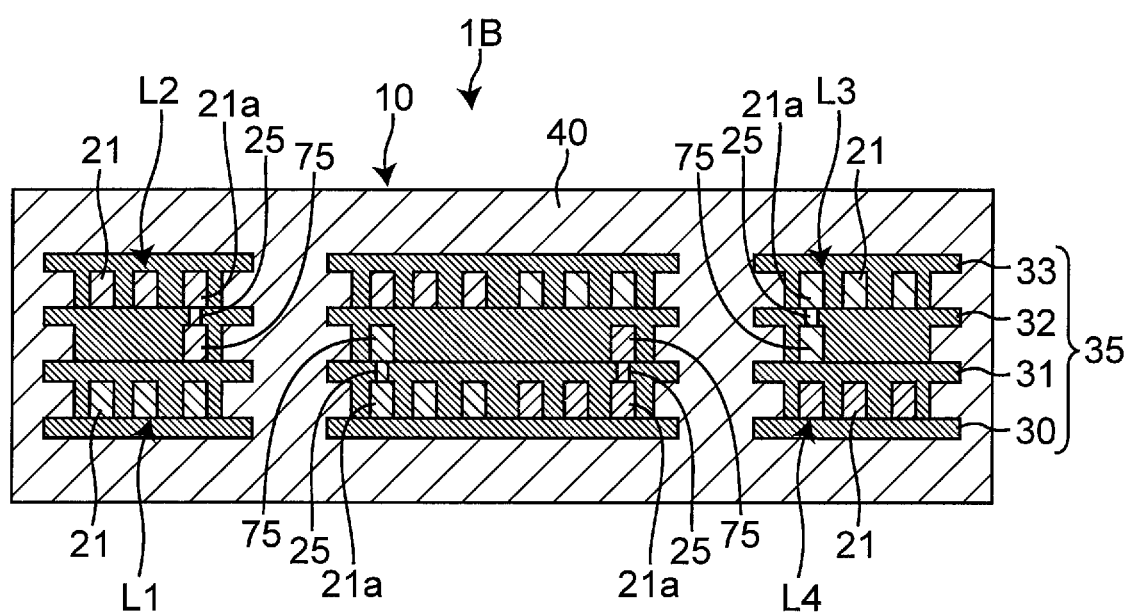
FIG. 10B is a cross-sectional view of the coil component 1B according to the third embodiment.

FIG. 10A is an exploded perspective view of a coil component 1B according to a third embodiment. FIG. 10B is a cross-sectional view of the coil component 1B. The third embodiment is different from the second embodiment in the number of layers of spiral wirings constituting each coil. This different configuration will hereinafter be described. In the third embodiment, the same constituent elements as the second embodiment are denoted by the same reference numerals as the second embodiment and therefore will not be described.

As shown in FIG. 10A and FIG. 10B, in the coil component 1B, the first to fourth coils L1 to L4 are each made up of the single-layer spiral wiring 21 and a combination of the via wiring 25 and a lead wiring 75. The lead wiring 75 has a linear shape and is not a spiral wiring.

The insulating resin 35 is made up of the base insulating resin layer 30 and the first, second, and third insulating resin layers 31, 32, 33. The spiral wirings 21 of the first and fourth coils L1, L4 are disposed on the base insulating resin layer 30; the lead wirings 75 of the first to fourth coils L1 to L4 are disposed on the first insulating resin layer 31; the spiral wirings 21 of the second and third coils L2, L3 are disposed on the second insulating resin layer 32; and these wirings are respectively covered with the first insulating resin layer 31, the second insulating resin layer 32, and the third insulating resin layer 33.

The positional relationship of the first to fourth coils L1 to L4 in the coil component 1B is the same as that of the coil component 1A. Therefore, the magnetic coupling between the first coil L1 and the second coil L2 forming a pair is stronger than the magnetic couplings between the first coil L1 and each of the third and fourth coils L3, L4 as well as between the second coil L2 and each of the third and fourth coils L3, L4 not forming a pair. Additionally, the magnetic coupling between the third coil L3 and the fourth coil L4 forming a pair is stronger than the magnetic couplings between the third coil L3 and each of the first and second coils L1, L2 as well as between the fourth coil L4 and each of the first and second coils L1, L2 not forming a pair.

In the coil component 1B, the inner circumferential ends 21a of the spiral wirings 21 of the first to fourth coils L1 to L4 are connected through the via wirings 25 provided in the first insulating resin layer 31 or the second insulating resin layer 32 to the lead wirings 75 of the coils L1 to L4 provided on the insulating resin layer 31. The lead wirings 75 linearly extend from connection portions with the via wirings 25 toward the side surface of the element body 10 and are connected to the corresponding first to fourth external terminals 11a to 14a, 11b to 14b. As is the case with the coil component 1A according to the second embodiment, the outer circumferential ends 21b of the spiral wirings 21 of the first coils L1 to L4 are led out to the side surface of the element body 10 and connected to the corresponding first to fourth external terminals 11a to 14a, 11b to 14b.

Although the lead wirings 75 are disposed on the first insulating resin layer 31, i.e., between the layer provided with the spiral wirings 21 of the coils L1, L4 and the layer provided with the spiral wirings 21 of the coils L2, L3 in the above description, the lead wirings 75 are not limited to this configuration. The lead wirings 75 may be disposed in, for example, a layer below the layer provided with the spiral wirings 21 of the coils L1, L4 or a layer above the layer provided with the spiral wirings 21 of the coils L2, L3.

When a first coil is defined as one of the coils L1 to L4 and a second coil is defined as the coil forming a pair with the first coil while the coils other than the first coil and the second coil are defined as the other coils in the coil component 1B, the magnetic coupling between the first coil and the second coil is stronger than the magnetic coupling between the first coil and each of the other coils. Therefore, even when the coil component 1B is used for a multi-phase SW regulator, the ripple current of the coils L1 to L4 can be reduced by properly selecting the pulse signals input to the coils L1 to L4. Additionally, since the coil component 1B has the coils L1 to L4 each made up of the single-layer spiral wiring 21, the coil component 1B can be reduced in height.

Fourth Embodiment

Figure 11A:
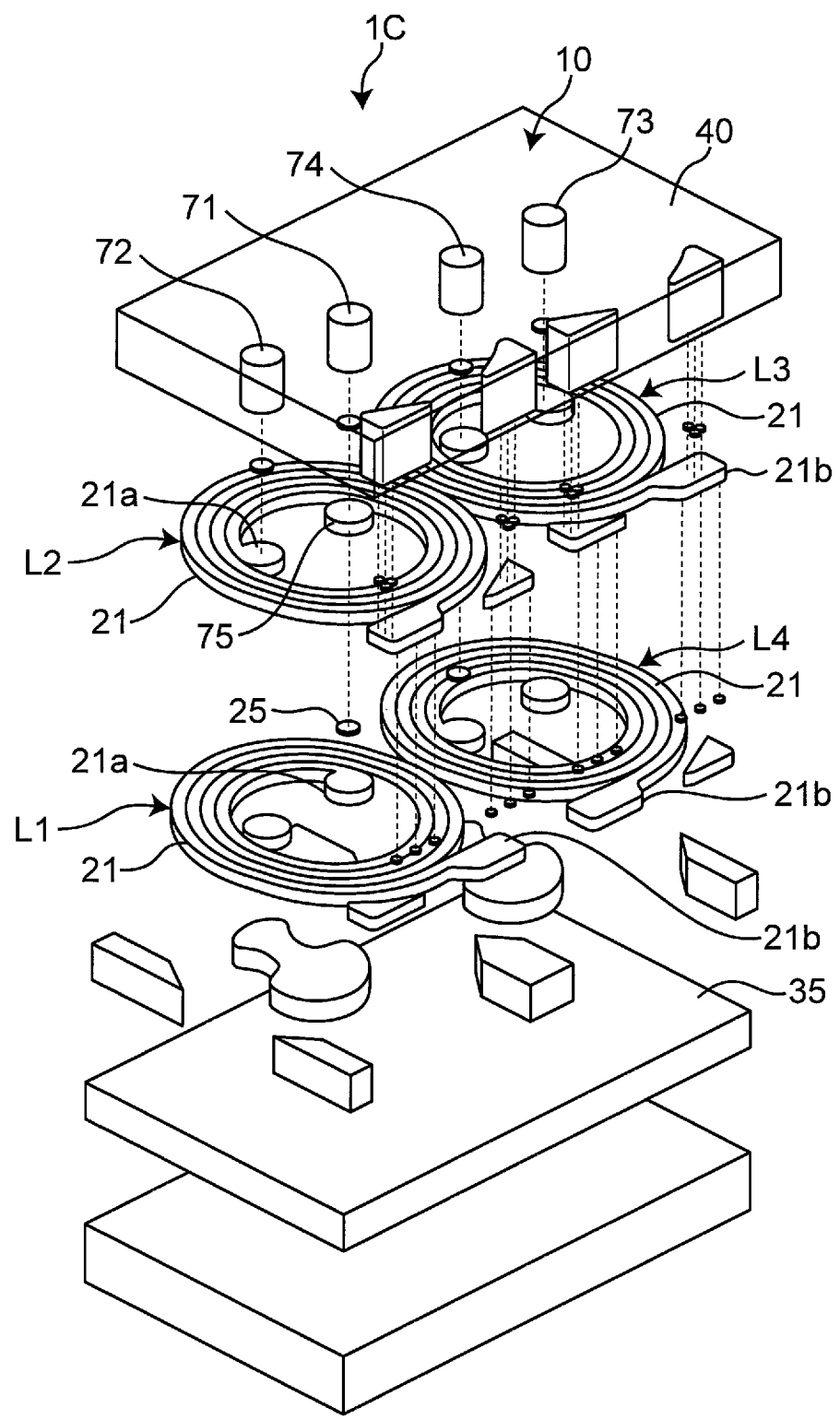
FIG. 11A is an exploded perspective view of a coil component 1C according to a fourth embodiment.
Figure 11B:
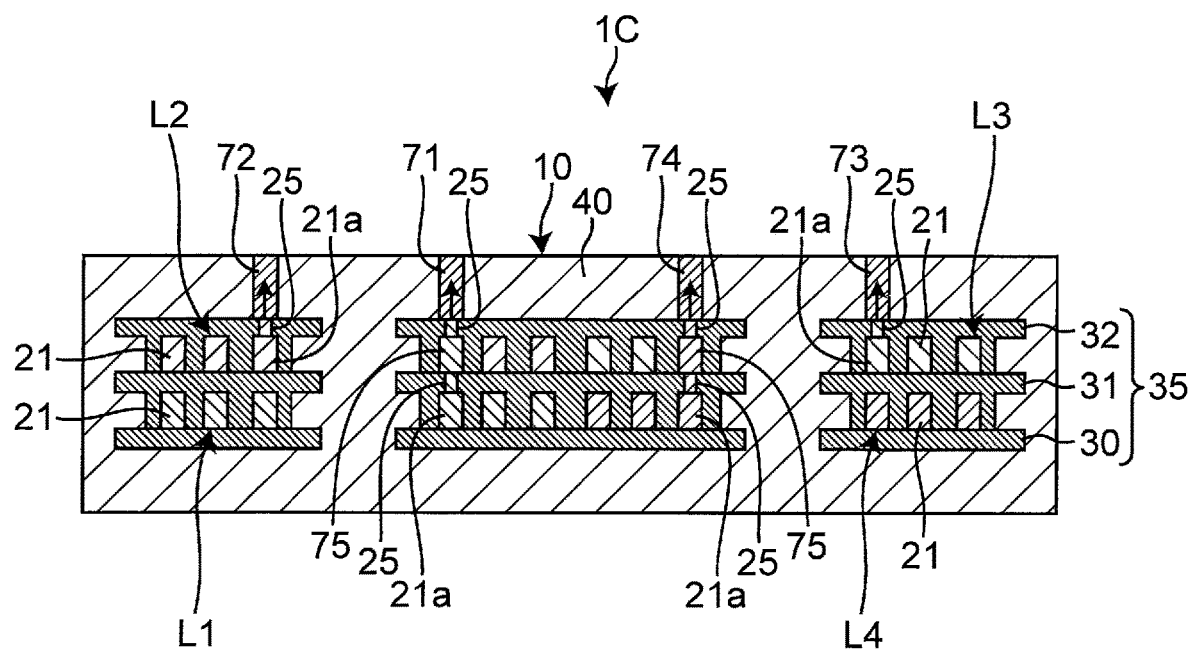
FIG. 11B is a cross-sectional view of the coil component 1C according to the fourth embodiment.

FIG. 11A is an exploded perspective view of a coil component 1C according to a fourth embodiment. FIG. 11B is a cross-sectional view of the coil component 1C. The fourth embodiment is different from the third embodiment in the configuration of lead-out portions of the coils L1 to L4 to the external terminals. This different configuration will hereinafter be described. In the fourth embodiment, the same constituent elements as the third embodiment are denoted by the same reference numerals as the third embodiment and therefore will not be described.

As shown in FIG. 11A and FIG. 11B, in the coil component 1C, the inner circumferential ends 21a of the respective spiral wirings 21 of the first to fourth coils L1 to L4 are led through first to fourth columnar electrodes 71 to 74 to the upper surface of the element body 10. Although not shown, in the coil component 1C, a portion of the external terminals is provided on the upper surface side of the element body 10, and the columnar electrodes 71 to 74 of the coils L1 to L4 are connected to the corresponding external terminals on the upper surface side. The first to fourth columnar electrodes 71 to 74 are made of a low electric resistance metal such as Cu, Ag, and Au and are formed by a semi-additive process, for example. The outer circumferential ends 21b of the respective spiral wirings 21 of the first to fourth coils L1 to L4 are led to the side surface of the element body 10 and connected to the corresponding external terminals as in the case with the third embodiment. The internal structure of the coil component 1C will hereinafter be described in more detail.

The inner circumferential ends 21a of the spiral wirings 21 of the first and fourth coils L1, L4 are connected through the via wirings 25 provided in the first insulating resin layer 31 to the lead wirings 75 provided on the first insulating resin layer 31. The lead wirings 75 of the first and fourth coils L1, L4 are connected through the via wirings 25 provided in the second insulating resin layer 32 to the first and fourth columnar electrodes 71, 74, respectively, provided on the first insulating resin layer 32 and in the magnetic resin 40.

The inner circumferential ends 21a of the spiral wirings 21 of the second and third coils L2, L3 are connected through the via wirings 25 provided in the second insulating resin layer 32 to the second and third columnar electrodes 72, 73 provided on the second insulating resin layer 32 and in the magnetic resin 40.

The positional relationship of the first to fourth coils L1 to L4 in the coil component 1C is the same as that of the coil component 1A. Therefore, the magnetic coupling between the first coil L1 and the second coil L2 forming a pair is stronger than the magnetic couplings between the first coil L1 and each of the third and fourth coils L3, L4 as well as between the second coil L2 and each of the third and fourth coils L3, L4 not forming a pair. Additionally, the magnetic coupling between the third coil L3 and the fourth coil L4 forming a pair is stronger than the magnetic couplings between the third coil L3 and each of the first and second coils L1, L2 as well as between the fourth coil L4 and each of the first and second coils L1, L2 not forming a pair.

In particular, when a first coil is defined as one of the coils L1 to L4 and a second coil is defined as the coil forming a pair with the first coil while the coils other than the first coil and the second coil are defined as the other coils in the coil component 1C, the magnetic coupling between the first coil and the second coil is stronger than the magnetic coupling between the first coil and each of the other coils. Therefore, even when the coil component 1C is used for a multi-phase SW regulator, the ripple current of the coils L1 to L4 can be reduced by properly selecting the pulse signals input to the coils L1 to L4.

In the coil component 1C, since one end portion of each of the first to fourth coils L1 to L4 is led out to the upper surface of the element body 10 by one of the first to fourth columnar electrodes 71 to 74, it is not necessary to form a wiring layer other than the spiral wirings 21 as in the coil component 1B, and the height can further be reduced. Additionally, the coil component 1C has a portion of the external terminals provided on the upper surface of the element body 10 and, for example, the external terminals can be extended from the upper surface to the side surfaces or the bottom surface, so that surface mounting can be achieved in this case. For example, even when the external terminals are provided only on the upper surface of the element body 10, the external terminals can directly be connected from the upper surface of the element body 10 to the wiring pattern of a mounting board by adopting three-dimensional mounting such as embedding the coil component 1C in the mounting board. Moreover, in this case, the wiring pattern of the mounting substrate and the first to fourth columnar electrodes 71 to 74 may directly be connected without providing the external terminals.

Fifth Embodiment

Figure 12A:
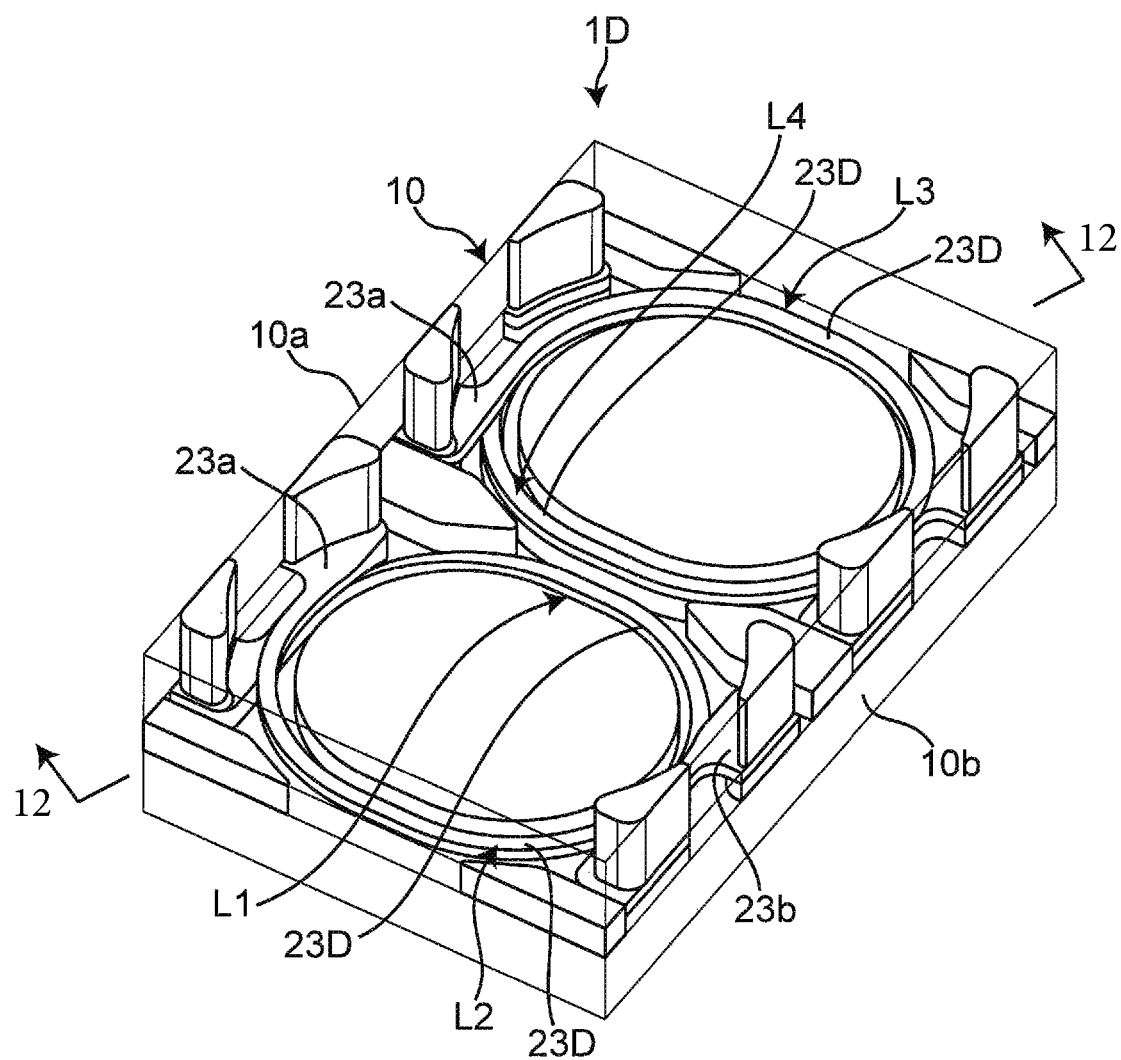
FIG. 12A is a transparent perspective view of a coil component 1D according to a fifth embodiment.
Figure 12B:
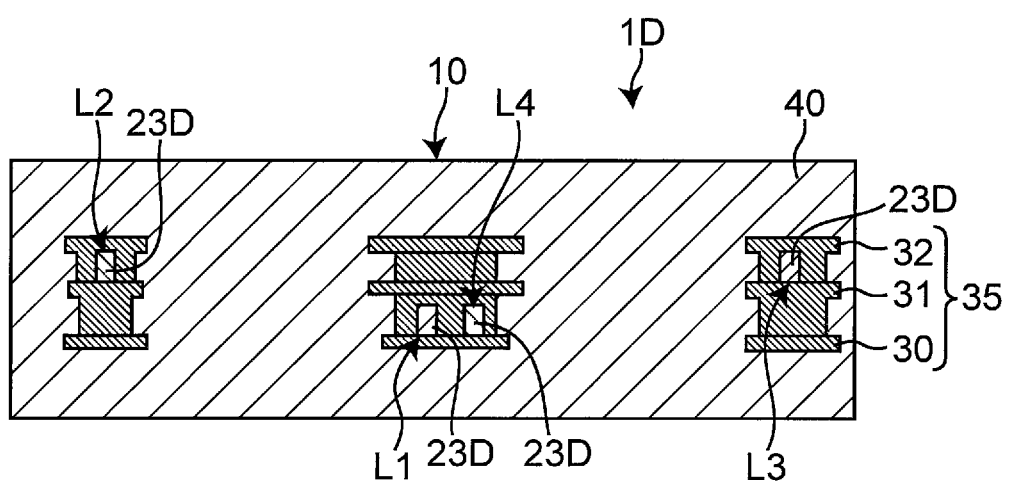
FIG. 12B is a cross-sectional view taken along 12-12 of FIG. 12A.
Figure 12C:
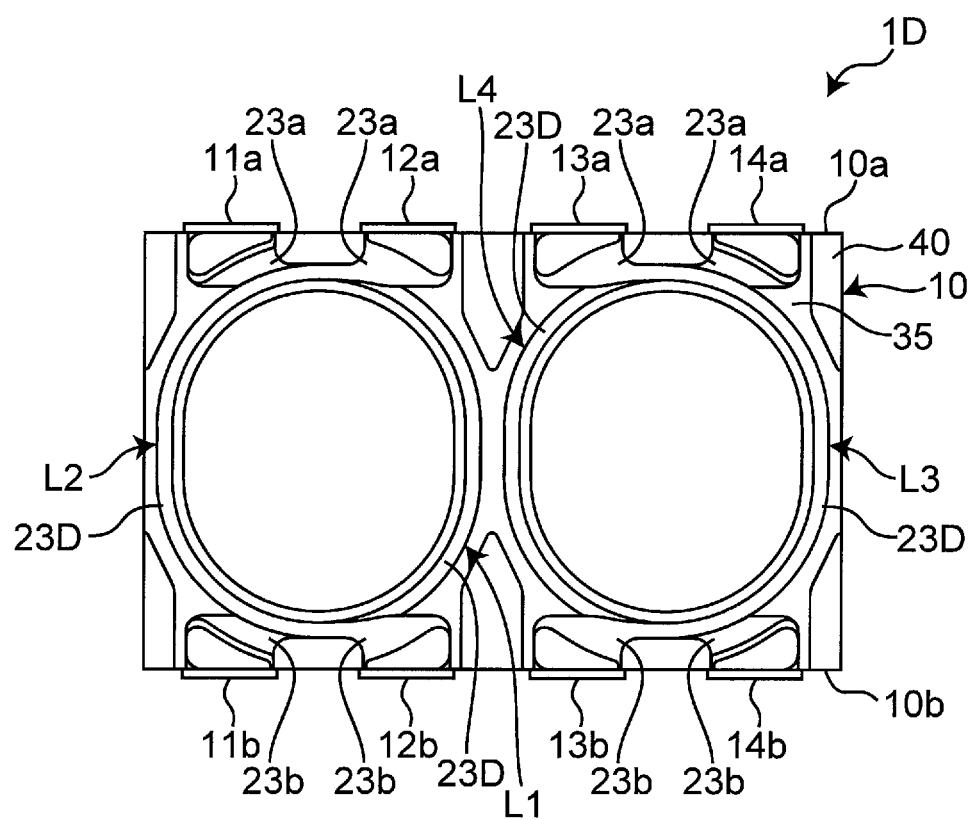
FIG. 12C is a transparent top view of the coil component 1D.

FIG. 12A is a transparent perspective view of a coil component 1D according to a fifth embodiment. FIG. 12B is a cross-sectional view taken along 12-12 of FIG. 12A. FIG. 12C is a transparent top view of the coil component 1D. The coil component 1D is different from the coil component 1C of the fourth embodiment in the shape of the spiral wirings constituting the coils L1 to L4. This different configuration will hereinafter mainly be described. In the fifth embodiment, the same constituent elements as the first to fourth embodiments are denoted by the same reference numerals as the embodiments and therefore will not be described.

As shown in FIG. 12A, in the coil component 1D, each of the first to fourth coils L1 to L4 is made up of a single-layer spiral wiring 23D. As shown in FIG. 12B, the spiral wirings 23D of the first and fourth coils L1, L4 are provided on the base insulating resin layer 30 and are covered with the first insulating resin layer 31. The second and third coils L2, L3 are provided on the first insulating resin layer 31 and are covered with the second insulating resin layer 32. Therefore, the spiral wirings 23D are disposed inside the element body 10. As shown in FIG. 12C, each of the spiral wirings 23D has a semi-elliptical arc shape when viewed in the up-down direction. Therefore, each of the spiral wirings 23D is a curved wiring wound around about a half of the circumference on the base insulating resin layer 30 or the first insulating resin layer 31 (on the insulating layer). The number of turns of the spiral wiring 23D is not limited to about a half of the circumference and may be any number less than one turn. When the number of turns is less than one turn, both ends of the spiral wiring 23D are located on the outermost circumference (constitute no inner circumferential portion surrounded by itself), so that the need for three-dimensional wiring using a via wiring can be eliminated.

The spiral wiring 23D of the first coil L1 has both ends 23a, 23b connected to the first external terminals 11a, 11b and has a curved shape drawing an arc from the external terminals 11a, 11b toward the center side of the coil component 1D. The spiral wiring 23D of the third coil L3 has the same shape as the spiral wiring 23D of the first coil L1 and has the two ends 23a, 23b connected to the third external terminals 13a, 13b.

The spiral wiring 23D of the second coil L2 has the two ends 23a, 23b connected to the second external terminals 12a, 12b and has a curved shape drawing an arc from the external terminals 12a, 12b toward an edge side of the coil component 1D. The spiral wiring 23D of the fourth coil L4 has the same shape as the spiral wiring 23D of the second coil L2 and has the two ends 23a, 23b connected to the fourth external terminals 14a, 14b.

It is assumed in the coil component 1D that an inner diameter portion refers to the inside of the innermost circumference of the spiral wiring 23D (the area surrounded by the curve of the spiral wiring 23D and the straight line connecting the ends 23a, 23b of the spiral wiring 23D) for each of the coils L1 to L4. In this case, when the coil component 1D is viewed in the up-down direction, the inner diameter portion of the first coil L1 and the inner diameter portion of the second coil L2 overlap each other, and the inner diameter portion of the third coil L3 and the inner diameter portion of the fourth coil L4 overlap each other. The inner diameter portion of the first coil L1 does not overlap with the inner diameter portions of the third and fourth coils L3, L4, and the inner diameter portion of the second coil L2 does not overlap with the inner diameter portions of the third and fourth coils L3, L4.

Therefore, as is the case with the coil component 1 of the first embodiment, the coil component 1D has the first coil L1 and the second coil L2 forming a pair and the third coil L3 and the fourth coil L4 forming a pair, so that the four coils L1 to L4 are configured to form two pairs. Additionally, the magnetic coupling between the first coil L1 and the second coil L2 forming a pair is stronger than the magnetic couplings between the first coil L1 and each of the third and fourth coils L3, L4 as well as between the second coil L2 and each of the third and fourth coils L3, L4 not forming a pair. The magnetic coupling between the third coil L3 and the fourth coil L4 forming a pair is stronger than the magnetic couplings between the third coil L3 and each of the first and second coils L1, L2 as well as between the fourth coil L4 and each of the first and second coils L1, L2 not forming a pair. Actually, in the configuration of the coil component 1D, the 3D magnetic field analysis result was calculated by using the magnetic field analysis software Femtet with the spiral wirings 23D having the wiring width of 50 μm, the wiring thickness of 45 μm, the wiring minimum interval of 10 μm, and the interlayer minimum interval of 10 μm. As a result, the absolute value of the coupling coefficient between the first coil L1 and the second coil L2 forming a pair was 1.5 times or more larger than the absolute value of the coupling coefficient between the first coil L1 and the fourth coil L4 adjacent to each other on the base insulating resin layer 30. The absolute value of the coupling coefficient between the first coil L1 and the third coil L3 provided on the different layers and having the large interval between the inner diameter portions was smaller than the absolute values of the coupling coefficients described above.

Therefore, when a first coil is defined as one of the coils L1 to L4 and a second coil is defined as the coil forming a pair with the first coil while the coils other than the first coil and the second coil are defined as the other coils in the coil component 1D, the magnetic coupling between the first coil and the second coil is stronger than the magnetic coupling between the first coil and each of the other coils. Therefore, even when the coil component 1D is used for a multi-phase SW regulator, the ripple current of the coils L1 to L4 can be reduced by properly selecting the pulse signals input to the coils L1 to L4. Additionally, since the coil component 1D has the coils L1 to L4 each made up of the single-layer spiral wiring 23D, the coil component 1D can be reduced in height. Moreover, since it is not necessary to form a wiring layer other than the spiral wirings 23D as in the coil component 1B of the third embodiment, the height can further be reduced.

Sixth Embodiment

Figure 13A:
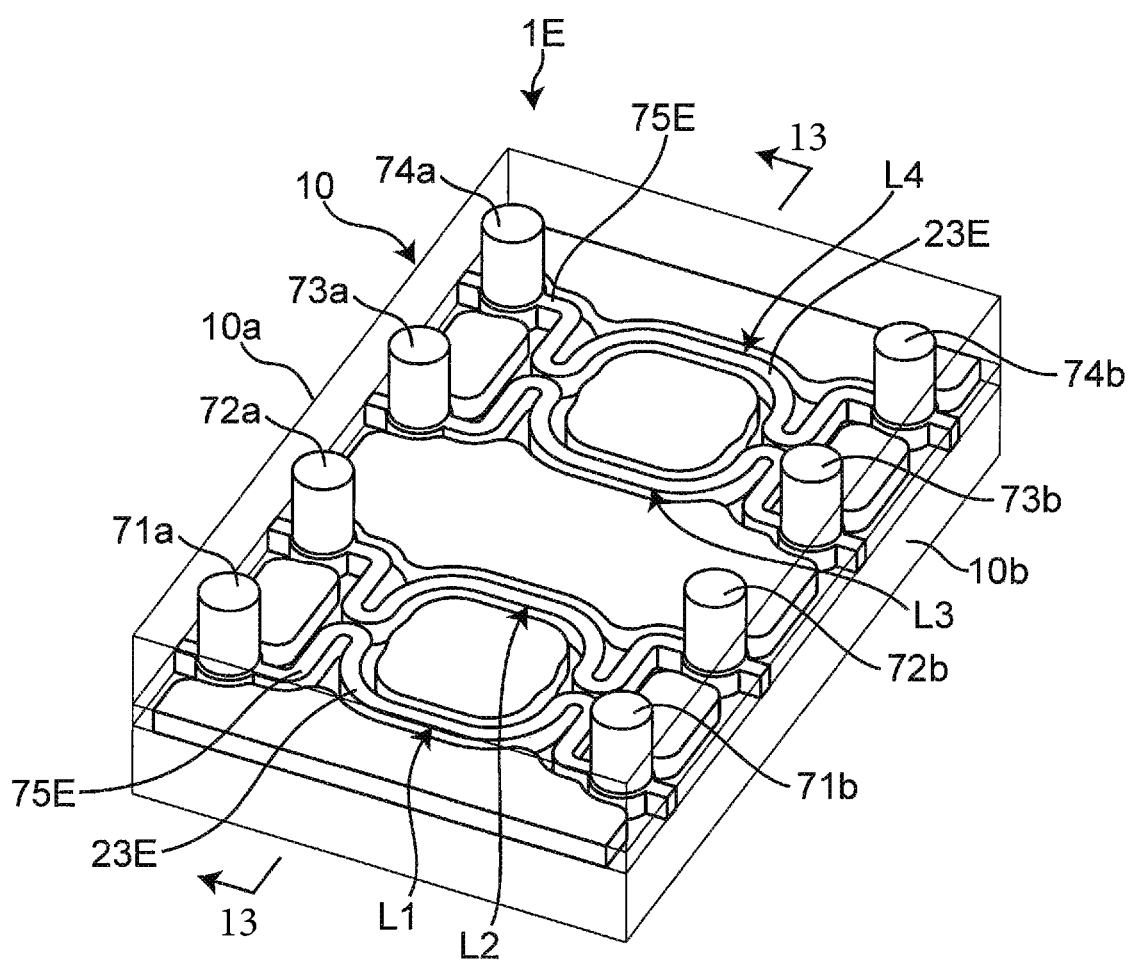
FIG. 13A is a transparent perspective view of a coil component 1E according to a sixth embodiment.
Figure 13B:
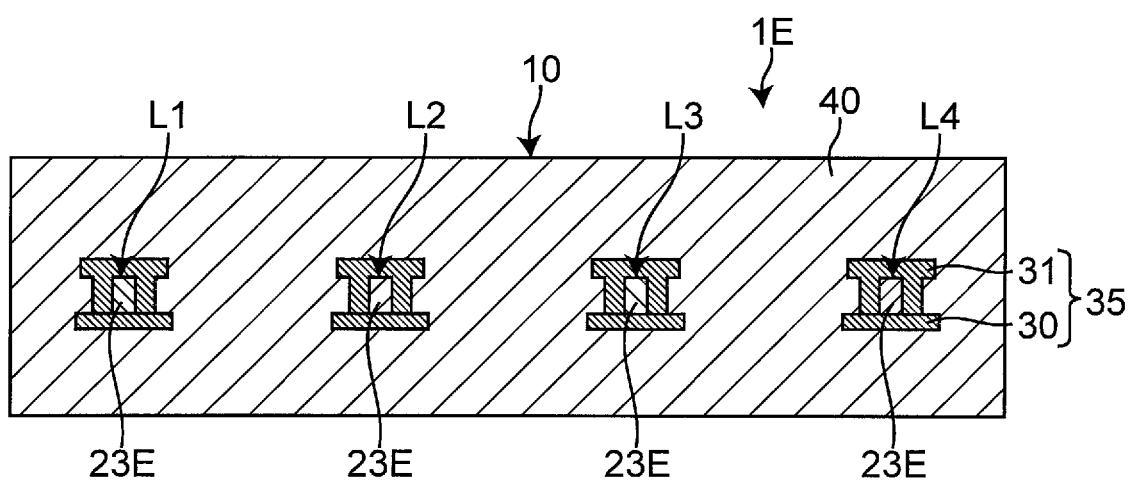
FIG. 13B is a cross-sectional view taken along 13-13 of FIG. 13A.
Figure 13C:
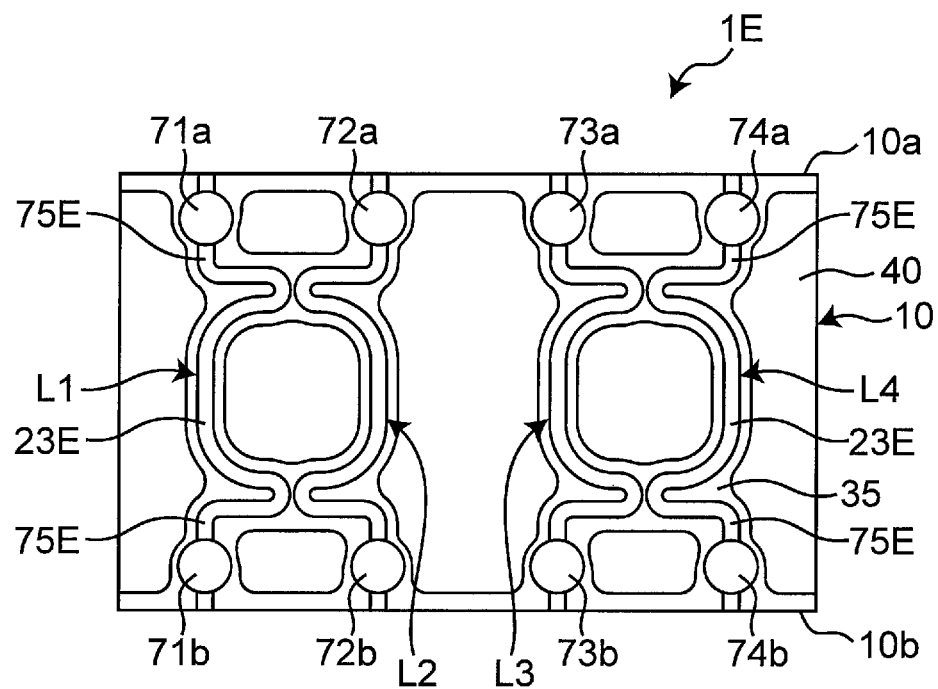
FIG. 13C is a transparent top view of the coil component 1E.

FIG. 13A is a transparent perspective view of a coil component 1E according to a sixth embodiment. FIG. 13B is a cross-sectional view of the coil component 1E. FIG. 13C is a transparent top view of the coil component 1E. The coil component 1E is different from the coil component 1D of the fifth embodiment in the shape of, and the layers provided with, the coils L1 to L4 and is also different in that first to fourth columnar electrodes 71a to 74a, 71b to 74b are included. This different configuration will hereinafter mainly be described. In the sixth embodiment, the same constituent elements as the first to fifth embodiments are denoted by the same reference numerals as the embodiments and therefore will not be described.

As shown in FIG. 13A, in the coil component 1E, the first to fourth coils L1 to L4 are each made up of a single-layer spiral wiring 23E and lead wirings 75E. As shown in FIG. 13B, the first to fourth coils L1 to L4 are all provided on the base insulating resin layer 30 and are covered with the first insulating resin layer 31. As shown in FIG. 13C, both ends of the spiral wiring 23E are connected to the lead wirings 75E and led out toward the side surfaces 10a, 10b of the coil component 1E. The spiral wiring 23E has a semi-elliptical arc shape when viewed in the up-down direction. Therefore, the spiral wiring 23E is a curved wiring wound around about a half of the circumference on the base insulating resin layer 30 (on the insulating layer). The number of turns of the spiral wiring 23E is not limited to about a half of the circumference and may be any number less than one turn.

The lead wirings 75E of the first coil L1 each have one end connected to one of the first columnar electrodes 71a, 71b located on an outer side and have a shape extending from the first columnar electrodes 71a, 71b to the center side of the coil component 1E. The lead wirings 75E of the fourth coil L4 each have one end connected to one of the fourth columnar electrodes 74a, 74b located on an outer side and have a shape extending from the fourth columnar electrodes 74a, 74b to the center side of the coil component 1E. Each of the spiral wirings 23E of the first and fourth coils L1, L4 has both ends connected to the other ends of the lead wirings 75E and has a curved shape drawing an arc from the other ends toward an edge side of the coil component 1E.

The lead wirings 75E of the second coil L2 each have one end connected to one of the second columnar electrodes 72a, 72b located on the inner side and have a shape extending from the second columnar electrodes 72a, 72b to the edge side of the coil component 1E. The lead wirings 75E of the third coil L3 each have one end connected to one of the third columnar electrodes 73a, 73b located on the inner side and have a shape extending from the third columnar electrodes 73a, 73b to the edge side of the coil component 1E. Each of the spiral wirings 23E of the second and third coils L2, L3 has both ends connected to the other ends of the lead wirings 75E and has a curved shape drawing an arc from the other ends toward the center side of the coil component 1E.

It is assumed in the coil component 1E that an inner diameter portion refers to the inside of the innermost circumference of the spiral wiring 23E (the area surrounded by the curve of the spiral wiring 23E and the straight line connecting both ends of the spiral wiring 23E) for each of the coils L1 to L4. In this case, in the coil component 1E, the inner diameter portions of any of the coils L1 to L4 do not overlap each other when viewed in the up-down direction.

On the other hand, in the coil component 1E, the lead wirings 75E of the first and second coils L1, L2 come close to each other at the other ends and, therefore, the spiral wirings 23E of the first and second coils L1, L2 come close to each other at both ends thereof and form curved shapes drawing arcs facing opposite to each other, thereby forming circular arcs of one elliptical shape. The lead wirings 75E of the third and fourth coils L3, L4 come close to each other at the other ends and, therefore, the spiral wirings 23E of the third and fourth coils L3, L4 come close to each other at both ends thereof and form curved shapes drawing arcs facing opposite to each other, thereby forming circular arcs of one elliptical shape. Therefore, the spiral wirings 23E of the first and second coils L1, L2 and the spiral wirings 23E of the third and fourth coils L3, L4 form the respective elliptical shapes and thereby share the inner diameter portions of the elliptical shapes. In the inner diameter portions of the elliptical shapes, the magnetic fluxes generated by the first and second coils L1, L2 and the magnetic fluxes generated by the third and fourth coils L3, L4 are concentrated, so that the magnetic coupling between the first coil L1 and the second coil L1 as well as the magnetic coupling between the third coil L3 and the fourth coil L4 become strong.

Therefore, as is the case with the coil component 1 of the first embodiment, the coil component 1E has the first coil L1 and the second coil L2 forming a pair and the third coil L3 and the fourth coil L4 forming a pair, so that the four coils L1 to L4 are configured to form two pairs. Additionally, the magnetic coupling between the first coil L1 and the second coil L2 forming a pair is stronger than the magnetic couplings between the first coil L1 and each of the third and fourth coils L3, L4 as well as between the second coil L2 and each of the third and fourth coils L3, L4 not forming a pair. The magnetic coupling between the third coil L3 and the fourth coil L4 forming a pair is stronger than the magnetic couplings between the third coil L3 and each of the first and second coils L1, L2 as well as between the fourth coil L4 and each of the first and second coils L1, L2 not forming a pair. Actually, when the 3D magnetic field analysis result was calculated for the configuration of the coil component 1E by using the magnetic field analysis software Femtet under the same conditions as the coil component 1D, the absolute value of the coupling coefficient between the first coil L1 and the second coil L2 forming a pair was 1.5 times or more larger than the absolute value of the coupling coefficient between the second coil L2 and the third coil L3 adjacent to each other on the base insulating resin layer 30. The absolute value of the coupling coefficient between the second coil L2 and the fourth coil L4 having a large interval between the inner diameter portions was smaller than the absolute value of the coupling coefficient described above.

Thus, when a first coil is defined as one of the coils L1 to L4 and a second coil is defined as the coil forming a pair with the first coil while the coils other than the first coil and the second coil are defined as the other coils in the coil component 1E, the magnetic coupling between the first coil and the second coil is stronger than the magnetic coupling between the first coil and each of the other coils. Therefore, even when the coil component 1E is used for a multi-phase SW regulator, the ripple current of the coils L1 to L4 can be reduced by properly selecting the pulse signals input to the coils L1 to L4. Additionally, since the coil component 1E has the coils L1 to L4 each made up of the single-layer spiral wiring 23E, the coil component 1E can be reduced in height.

Moreover, since it is not necessary to form a wiring layer other than the spiral wirings 23E as in the coil component 1B of the third embodiment, the height can further be reduced. Since the coil component 1E has all the spiral wirings 23E laminated on the base insulating layer 30 so that the insulating resin 35 can have a two-layer structure, a further reduction in the height can be achieved. External terminals containing metal such as Cu, Ag, Ni, Sn, and Au may be provided on the outer surfaces of the first to fourth columnar electrodes 71a to 74a, 71b to 74b and, in this case, the mounting quality can be improved. The outer surfaces of the first to fourth columnar electrodes 71a to 74a, 71b to 74b may act as external terminals and, in this case, the coil component 1E can have a configuration suitable for application in which the coil component is embedded in a mounting board.

Seventh Embodiment

Figure 14A:
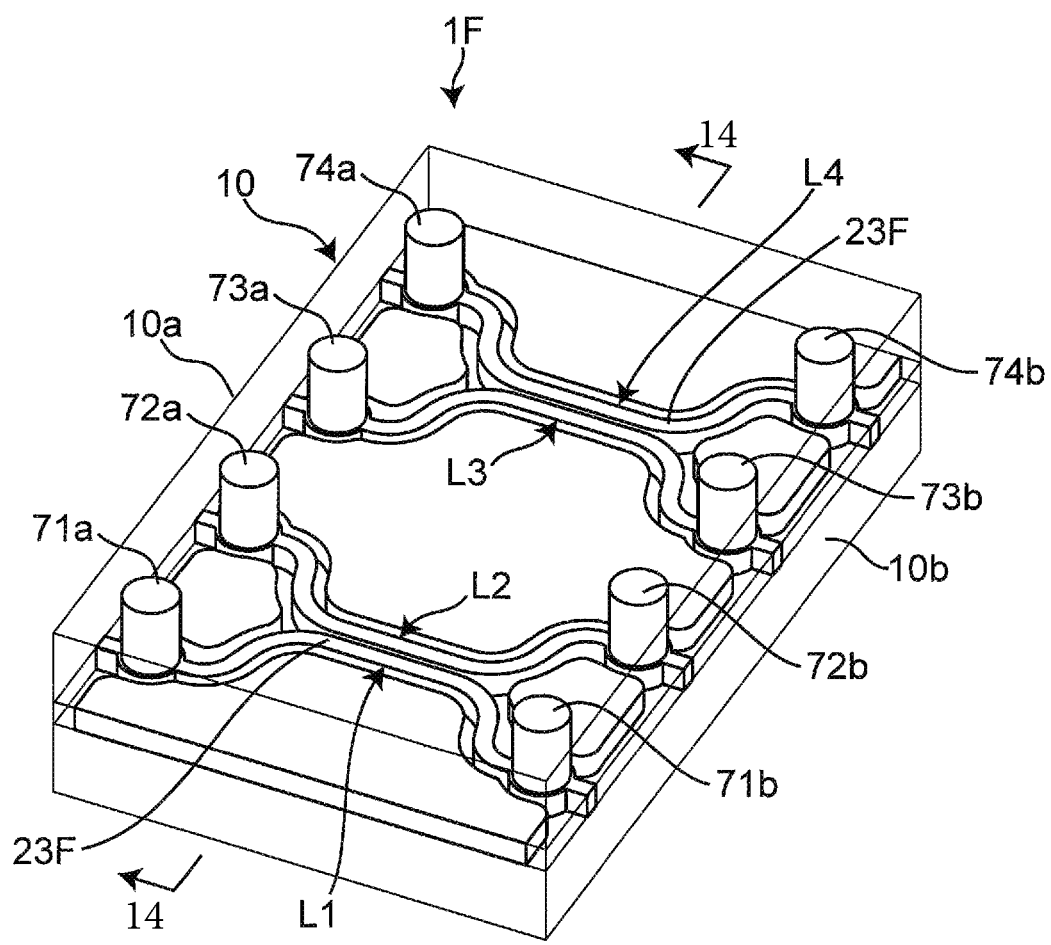
FIG. 14A is a transparent perspective view of a coil component 1F according to a seventh embodiment.
Figure 14B:
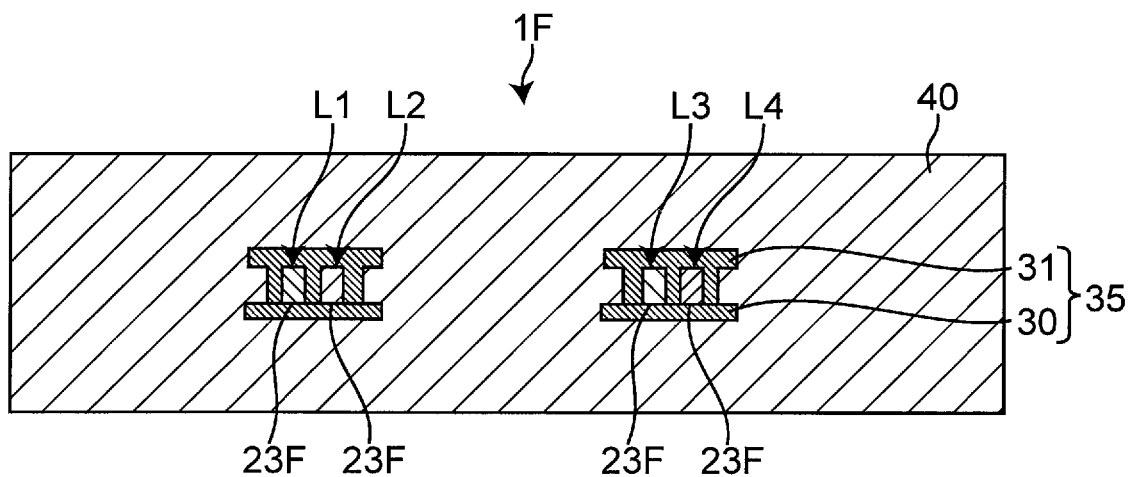
FIG. 14B is a cross-sectional view taken along 14-14 of FIG. 14A.
Figure 14C:
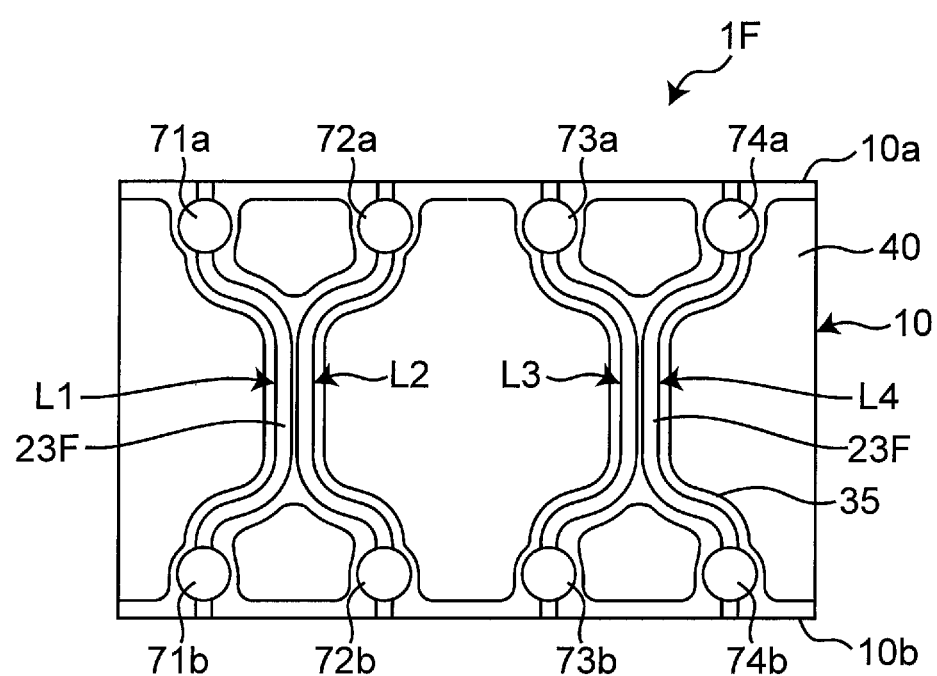
FIG. 14C is a transparent top view of the coil component 1F.

FIG. 14A is a transparent perspective view of a coil component 1F according to a seventh embodiment, FIG. 14B is a cross-sectional view of the coil component 1F, and FIG. 14C is a transparent top view of the coil component 1F. The coil component 1F is different from the coil component 1E of the sixth embodiment in the shapes of the coils L1 to L4. This different configuration will hereinafter mainly be described. In the seventh embodiment, the same constituent elements as the first to sixth embodiments are denoted by the same reference numerals as the embodiments and therefore will not be described.

As shown in FIG. 14A, in the coil component 1F, the first to fourth coils L1 to L4 are each made up of a single-layer spiral wiring 23F. As shown in FIG. 14B, the first to fourth coils L1 to L4 are all provided on the base insulating resin layer 30 and are covered with the first insulating resin layer 31. As shown in FIG. 14C, the spiral wiring 23F has a semi-elliptical arc shape when viewed in the up-down direction. Therefore, the spiral wiring 23F is a curved wiring wound around about a half of the circumference on the base insulating resin layer 30 (on the insulating layer).

The spiral wiring 23F of the first coil L1 has both ends connected to the first columnar electrodes 71a, 71b located on an outer side and has a curved shape drawing an arc from the first columnar electrodes 71a, 71b toward the center side of the coil component 1F. The spiral wiring 23F of the fourth coil L4 has both ends connected to the fourth columnar electrodes 74a, 74b located on an outer side and has a curved shape drawing an arc from the fourth columnar electrodes 74a, 74b toward the center side of the coil component 1F.

The spiral wiring 23F of the second coil L2 has both ends connected to the second columnar electrodes 72a, 72b located on the inner side and has a curved shape drawing an arc from the second columnar electrodes 72a, 72b toward an edge side of the coil component 1F. The spiral wiring 23F of the third coil L3 has both ends connected to the third columnar electrodes 73a, 73b located on the inner side and has a curved shape drawing an arc from the third columnar electrodes 73a, 73b toward an edge side of the coil component 1F.

It is assumed in the coil component 1F that an inner diameter portion refers to the inside of the innermost circumference of the spiral wiring 23F (the area surrounded by the curve of the spiral wiring 23F and the straight line connecting both ends of the spiral wiring 23F) for each of the coils L1 to L4. In this case, in the coil component 1F, the inner diameter portions of any of the coils L1 to L4 do not overlap each other when viewed in the up-down direction.

On the other hand, in the coil component 1F, the spiral wirings 23F of the first and second coils L1, L2 come close to each other. Therefore, the magnetic fluxes generated in the spiral wiring 23F of the first coil L1 go around the periphery of the spiral wiring 23F of the second coil L2 close thereto, and the magnetic fluxes generated in the spiral wiring 23F of the second coil L2 go around the periphery of the spiral wiring 23F of the first coil L1 close thereto. The same applies to the third and fourth coils L3, L4 having the spiral wirings 23F coming close to each other. Therefore, the magnetic coupling between the first coil L1 and the second coil L1 as well as the magnetic coupling between the third coil L3 and the fourth coil L4 become strong.

Therefore, as is the case with the coil component 1 of the first embodiment, the coil component 1F has the first coil L1 and the second coil L2 forming a pair and the third coil L3 and the fourth coil L4 forming a pair, so that the four coils L1 to L4 are configured to form two pairs. Additionally, the magnetic coupling between the first coil L1 and the second coil L2 forming a pair is stronger than the magnetic couplings between the first coil L1 and each of the third and fourth coils L3, L4 as well as between the second coil L2 and each of the third and fourth coils L3, L4 not forming a pair. The magnetic coupling between the third coil L3 and the fourth coil L4 forming a pair is stronger than the magnetic couplings between the third coil L3 and each of the first and second coils L1, L2 as well as between the fourth coil L4 and each of the first and second coils L1, L2 not forming a pair. Actually, when the 3D magnetic field analysis result was calculated for the configuration of the coil component 1F by using the magnetic field analysis software Femtet under the same conditions as the coil component 1D, the absolute value of the coupling coefficient between the first coil L1 and the second coil L2 forming a pair was four times or more larger than the absolute value of the coupling coefficient between the second coil L2 and the third coil L3 adjacent to each other on the base insulating resin layer 30. The absolute value of the coupling coefficient between the second coil L2 and the fourth coil L4 having a large interval between the inner diameter portions was smaller than the absolute value of the coupling coefficient described above.

Thus, when a first coil is defined as one of the coils L1 to L4 and a second coil is defined as the coil forming a pair with the first coil while the coils other than the first coil and the second coil are defined as the other coils in the coil component 1F, the magnetic coupling between the first coil and the second coil is stronger than the magnetic coupling between the first coil and each of the other coils. Therefore, even when the coil component 1F is used for a multi-phase SW regulator, the ripple current of the coils L1 to L4 can be reduced by properly selecting the pulse signals input to the coils L1 to L4. Additionally, since the coil component 1F has the coils L1 to L4 each made up of the single-layer spiral wiring 23F, the coil component 1F can be reduced in height. Moreover, since it is not necessary to form a wiring layer other than the spiral wirings 23F as in the coil component 1B of the third embodiment, the height can further be reduced. Since the coil component 1F has all the spiral wirings 23F laminated on the base insulating layer 30 so that the insulating resin 35 can have a two-layer structure, a further reduction in the height can be achieved.

When currents flow simultaneously through the first and second coils L1, L2 from certain ends on the same side to the other ends on the opposite side in the coil component 1F, the magnetic fluxes strengthen each other. This means that when the certain ends on the same side of the first coil L1 and the second coil L2 are on the input side of the pulse signals and the other ends on the opposite side are on the output side of the pulse signals, the first coil L1 and the second coil L2 are positively coupled. However, for example, if one of the first coil L1 and the second coil L2 has the one end side used for input and the other end side used for output while the other coil has the one end side used for output and the other end used for input, the first coil L1 and the second coil L2 forming a pair can be put into a negatively coupled state. The same applies to the third and fourth coils L3, L4.

In the coil component 1F, the first and second coils L1, L2 has the portions coming close to each other with an insulating resin layer having the magnetic permeability of one interposed therebetween, for example, and the interval between the spiral wirings 23F can be narrowed to, for example, 10 μm, while ensuring voltage endurance. In this case, no magnetic resin is present between the portions coming close to each other; however, since the portions are sufficiently close to each other, the magnetic coupling can be ensured as indicated by the calculation result described above.

Figure 14D:
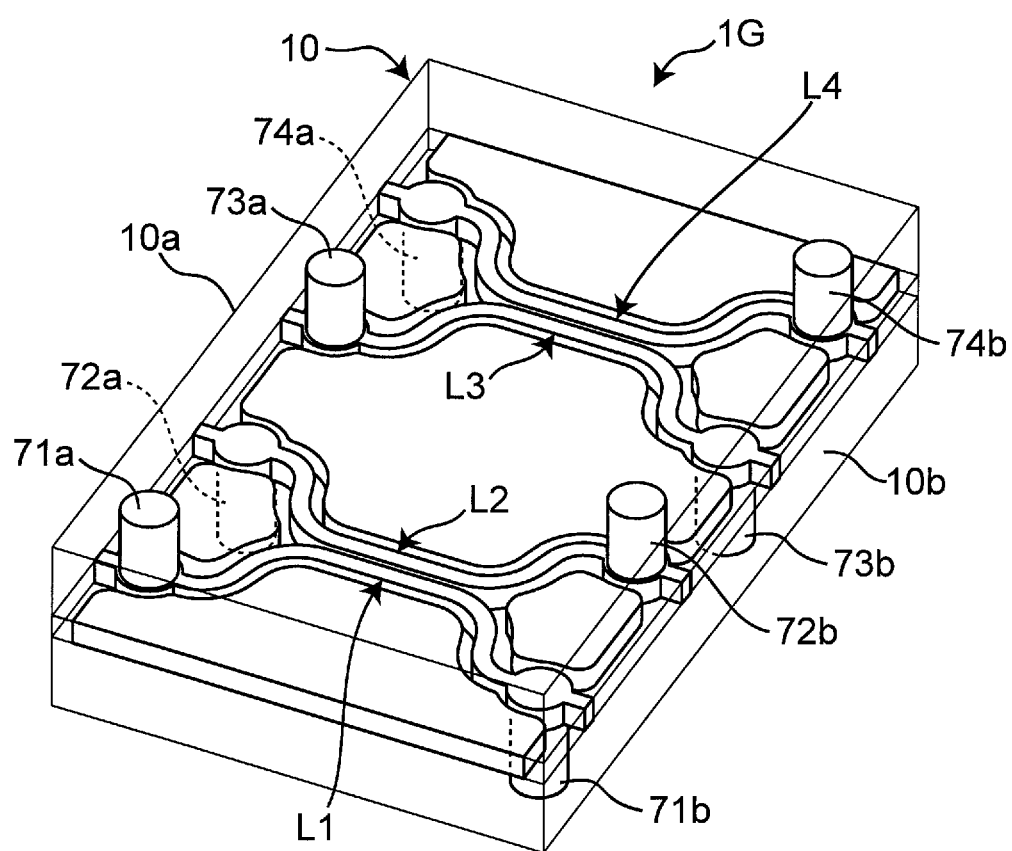
FIG. 14D is a transparent perspective view of a coil component 1G according to a modification example of the seventh embodiment.

FIG. 14D is a transparent perspective view of a coil component 1G according to a modification example of the seventh embodiment. The coil component 1G is different from the coil component 1F in arrangement of columnar electrodes. First, it is assumed that an end portion of each of the coils L1 to L4 on the side of the first side surface 10a of the element body 10 is defined as one end while an end portion of each of the coils L1 to L4 on the side of the second side surface 10b is defined as the other end. In the coil component 1G, the first and third columnar electrodes 71a, 73a connected to the one end side of the first and third coils L1, L3 as well as the second and fourth columnar electrodes 72b, 74b connected to the other end side of the second and fourth coils L2, L4 are each exposed on the upper side of the element body 10. The first and third columnar electrodes 71b, 73b connected to the other end side of the first and third coils L1, L3 as well as the second and fourth columnar electrodes 72a, 74a connected to the other end side of the second and fourth coils L2, L4 are each exposed on the lower side of the element body 10.

According to this configuration, for example, by embedding the coil component 1G in the mounting board and arranging input lines of the pulse signals on the upper surface side of the element body 10 while arranging output lines of the pulse signals on the lower surface side of the element body 10, the sets of the first and second coils L1, L2 and the third and fourth coils L3, L4 forming pairs can more easily negatively be coupled.

Figure 14E:
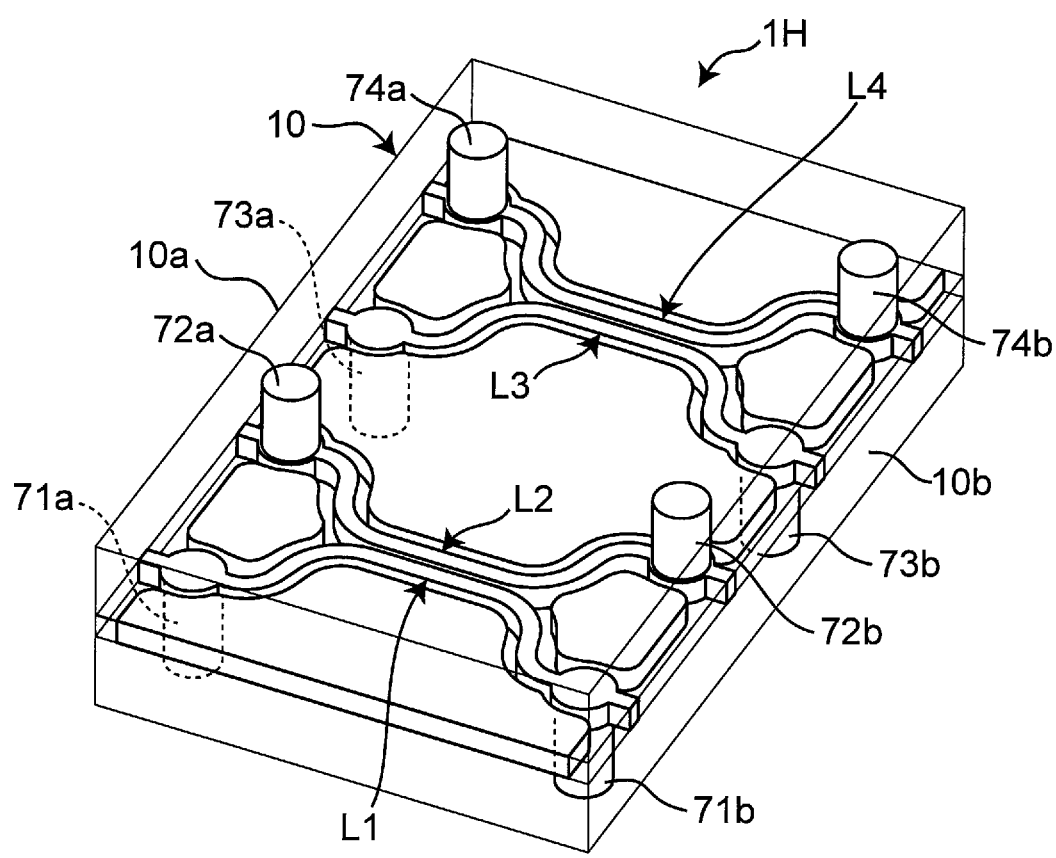
FIG. 14E is a transparent perspective view of a coil component 1H according to a modification example of the seventh embodiment.

FIG. 14E is a transparent perspective view of a coil component 1H according to a modification example of the seventh embodiment. The coil component 1H is different from the coil component 1F in arrangement of columnar electrodes. Specifically, in the coil component 1H, the first and third columnar electrodes 71a, 71b, 73a, 73b connected to the first and third coils L1, L3 are each exposed on the lower side from the element body 10. The second and fourth columnar electrodes 72a, 72b, 74a, 74b connected to the second and fourth coils L2, L4 are exposed on the upper side from the element body 10.

According to this configuration, since the first to fourth external terminals of the coil component 1H (the first to fourth columnar electrodes) adjacent to each other are exposed on respective different surfaces, the intervals between the terminals can be increased in the coil component 1H as compared to the coil component 1F even if the outer shape size is the same, so that it can be made difficult to cause a short circuit between the terminals at the time of connection of wirings to the mounting board.

Eighth Embodiment

In the second to seventh embodiments, the coil components have a configuration including the element body of laminated insulating layers and the wirings wound on the insulating layers, i.e., a structure of a so-called laminated coil; however, this is not a limitation of the configuration strengthening and weakening the magnetic couplings between paired coils and unpaired coils as in the first embodiment.

Figure 15:
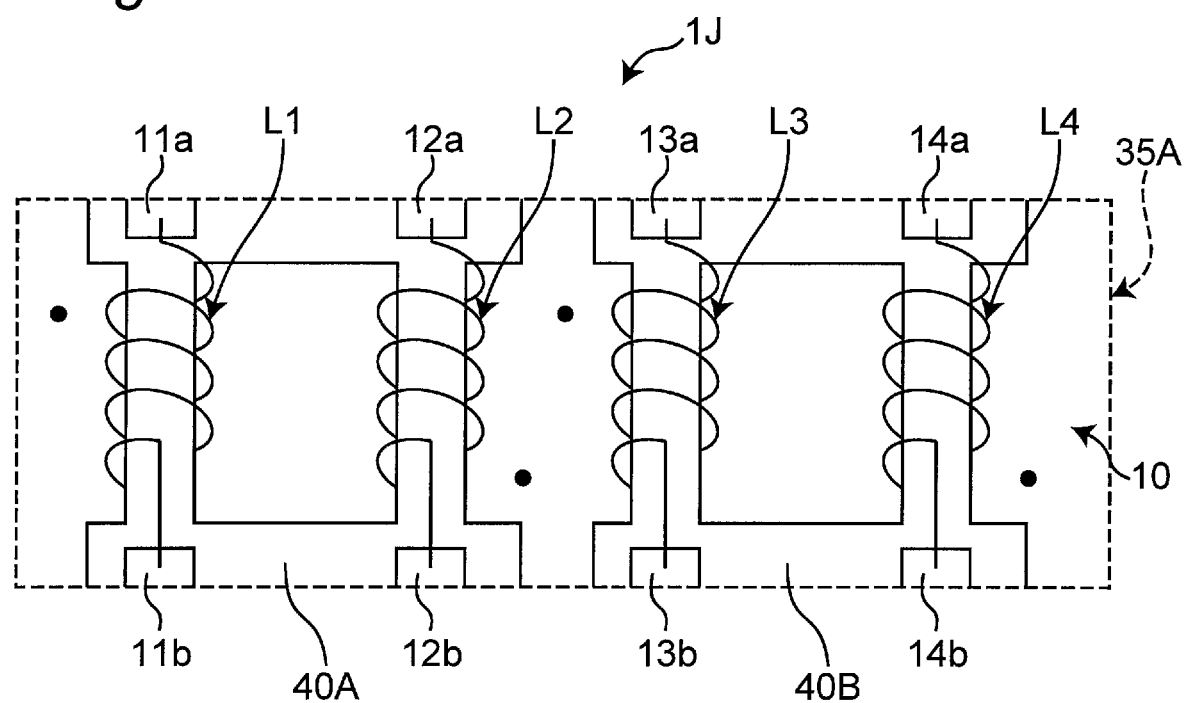
FIG. 15 is a schematic diagram of a coil component 1J according to an eighth embodiment.

FIG. 15 is a schematic diagram of a coil component 1J according to an eighth embodiment. The coil component 1J is different from the coil component 1A of the second embodiment in the configuration of the element body 10 and the configuration of the coils L1 to L4. This different configurations will hereinafter mainly be described. In the eighth embodiment, the same constituent elements as the first to seventh embodiments are denoted by the same reference numerals as the embodiments and therefore will not be described.

As shown in FIG. 15, the coil component 1J has the element body 10 made up of a first core 40A, a second core 40B, and a sealing resin 35A, and the first to fourth coils L1 to L4 are made up of windings respectively wound around the first and second cores 40A, 40B.

The first and second cores 40A, 40B each have a substantially quadrangular frame shape and are made of a magnetic material such as ferrite or iron, for example. The external terminals 11a to 14a, 11b to 14b are formed on the sets of opposite sides of the first and second cores 40A, 40B. The sealing resin 35A is a member for sealing both the first and second cores 40A, 40B in the one element body 10 and is made of an insulating material such as an epoxy resin, for example. In this configuration, the first core 40A and the second core 40B are arranged at an interval.

The first to fourth coils L1 to L4 are, for example, insulation-coated copper wires and are each wound around one side of the first and second cores 40A, 40B and connected at both ends to the first to fourth external terminals 11a to 14a, 11b to 14b. The first and second coils L1, L2 are wound in the same direction around one side and the other side, respectively, forming a set of sides without the first and second external terminals 11a, 11b, 12a, 12b formed thereon out of the sets of the opposite sides of the first core 40A. The third and fourth coils L3, L4 are wound in the same direction around one side and the other side, respectively, forming a set of sides without the third and fourth external terminals 13a, 13b, 14a, 14b formed thereon out of the sets of the opposite sides of the second core 40B. Therefore, the coil component 1J has the first coil L1 and the second coil L2 wound around the same first core 40A and the third coil L3 and the fourth coil L4 wound around the same second core 40B.

The configuration described above makes the magnetic coupling between the first coil L1 and the second coil L2 as well as the magnetic coupling between the third coil L3 and the fourth coil L4 stronger in the coil component 1J. On the other hand, since the first core 40A and the second core 40B are arranged at an interval, the magnetic coupling between the first coil L1 and each of the third and fourth coils L3, L4 becomes weak, and the magnetic coupling between the second coil L2 and each of the third and the fourth coils L3, L4 becomes weak.

Therefore, as is the case with the coil component 1 of the first embodiment, the coil component 1J has the first coil L1 and the second coil L2 forming a pair and the third coil L3 and the fourth coil L4 forming a pair, so that the four coils L1 to L4 are configured to form two pairs. Additionally, the magnetic coupling between the first coil L1 and the second coil L2 forming a pair is stronger than the magnetic couplings between the first coil L1 and each of the third and fourth coils L3, L4 as well as between the second coil L2 and each of the third and fourth coils L3, L4 not forming a pair. The magnetic coupling between the third coil L3 and the fourth coil L4 forming a pair is stronger than the magnetic couplings between the third coil L3 and each of the first and second coils L1, L2 as well as between the fourth coil L4 and each of the first and second coils L1, L2 not forming a pair.

Therefore, when a first coil is defined as one of the coils L1 to L4 and a second coil is defined as the coil forming a pair with the first coil while the coils other than the first coil and the second coil are defined as the other coils in the coil component 1J, the magnetic coupling between the first coil and the second coil is stronger than the magnetic coupling between the first coil and each of the other coils. Therefore, even when the coil component 1J is used for a multi-phase SW regulator, the ripple current of the coils L1 to L4 can be reduced by properly selecting the pulse signals input to the coils L1 to L4.

In the coil component 1J, one end of the first coil L1 and one end of the second coil L2 are led out to the same one side with respect to the first coil L1 and the second coil L2, and the other end of the first coil L1 and the other end of the second coil L2 are led out to the same other side with respect to the first coil L1 and the second coil L2. Additionally, the first coil L1 and the second coil L2 are wound in the same direction and therefore are negatively coupled when the one end is on the input side of the pulse signal and the other end is on the output side of the pulse signal. Therefore, the first coil L1 and the second coil L2 are wound such that the respective magnetic fluxes cancel each other in the core 40A when a current flows from the one end to the other end. The same applies to the third coil L3 and the fourth coil L4.

Therefore, when the pulse signals are input such that all the paired coils are negatively coupled in the coil component 1J, the input sides and the output sides of the coils L1 to L4 can be arranged on the same respective sides. As a result, the wiring routing can be facilitated on the board on which the coil component 1J is mounted.

Ninth Embodiment

Figure 16:
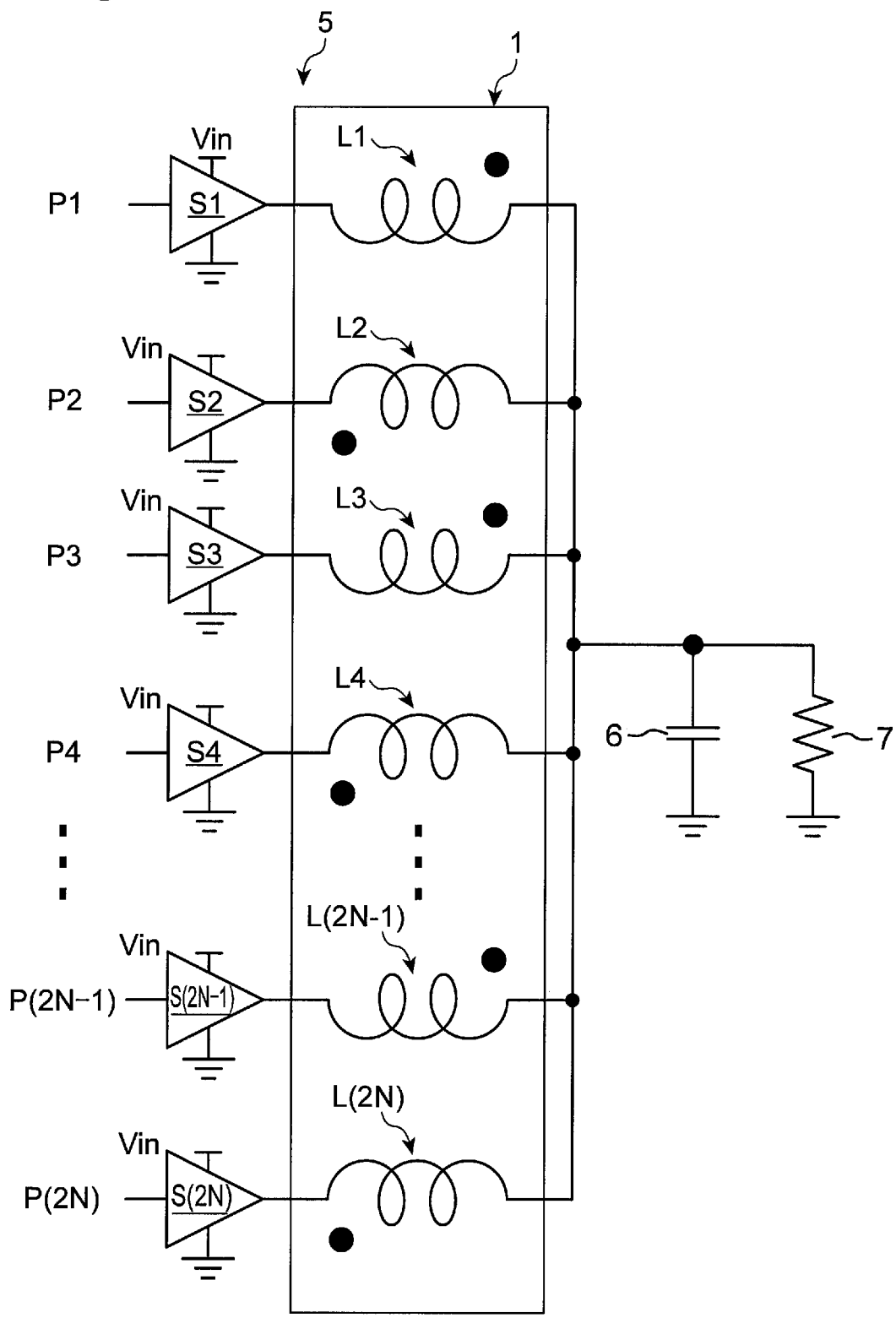
FIG. 16 is a simplified configuration diagram of a switching regulator 5 according to an embodiment.

FIG. 16 is a simplified configuration diagram of an embodiment of a switching regulator of the present disclosure. As shown in FIG. 16, a switching regulator 5 (hereinafter referred to as the "regulator 5") is a step-down type switching regulator and steps down an input voltage Vin to a predetermined output voltage before supplying to a load 7. The regulator 5 has the coil component 1, switch parts S1 to S(2N) respectively connected to the coils L1 to L(2N) of the coil component 1 on one end portion side thereof, and a capacitor 6 (as an example of a smoothing circuit) connected to the coils L1 to L(2N) of the coil component 1 on the other end portion side thereof. The regulator 5 is a multi-phase SW regulator, and the sets of the switch parts S1 to S(2N) and the coils L1 to L(2N) are connected in parallel between the input voltage Vin and the capacitor 6.

The coil component 1 has the same configuration as the coil component 1 of the first embodiment (FIG. 1). The same constituent elements as the first embodiment are denoted by the same reference numerals as the first embodiment and therefore will not be described.

The switch parts S1 to S(2N) connect either the input voltage Vin or a ground voltage to the coils L1 to L(2N) connected thereto (corresponding thereto) (a synchronous rectification type). Therefore, a pulse signal input to each of the coils L1 to L(2N) is a rectangular wave having two values of the input voltage Vin and the ground voltage. It is assumed that the switch parts S1 to S (2N) are each in an ON state when the input voltage Vin is connected to the coils L1 to L(2N) corresponding thereto and that the switch parts S1 to S (2N) are each in an OFF state when the ground voltage is connected to the coils L1 to L(2N) corresponding thereto. The switching between the ON state and the OFF state is controlled by drive signals P1 to P (2N) input to the switch parts S1 to S (2N) from a PWM (Pulse Width Modulation) generator (not shown) included in the regulator 5.

Specifically, a certain oscillation frequency is set to the regulator 5, and the PWM generator shifts (turns on) the switch parts S1 to S(2N) to the ON state at this oscillation frequency by the drive signals P1 to P(2N). Therefore, the interval between turn-ons is the reciprocal of the oscillation frequency. This means that a pulse signal of rectangular waves having the same constant period (reciprocal of the oscillation frequency) is input to each of the coils L1 to L(2N).

The regulator 5 also includes a detection circuit (not shown) detecting the output voltage of the coils L1 to L(2N) and the current flowing through the coils L1 to L(2N) and, when the detection circuit detects a voltage or a current equal to or greater than a certain level, the PWM generator shifts (turns off) the switch parts S1 to S (2N) to the OFF state by the drive signals P1 to P (2N). In a state (steady state) in which the power consumption of the load 7 does not vary, the interval from turn-on to turn-off is constant. Therefore, the 2N pulse signals input to the coils L1 to L(2N) in the steady state have the same constant duty cycle (the interval from turn-on to turn-off/the reciprocal of the oscillation frequency) in the same constant period.

The regulator 5 is a multi-phase SW regulator and, when the reciprocal of the oscillation frequency is represented by a phase of 360°, the drive signals P1 to P(2N) are a set of signals having turn-on intervals shifted by 360°/(2N), i.e., signals having a phase difference of 360°/(2N). In this case, the pulse signals input to the coils L1 to L(2N) are also a set of signals having a phase difference of 360°/(2N). As a result, the peaks of voltages output from the coils L1 to L(2N) are equally shifted, so that a difference between the minimum value and the maximum value of the composite voltage of the output voltages, i.e., the ripple voltage input to the capacitor 6, can be reduced.

When the pulse signal having the phase difference of 360°/(2N) is input from one end of each of the coils L1 to L(2N), the rectangular-wave pulse signal is converted into a triangular-wave pulse signal by the inductance of each of the coils L1 to L(2N), and the triangular wave is output from the other end of each the coils L1 to L(2N).

The output triangular wave is smoothed by the capacitor 6 connected to the other end portion side of the coils L1 to L(2N) and is supplied to the load 7 on the subsequent stage. In this case, the voltage (output voltage) supplied to the load 7 is the product of the input voltage Vin and the duty cycle. Therefore, by properly setting the constant duty cycle, the regulator 5 steps down the input voltage Vin to a predetermined output voltage before supplying to the load 7.

The regulator 5 has the coil component 1. Therefore, the ripple current of the coils L1 to L(2N) can be reduced by properly selecting the pulse signals input to the coils L1 to L(2N). Specifically, when M is an integer of one or more and N or less, the regulator 5 selects as the signal P(2M−1) a signal having a phase difference of (360°/(2N))×(M−1) relative to the signal P1 and selects as the signal P(2M) a signal having a phase difference of (360°/(2N))×(M−1)+ 180° relative to the signal P1. In this case, the pulse signals having a phase difference of 180° are input to all the paired coils L(2M−1) and L(2M) of the coil component 1, so that the ripple current of the coils L1 to L(2N) can be reduced.

Therefore, because of the reduction of the ripple current, the regulator 5 has a reduced loss due to heat generation in the coils L1 to L(2N) and an improved efficiency. Additionally, because of the reduction of the ripple current, the regulator 5 can reduce the inductance value required for the coils L1 to L(2N) and the capacitance value required for the capacitor 6 and can achieve an improvement in transient response speed and a miniaturization of a circuit. Therefore, the regulator 5 can be improved in performance and miniaturized.

Although the regulator 5 is of the PWM type in the above description, but the regulator may be of a PFM (Pulse Frequency Modulation) type. Even in the case of the PFM type, the 2N pulse signals input to the coils L1 to L(2N) in the steady state are a set of signals having the same constant duty cycle in the same constant period and having a phase difference of 360°/(2N). Therefore, even in this case, the regulator 5 can be improved in performance and miniaturized by properly selecting the 2N pulse signals.

Although the switch parts S1 to S(2N) are of the synchronous rectification type in the above description, this is not a limitation and, for example, each of the switch parts S1 to S (2N) may be configured to have one switching element and a diode (a diode rectification type).

Although the regulator 5 is of the step-down type in the description, even a multi-phase SW regulator of the step-up type or the step-up/step-down type having the coil component 1 can be improved in performance and miniaturized by reducing the ripple current of the coils L1 to L(2N).

The present disclosure is not limited to the embodiments described above and may be changed in design without departing from the spirit of the present disclosure. For example, respective feature points of the first to ninth embodiments may variously be combined.

In the second to eighth embodiments, the coil component has four coils; however, the coil component may have (2N) coils (N is an integer of two or more) and N may be set to N>2. In the second embodiment, each of the coils has two layers of spiral wirings; however, each of the coils may have three or more layers of spiral wirings.

In the second embodiment, the coil has a structure in which a plurality of spiral wirings each having the number of turns equal to or greater than one is laminated; however, the coil may have a three-dimensional spiral (helical) structure in which a plurality of spiral wirings each having the number of turns less than one is laminated.

In the embodiments described above, the effect in the case of the negatively-coupled paired coils is mainly described; however, the paired coils may magnetically be coupled such that the coupling coefficient of the paired coils becomes positive, i.e., such that respective magnetic fluxes strengthen each other when currents flow through the paired coils at the same time. As a result, the input ripple current to the paired coils can be reduced. To make the coupling coefficient of the paired coils positive, for example, the winding direction of one coil may be reversed in a set of the paired coils, for example, the coils L1, L2, or the pulse signal may be input/output in the opposite direction for one of the coils L1, L2 in the coil component 1. Alternatively, for example, the paired coils L1, L2 may be wound in the same direction in the coil component 1A.

In the coil component 1A, all the coils (spiral wirings) may be wound in the same direction. In this case, since the shapes, arrangement, manufacturing conditions, etc. of the coils can easily be made uniform, the electric characteristic deviation can be reduced and the manufacturing can be facilitated. Additionally, the paired coils can easily positively be coupled.

In the coil component 1A, a plurality of coils (e.g., the coils L1, L4) is laminated on the same insulating layer (e.g., the base insulating layer 30), and the plurality of coils is wound in different directions; however, this is not a limitation, and the plurality of coils may be wound in the same direction. In this case, since the plurality of coils laminated on the same insulating layer is wound in the same direction, a negative coupling can easily be achieved for a set of coils adjacent to each other on the same insulating layer and having a relatively large magnetic coupling out of the sets of the unpaired coils, and the ripple current of the coils can further be suppressed.

The invention claimed is:

1. A switching regulator comprising:
a coil component having an element body and 2N coils disposed inside the element body, each of the 2N coils having one end and another end;
2N switch parts connected to the one ends of the 2N coils of the coil component, respectively; and
a smoothing circuit, wherein
the 2N coils are configured to form N pairs, wherein
when coils other than a first coil and a second coil forming one of the N pairs are defined as the other coils, a magnetic coupling between the first coil and the second coil is stronger than a magnetic coupling between the first coil and each of the other coils, wherein
the one end of the first coil and the one end of the second coil are led out to a same one side of the element body with respect to the first coil and the second coil, while the another end of the first coil and the another end of the second coil are led out to a same other side of the element body with respect to the first coil and the second coil, wherein
the first coil and the second coil are wound such that respective magnetic fluxes cancel each other when an electric current flows from the one end to the another end of each of the first coil and the second coil, wherein
the smoothing circuit is connected to the one end or the another end of each of the coils of the 2N coil component, and wherein
a period of pulse signal inputs from the 2N switch parts to respective ones of the 2N coils is represented by a phase of 360° and the 2N switch parts input pulse signals having different phases from each other to the one ends of the 2N coils, respectively, the pulse signals inputted to the paired first and second coils of each of the N pairs having a phase difference of 180° from each other so that the current in the first coil increases when the current in the second coil negatively coupled with the first coil decreases in each of the N pairs and changes in the magnetic fluxes due to the current changes of the first and second coils are made in the same direction and strengthen each other, and
the pulse signals inputted from the 2N switch parts are a set of signals having turn-on intervals shifted by 360°/(2N), N being an integer of two or more.

2. The switching regulator according to claim 1, wherein the magnetic coupling between the first coil and the second coil is stronger than a magnetic coupling between the second coil and each of the other coils.

3. The switching regulator according to claim 2, wherein the magnetic coupling between the paired coils is stronger than any of magnetic couplings between the unpaired coils.

4. The switching regulator according to claim 1, wherein an electric current is applied to the first coil and the second coil in a direction of negative coupling such that respective magnetic fluxes cancel each other.

5. The switching regulator according to claim 1, wherein the element body has a plurality of insulating layers laminated in a first direction, wherein
 each of the 2N coils is disposed inside the element body and is made up of one or more spiral wiring wound on one of the insulating layers, and wherein
 when an inside of an innermost circumference of the spiral wiring is defined for each of the 2N coils as an inner diameter portion of the coil,
 at least a portion of the inner diameter portion of the first coil and at least a portion of the inner diameter portion of the second coil overlap with each other when viewed in the first direction.

6. The switching regulator according to claim 5, wherein the inner diameter portion of the first coil and the inner diameter portions of the other coils do not overlap with each other when viewed in the first direction.

7. The switching regulator according to claim 5, wherein the first coil and the second coil are wound in different directions.

8. The switching regulator according to claim 5, wherein
 a plurality of coils of the 2N coils is laminated on the same insulating layer, and wherein
 the plurality of the coils is wound in the same direction.

9. The switching regulator according to claim 5, wherein the 2N coils are all wound in the same direction.

10. The switching regulator according to claim 5, wherein the insulating layers on both sides in the first direction with respect to the spiral wirings of the 2N coils include magnetic resin layers made of a composite material of a magnetic powder and a resin.

11. The switching regulator according to claim 10, wherein
 the magnetic powder has an average particle diameter of 0.5 µm or more and 100 µm or less, and wherein the magnetic powder is contained in an amount of 50 vol. % or more and 85 vol. % or less relative to the resin.

12. The switching regulator according to claim 10, further comprising, for each of the 2N coils, magnetic resin bodies made of a composite material of a magnetic material powder and a resin and provided in the inner diameter portion of the coil and outside an outermost circumference of the spiral wiring of the coil, wherein
 the magnetic resin layer and the magnetic resin bodies constitute a closed magnetic circuit.

13. The switching regulator according to claim 5, wherein
 the first coil and the second coil are each made up of a plurality of the spiral wirings each wound on one of the insulating layers, and wherein
 a shortest distance between the first coil and the second coil is longer than a shortest distance between the spiral wirings in each of the first coil and the second coil.

14. The switching regulator according to claim 5, wherein
 the spiral wirings of a plurality of coils of the 2N coils are wound on the same insulating layer, and wherein
 a shortest distance between the spiral wirings is longer than a spacing between adjacent turns of each of the spiral wirings.

15. The switching regulator according to claim 5, wherein the insulating layers in contact with the spiral wirings are made of a composite material of an insulator powder and a resin.

16. The switching regulator according to claim 1, wherein the first coil and the second coil are the same as each other in terms of the number of turns, a coil wiring length, and a coil cross-sectional area.

17. The switching regulator according to claim 1, wherein a first external terminal connected to the one end of the first coil and a second external terminal connected to the one end of the second coil are adjacent to each other.

18. The switching regulator according to claim 1, wherein the element body of the coil component includes a magnetic body that is disposed between one pair of the 2N coils and another pair of the 2N coils that is adjacent to the one pair of the 2N coils such that the magnetic body is not filled in a portion where the first coil in one of the adjacent pairs of the 2N coils has a minimum distance from the first coil in another one of the adjacent pairs of the 2N coils.

* * * * *